(12) United States Patent
Krill, Jr. et al.

(10) Patent No.: US 6,372,157 B1
(45) Date of Patent: *Apr. 16, 2002

(54) RADIATION SHIELDING MATERIALS AND CONTAINERS INCORPORATING SAME

(75) Inventors: Stephen J. Krill, Jr., Arlington, VA (US); Steven M. Mirsky, Greenbelt; Alexander P. Murray, Gaithersburg, both of MD (US)

(73) Assignee: The United States of America as represented by the Department of Energy, Washington, DC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/826,088

(22) Filed: Mar. 24, 1997

(Under 37 CFR 1.47)

(51) Int. Cl.$^7$ ............................ G21C 7/24; G21C 11/00
(52) U.S. Cl. ...................................... 252/478; 250/515.1
(58) Field of Search ........................ 252/478; 250/515.1

(56) References Cited

U.S. PATENT DOCUMENTS

| | | | |
|---|---|---|---|
| 3,438,903 A | * | 4/1969 | Prahl ........................... 252/478 |
| 3,888,795 A | * | 6/1975 | Kasberg ....................... 252/478 |
| 4,594,513 A | | 6/1986 | Suzuki et al. |
| 4,868,400 A | | 9/1989 | Barnhart et al. |
| 4,914,306 A | | 4/1990 | Dufrane et al. |
| 5,015,863 A | * | 5/1991 | Takeshima et al. ......... 252/478 |
| 5,102,615 A | | 4/1992 | Grande et al. |
| 5,276,335 A | | 1/1994 | Shinopulos et al. |
| 5,334,847 A | | 8/1994 | Kronberg |
| 5,402,455 A | | 3/1995 | Angelo, II et al. |
| 5,546,436 A | | 8/1996 | Jones et al. |

OTHER PUBLICATIONS

Fuchs, Journal of the Optical Society of America, vol. 58, pp. 319–330, (1968).*

Yoshinga, Journal of the Optical Society of America, vol. 45, p. 1085, (1955).*

Tsuboi, The Journal of Chemical Physics, vol. 36, pp. 1301–1310, (1962).*

* cited by examiner

Primary Examiner—Philip Tucker
(74) Attorney, Agent, or Firm—William C. Daubenspeck; Virginia B. Caress; Paul A. Gottlieb

(57) ABSTRACT

An improved radiation shielding material and storage systems for radioactive materials incorporating the same. The PYRolytic Uranium Compound ("PYRUC") shielding material is preferably formed by heat and/or pressure treatment of a precursor material comprising microspheres of a uranium compound, such as uranium dioxide or uranium carbide, and a suitable binder. The PYRUC shielding material provides improved radiation shielding, thermal characteristic, cost and ease of use in comparison with other shielding materials. The shielding material can be used to form containment systems, container vessels, shielding structures, and containment storage areas, all of which can be used to house radioactive waste. The preferred shielding system is in the form of a container for storage, transportation, and disposal of radioactive waste. In addition, improved methods for preparing uranium dioxide and uranium carbide microspheres for use in the radiation shielding materials are also provided.

64 Claims, 36 Drawing Sheets

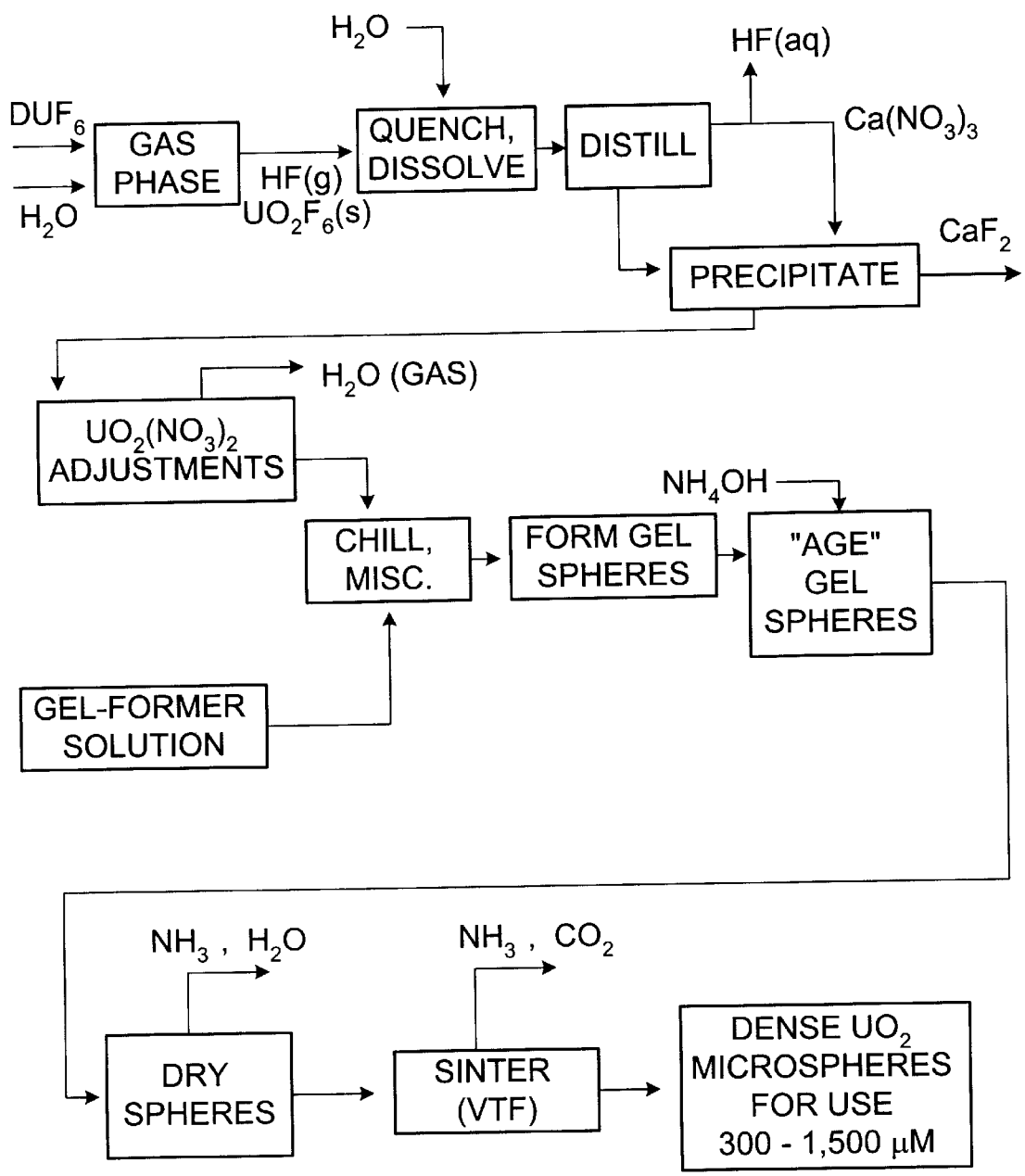
FIG. 4.1

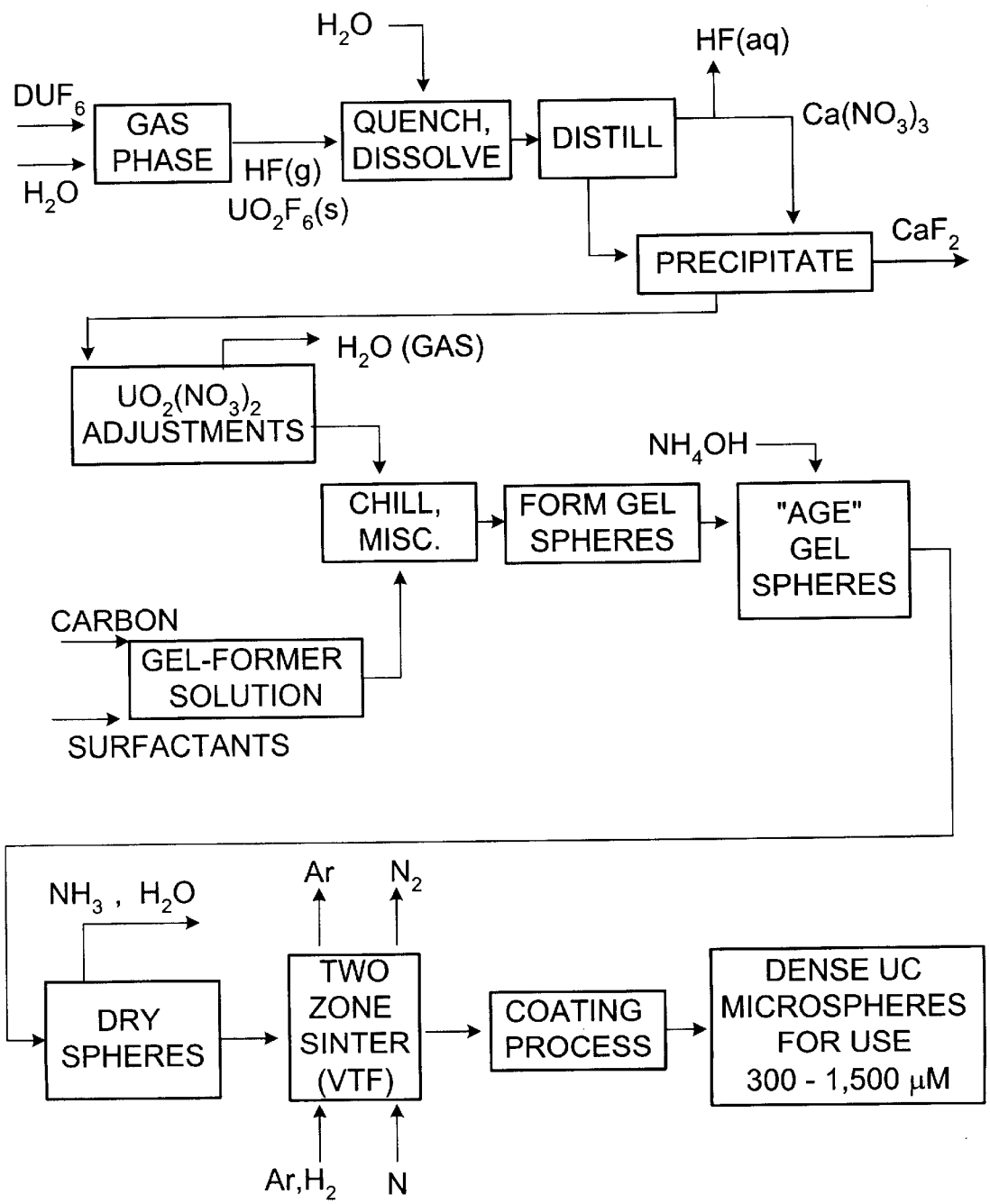
FIG. 4.1A

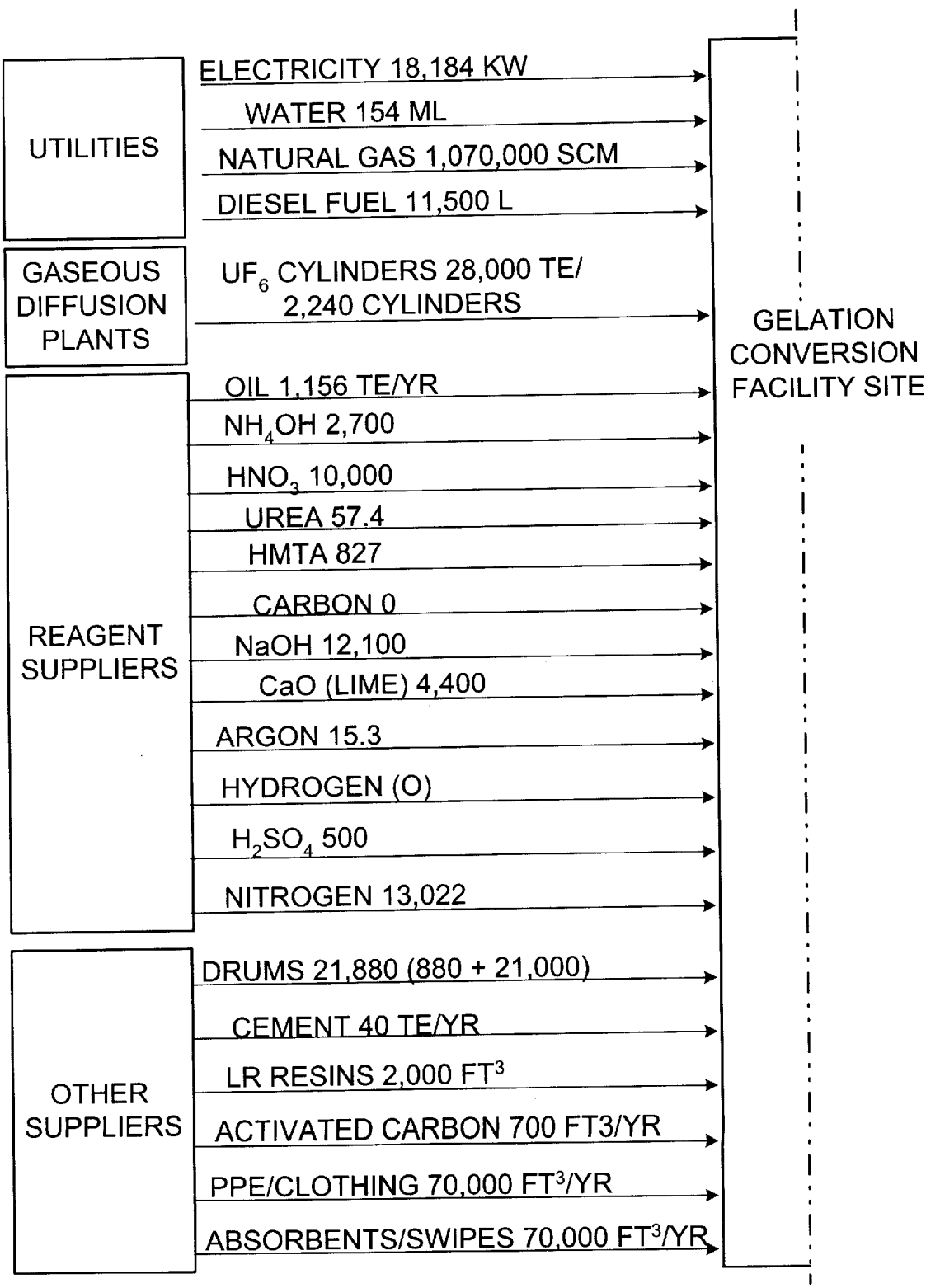
FIG. 4.2.1

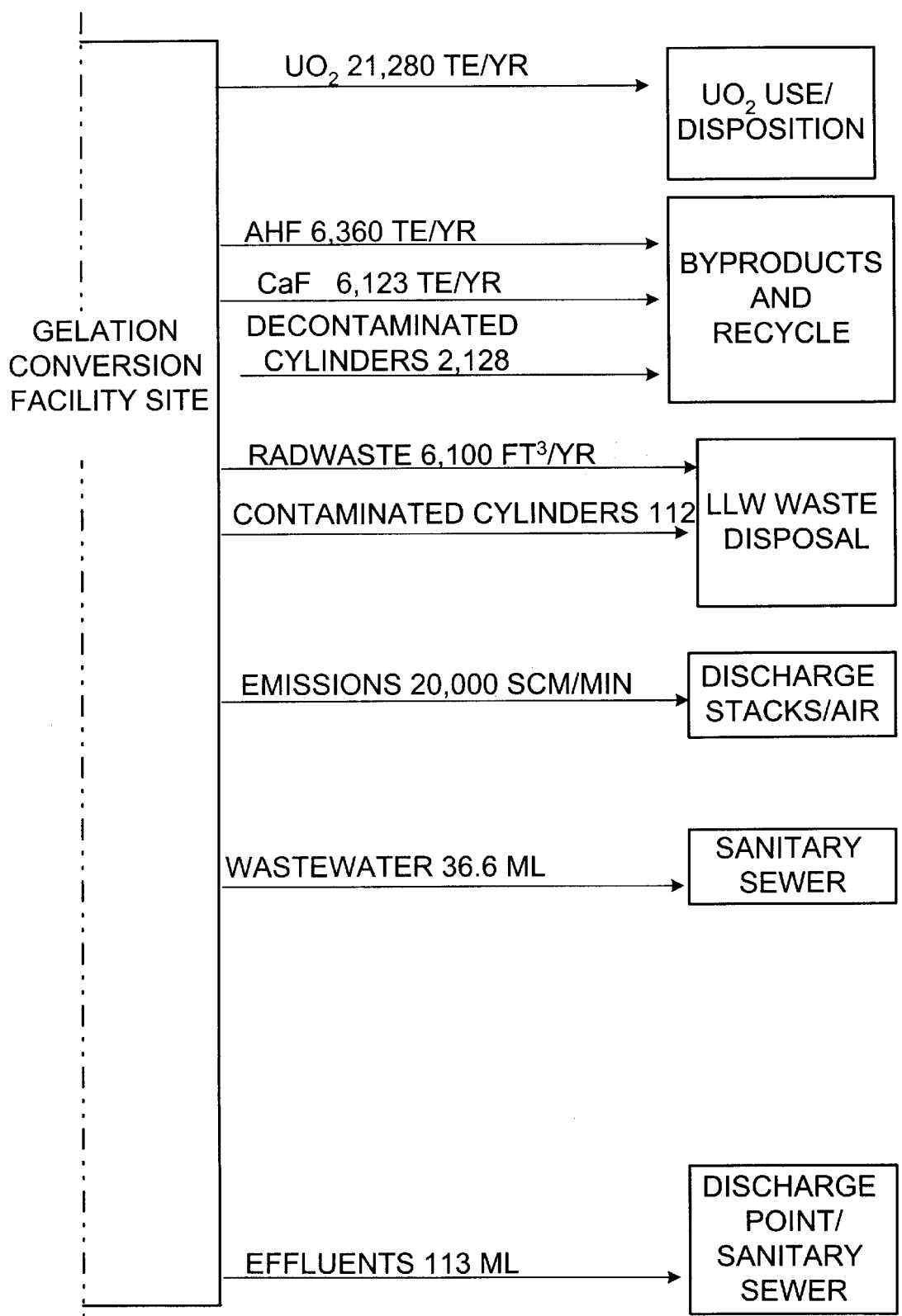
FIG. 4.2.2

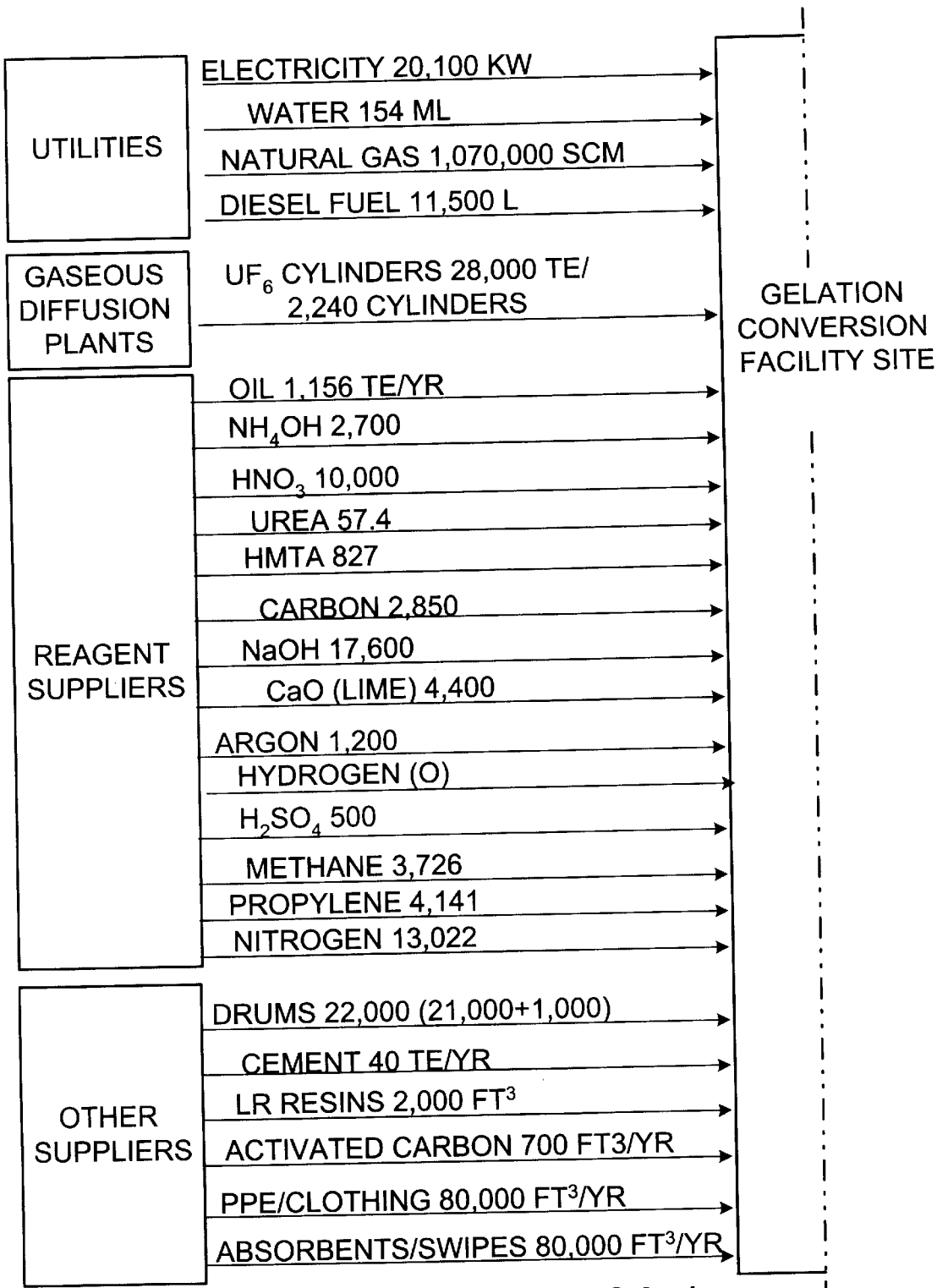
FIG. 4.2A.1

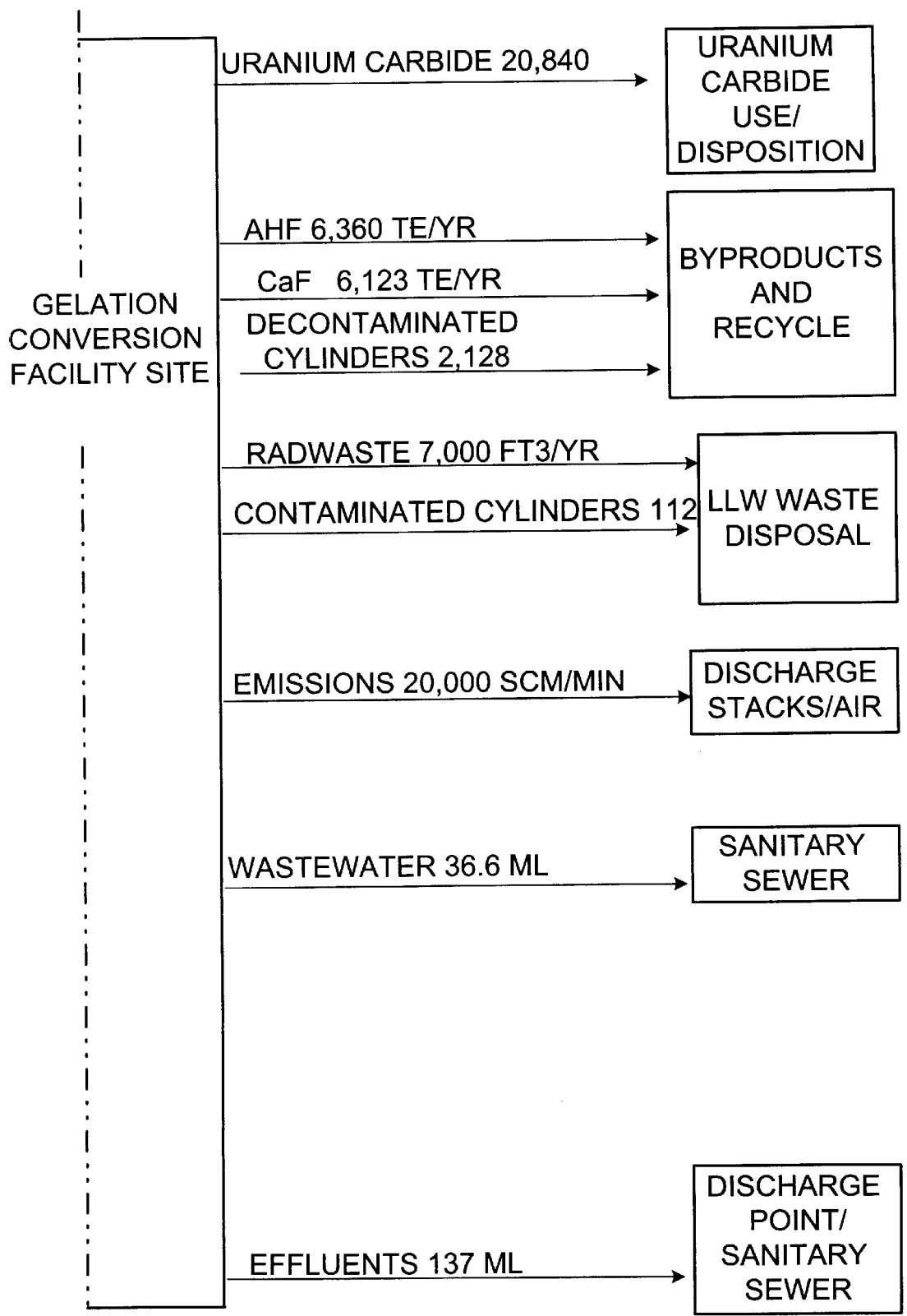
FIG. 4.2A.2

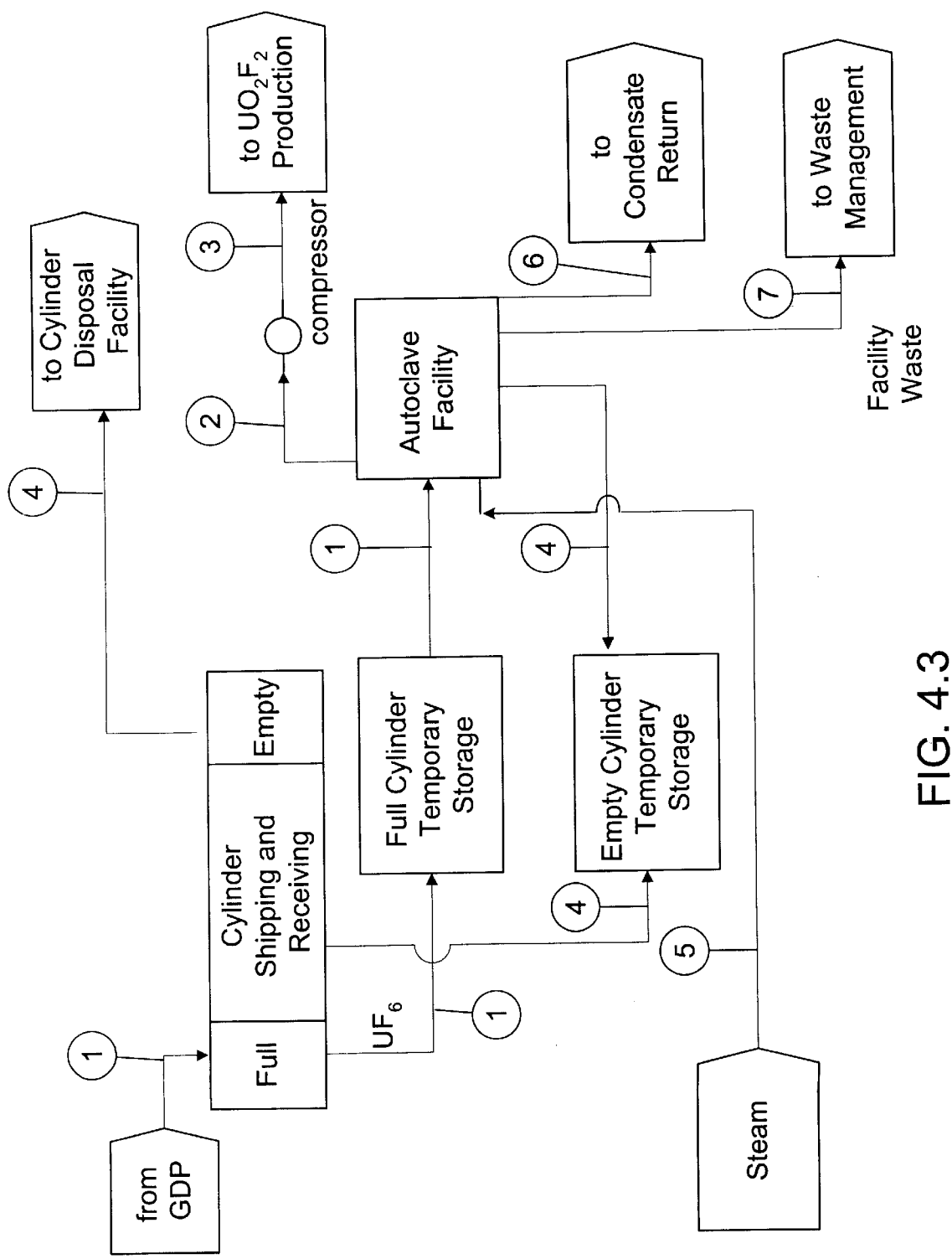
FIG. 4.3

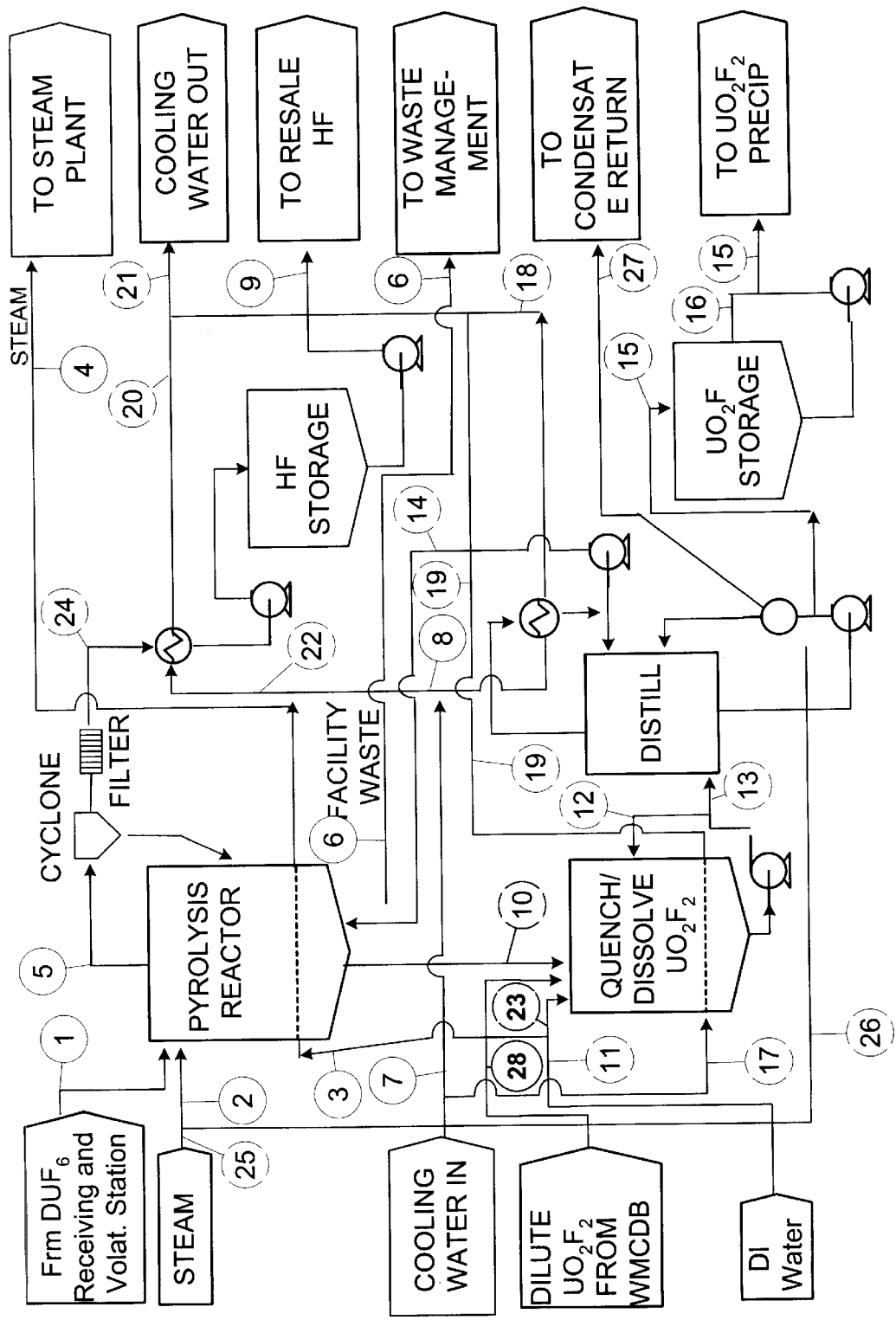
FIG. 4.4

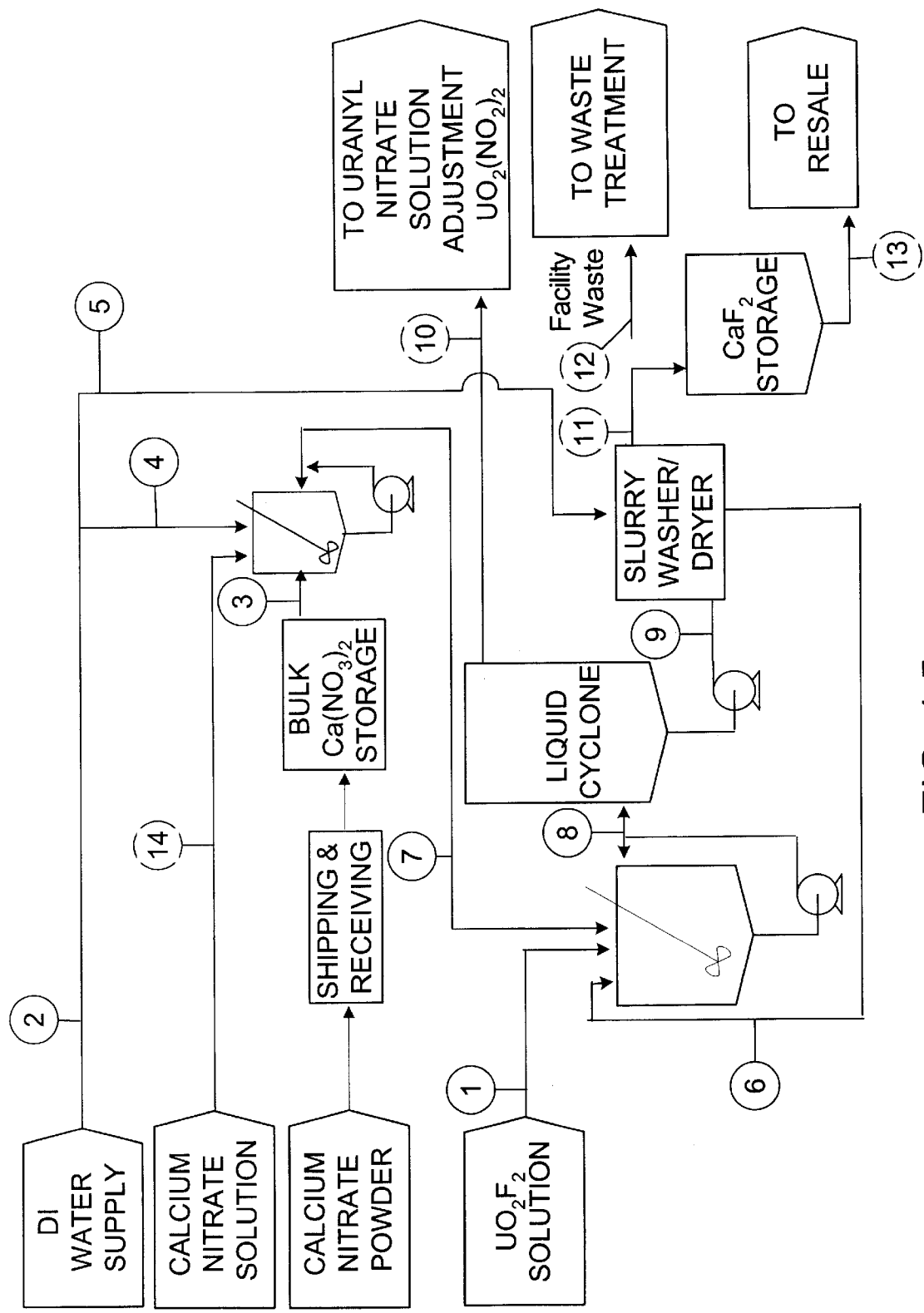
FIG. 4.5

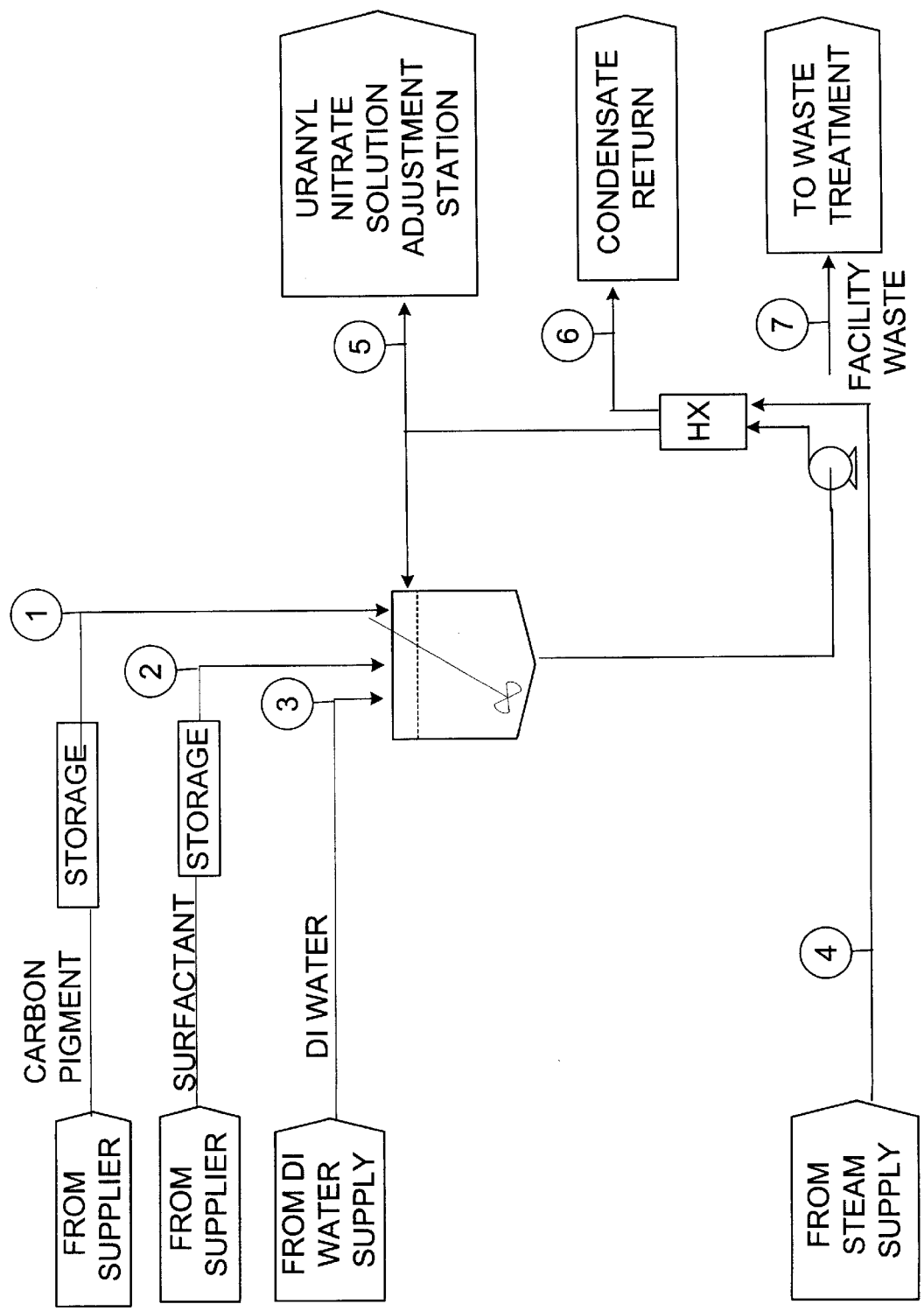
FIG. 4.6.1

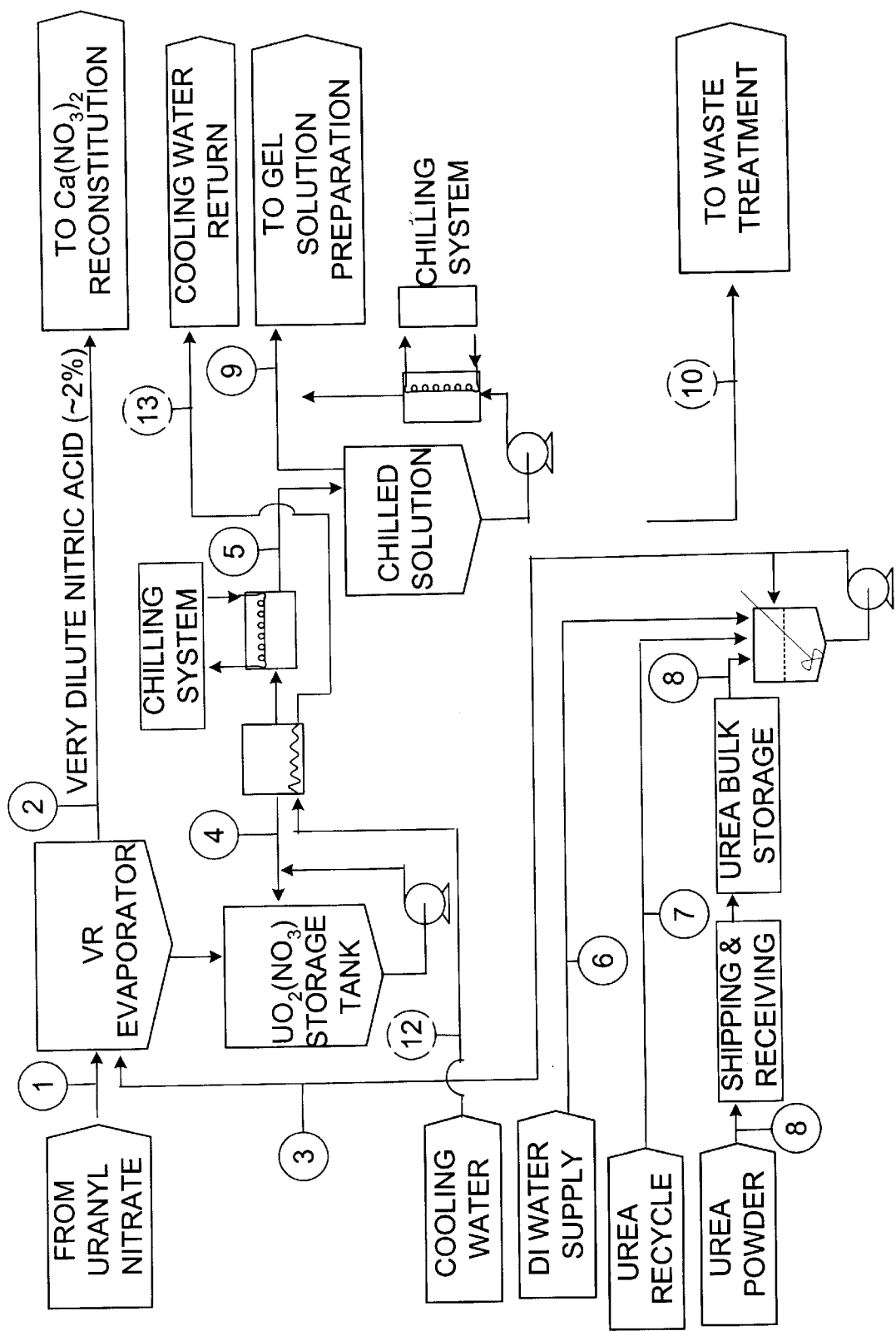
FIG. 4.6.2

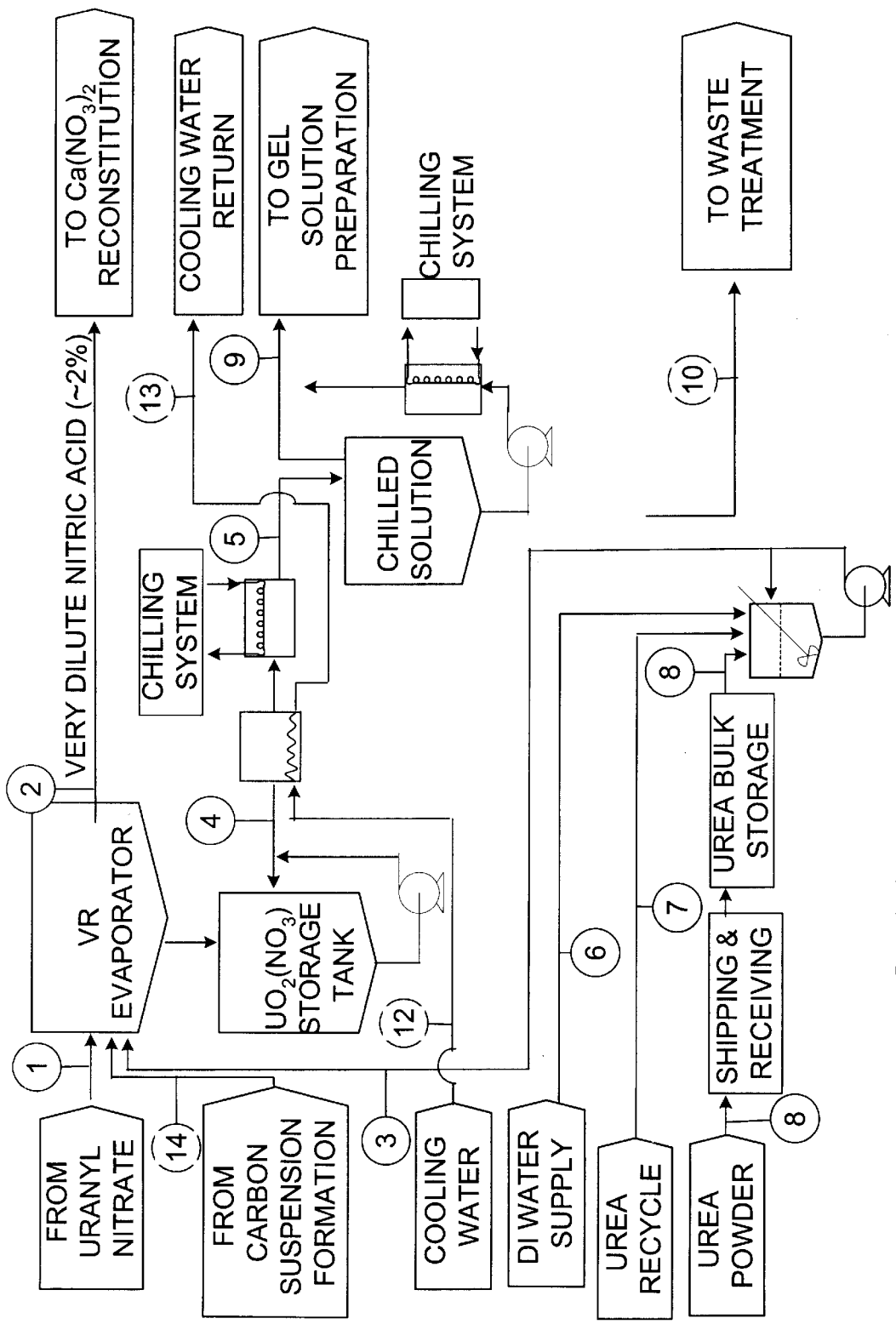
FIG. 4.6.2A

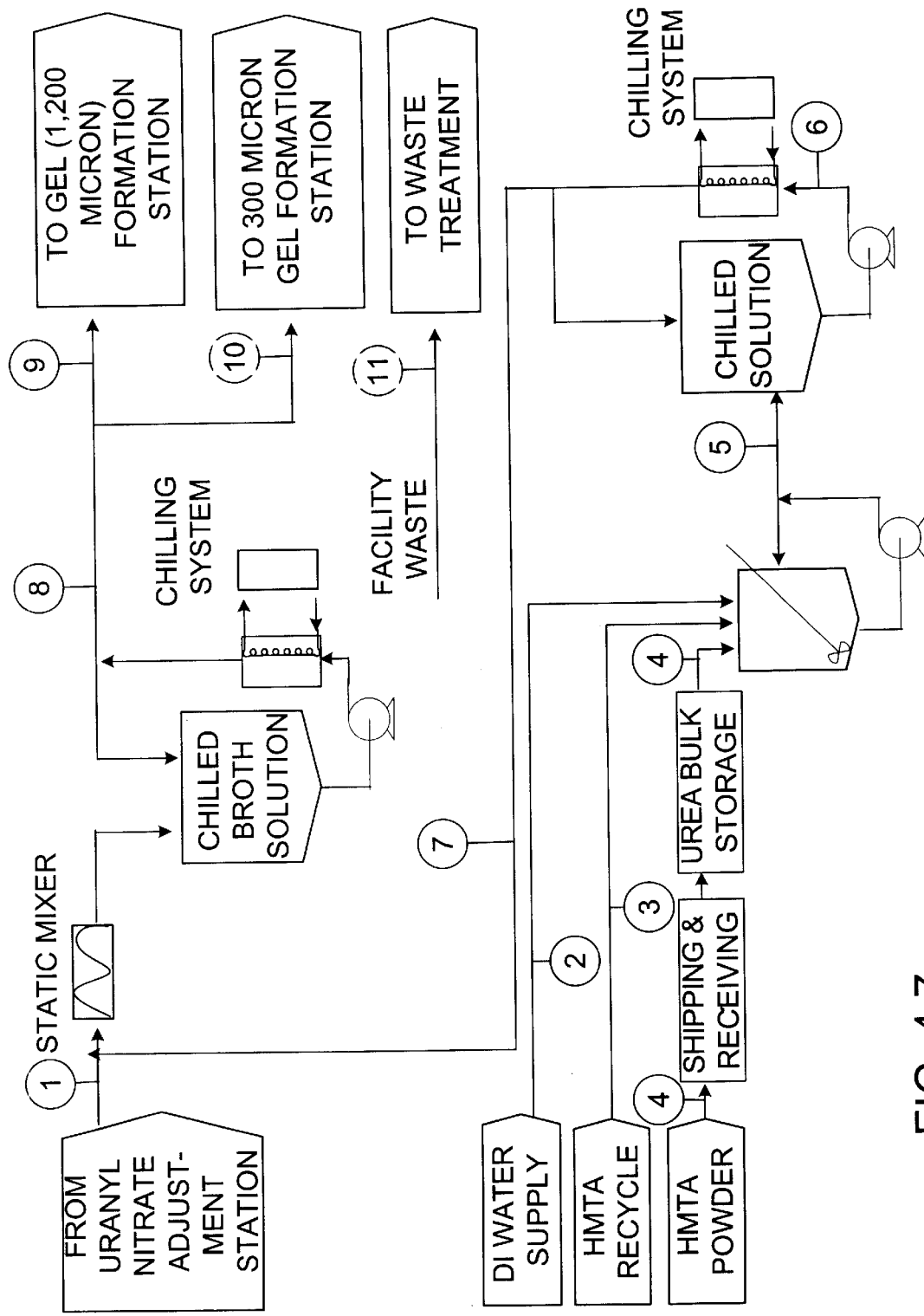
FIG. 4.7

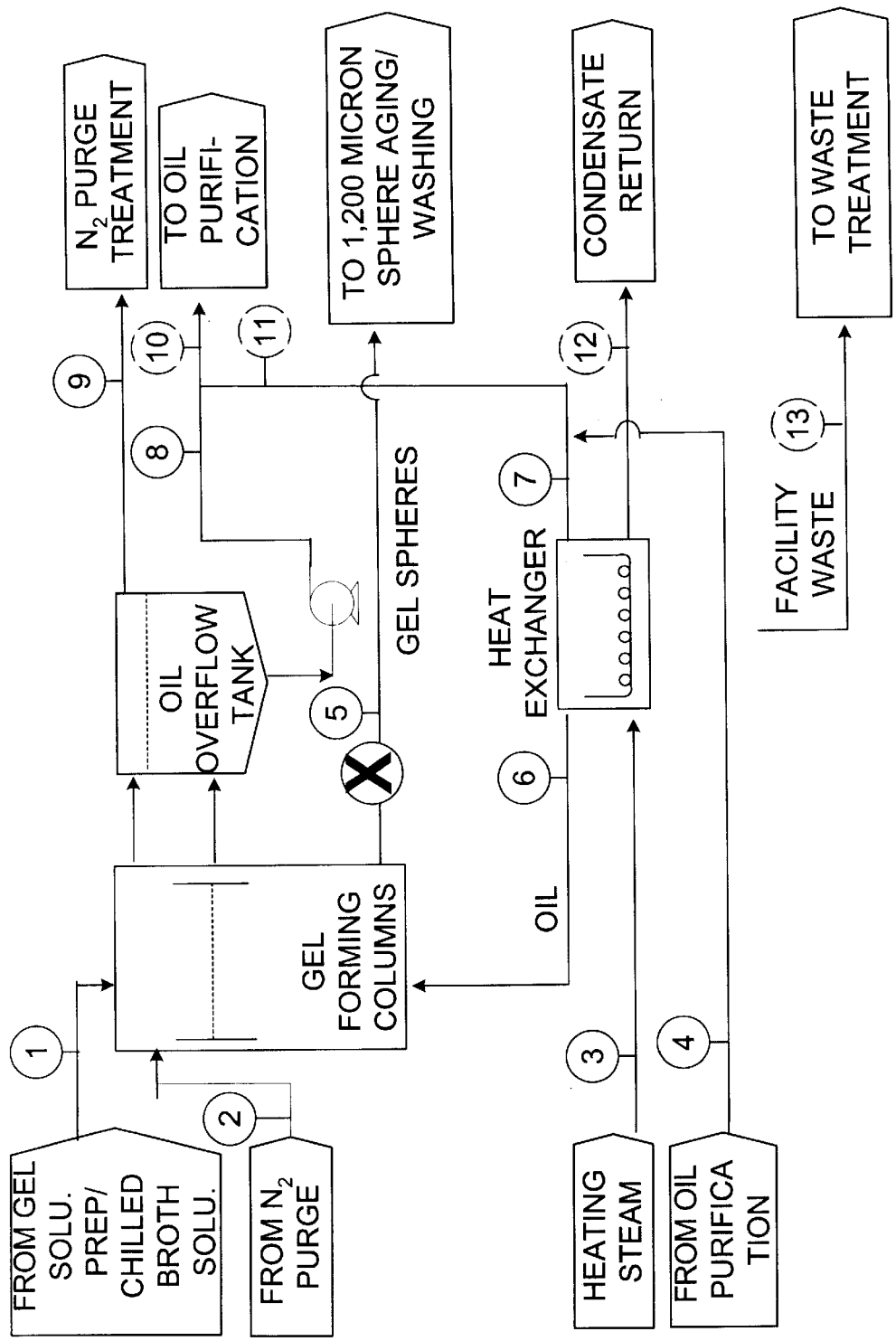
FIG. 4.8

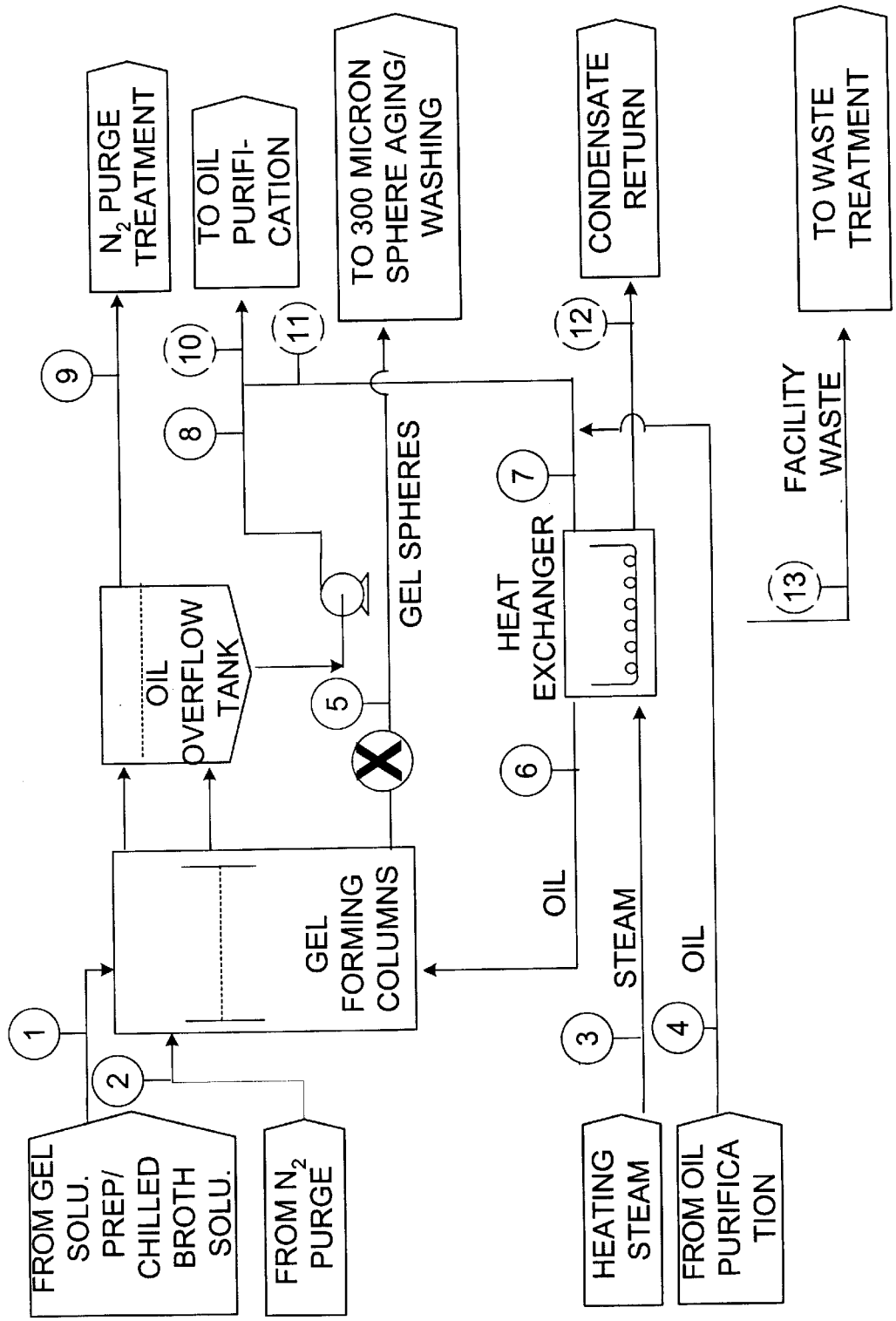
FIG. 4.9

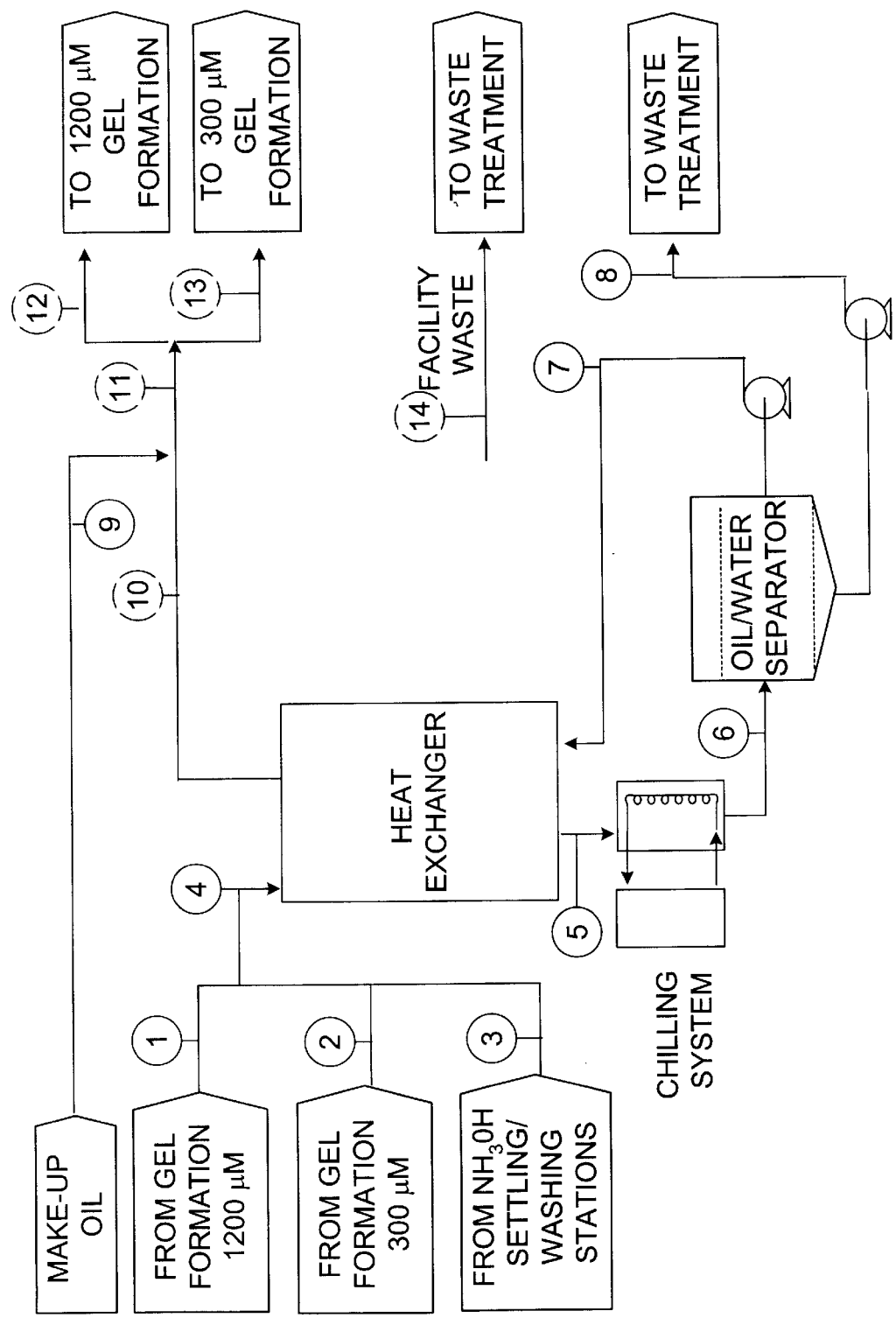
FIG. 4.10

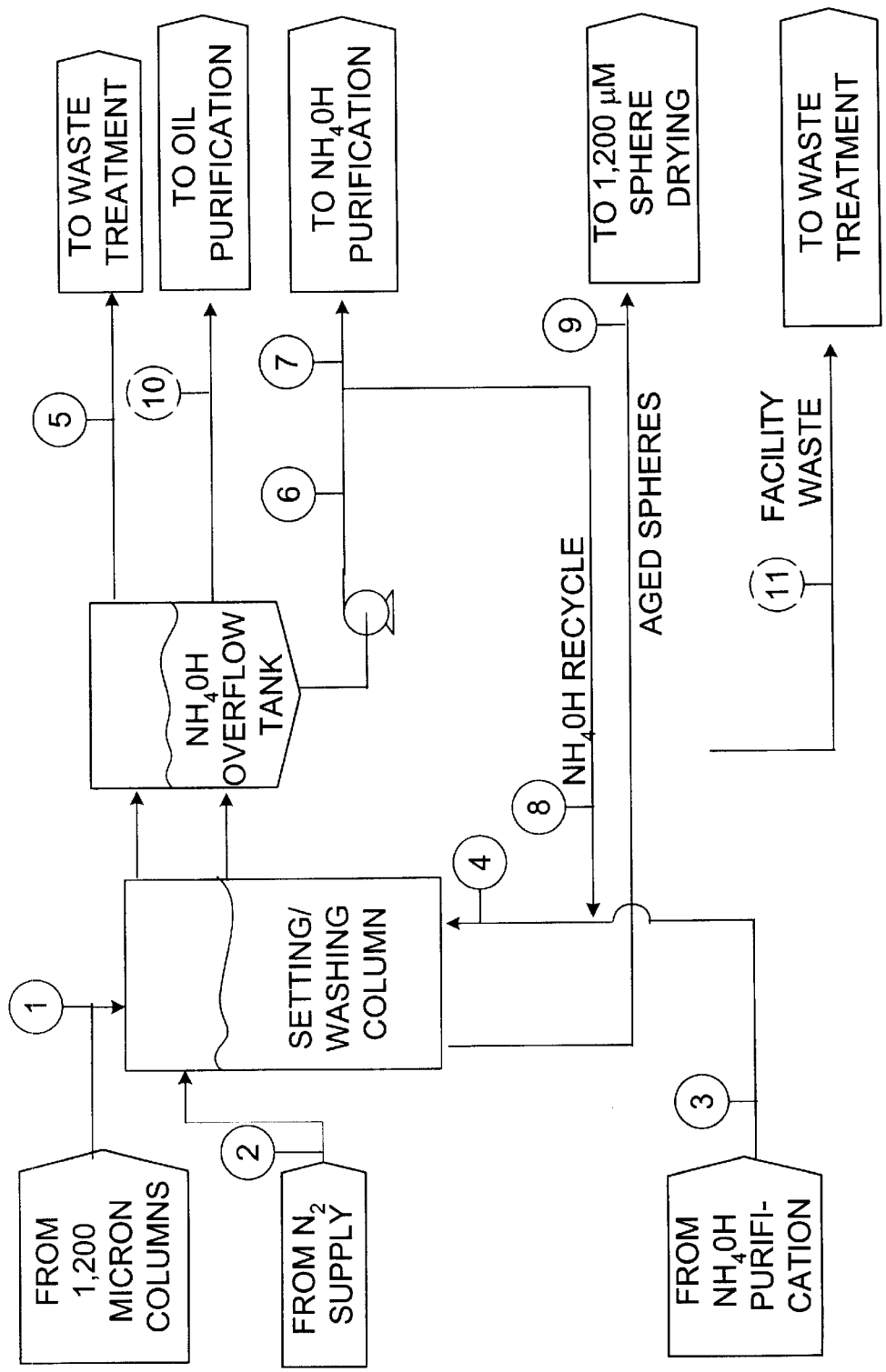
FIG. 4.11

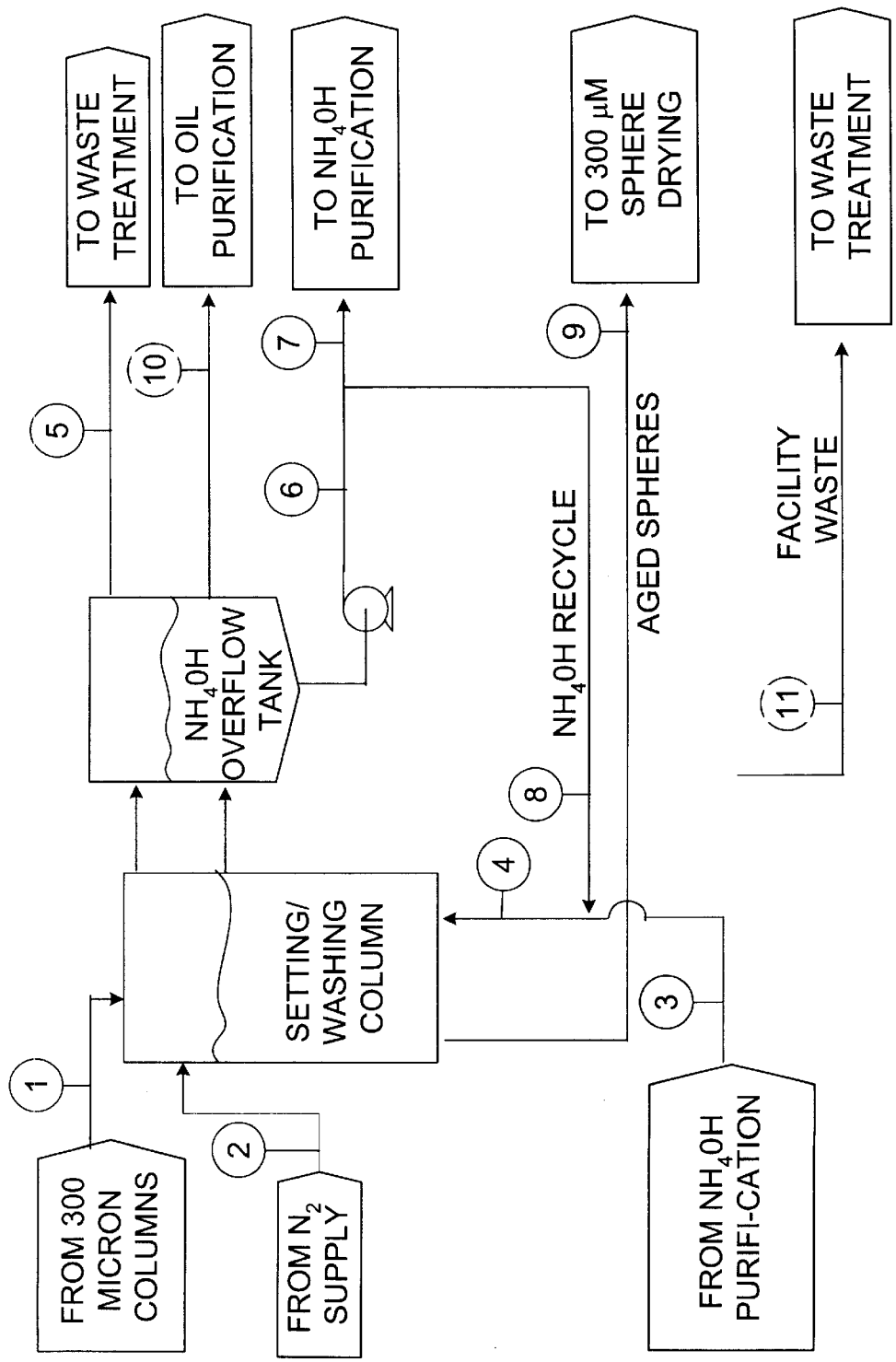
FIG. 4.12

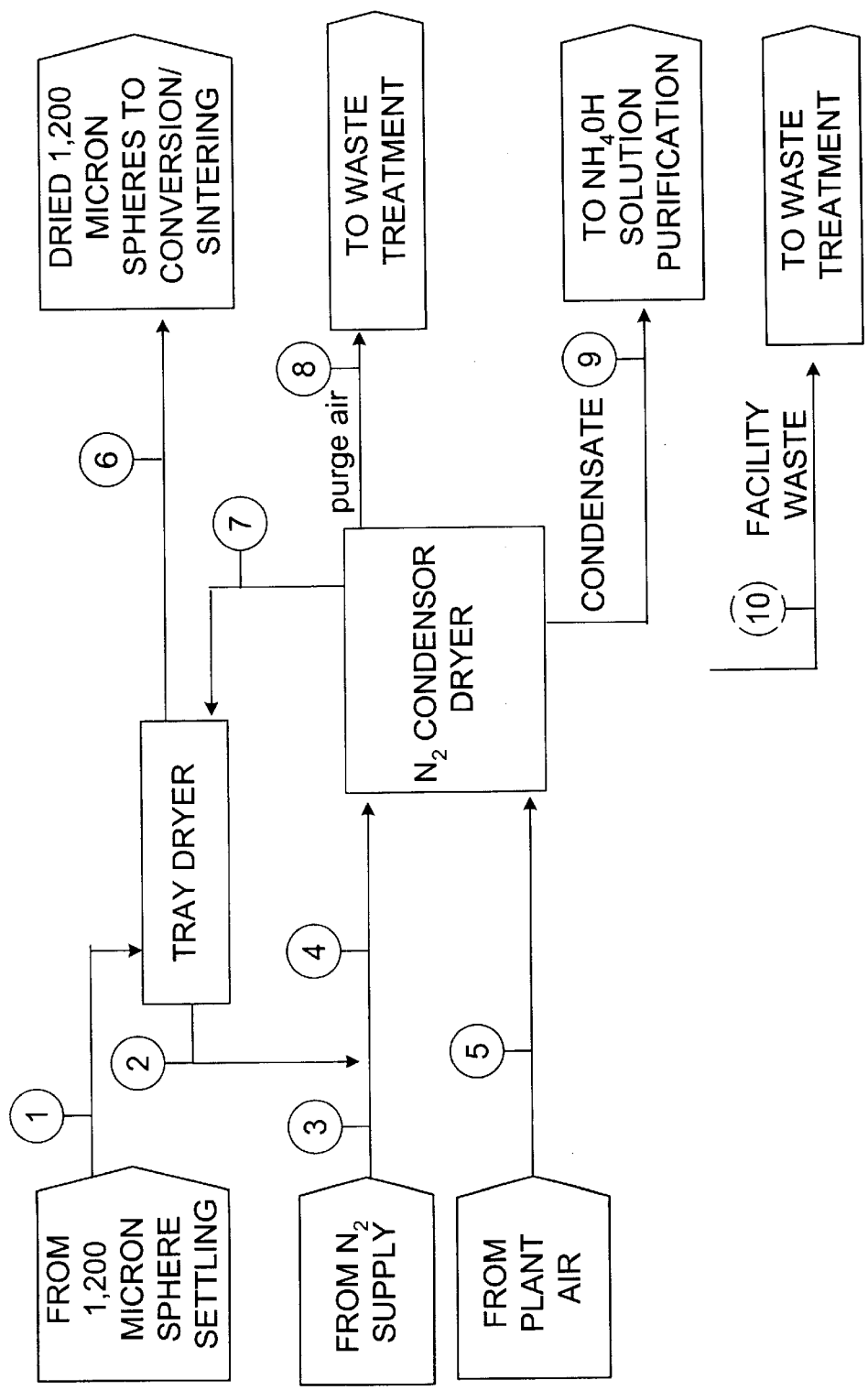
FIG. 4.13

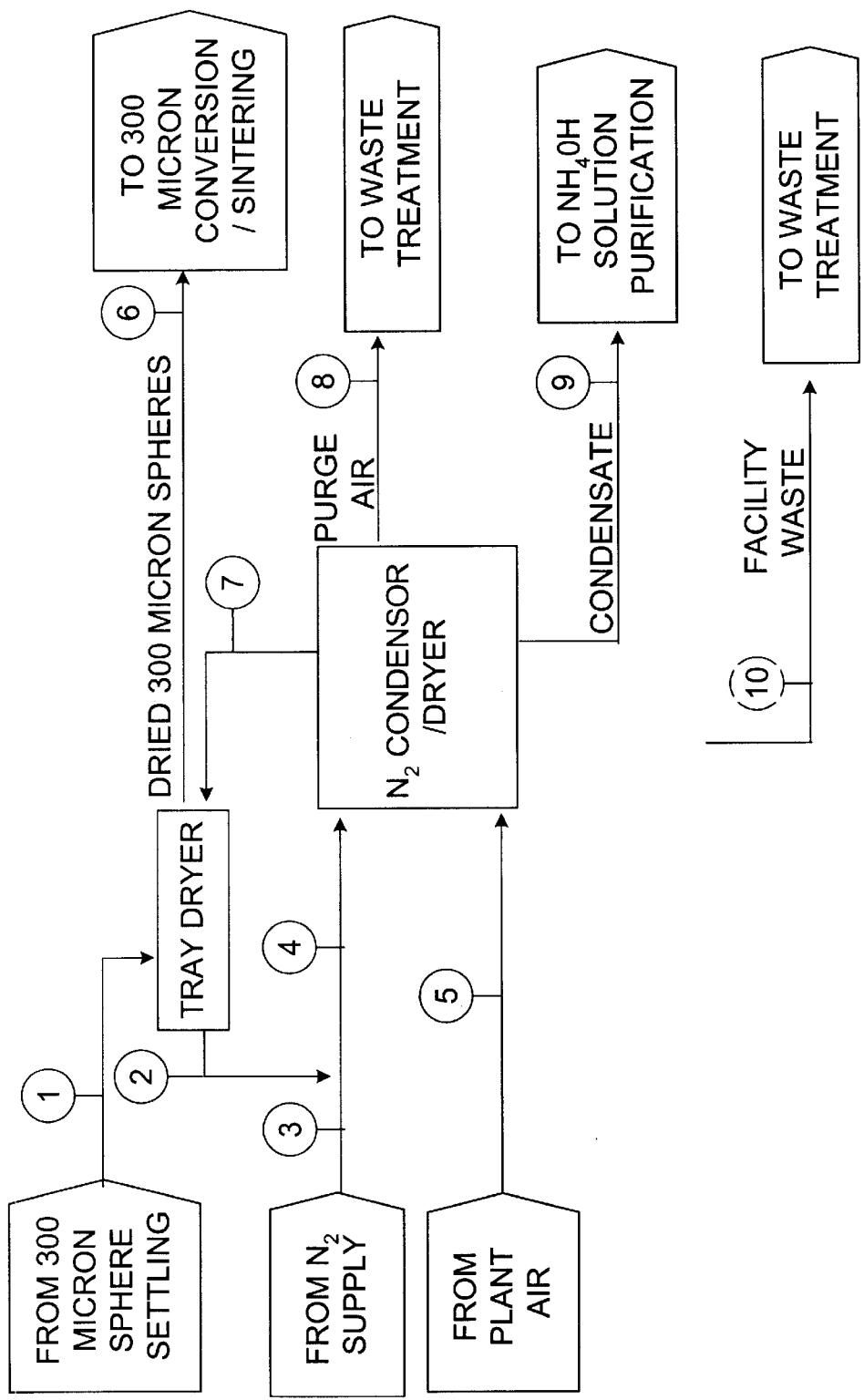
FIG. 4.14

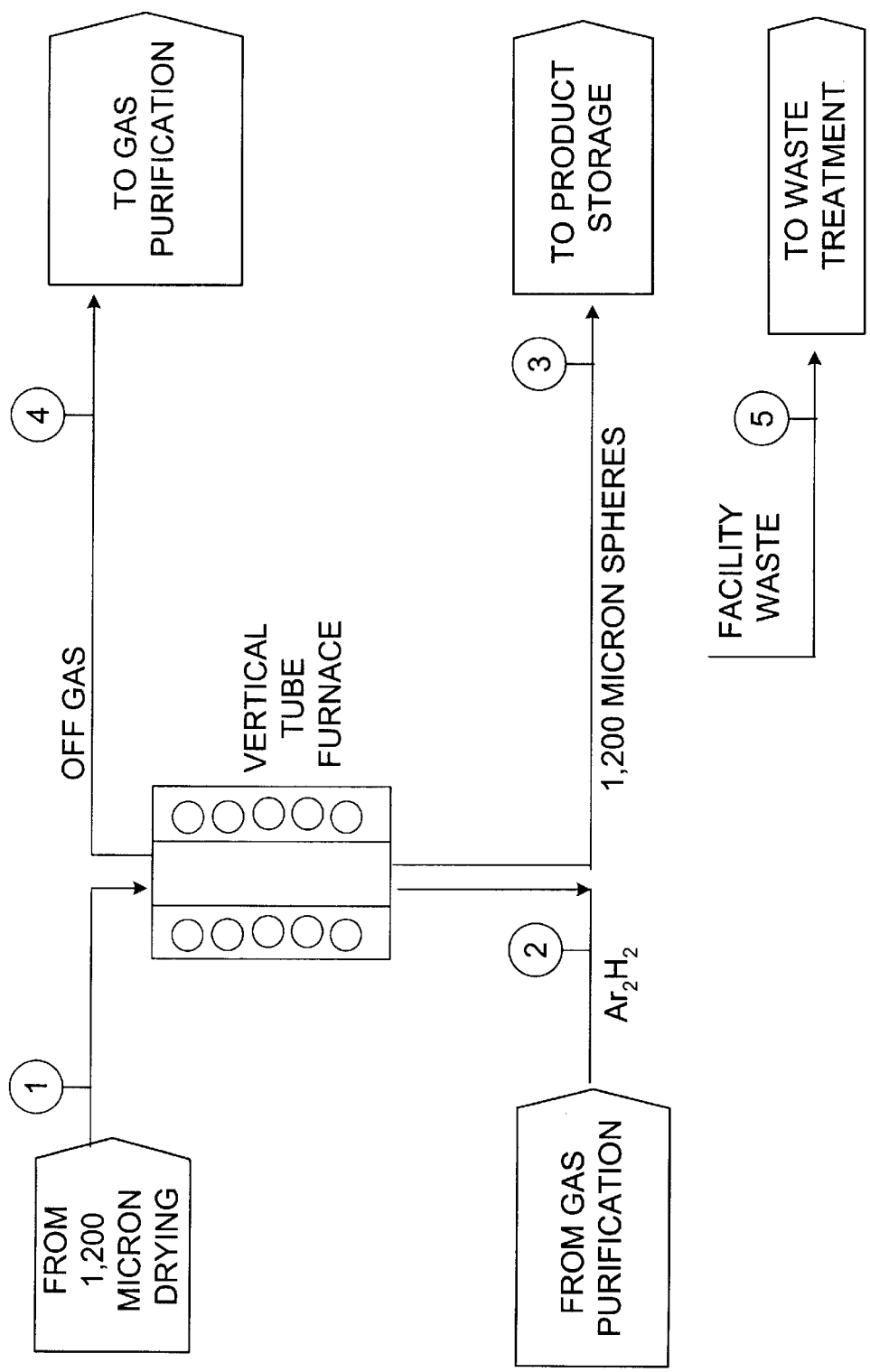
FIG. 4.15

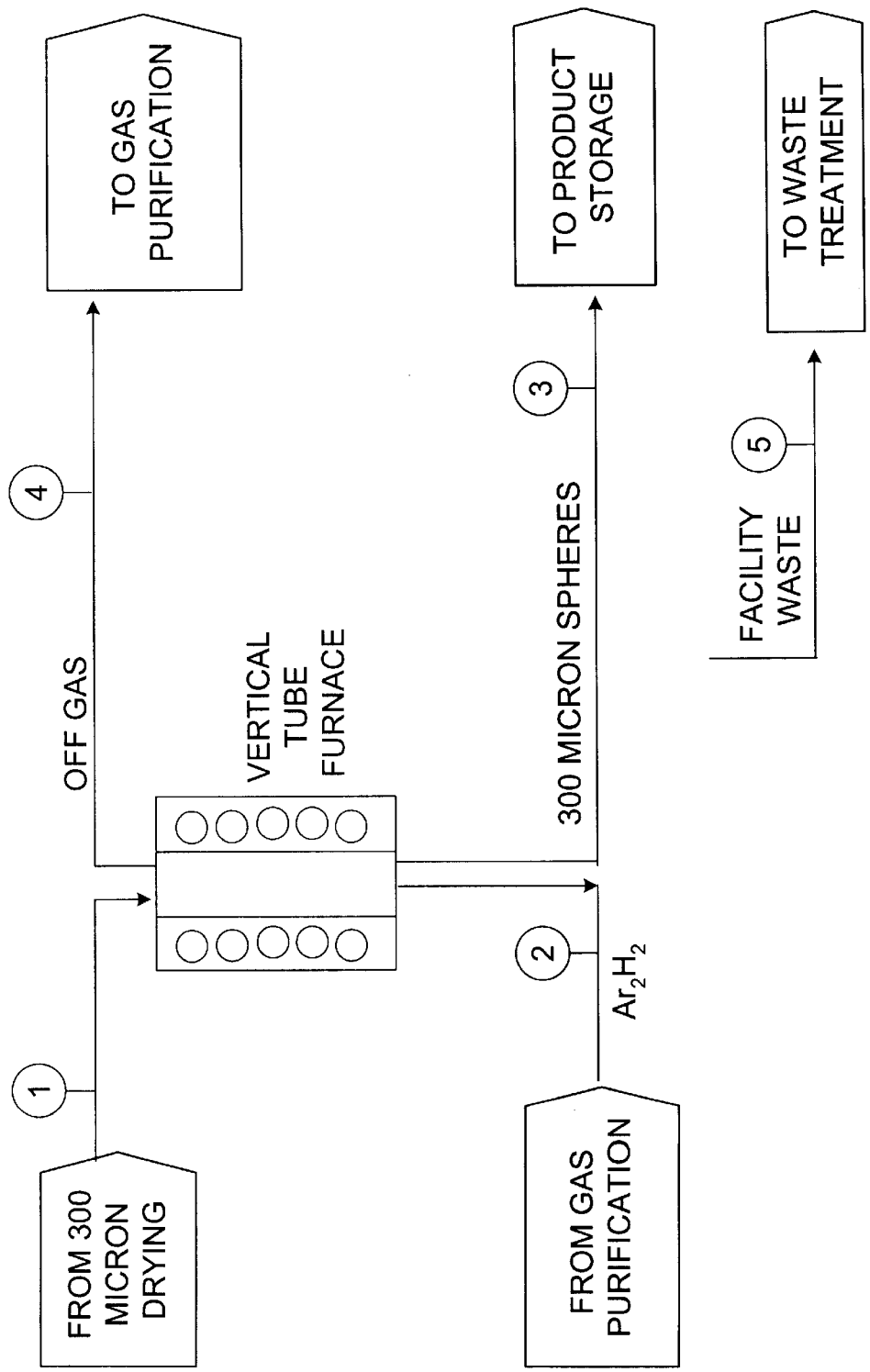
FIG. 4.16

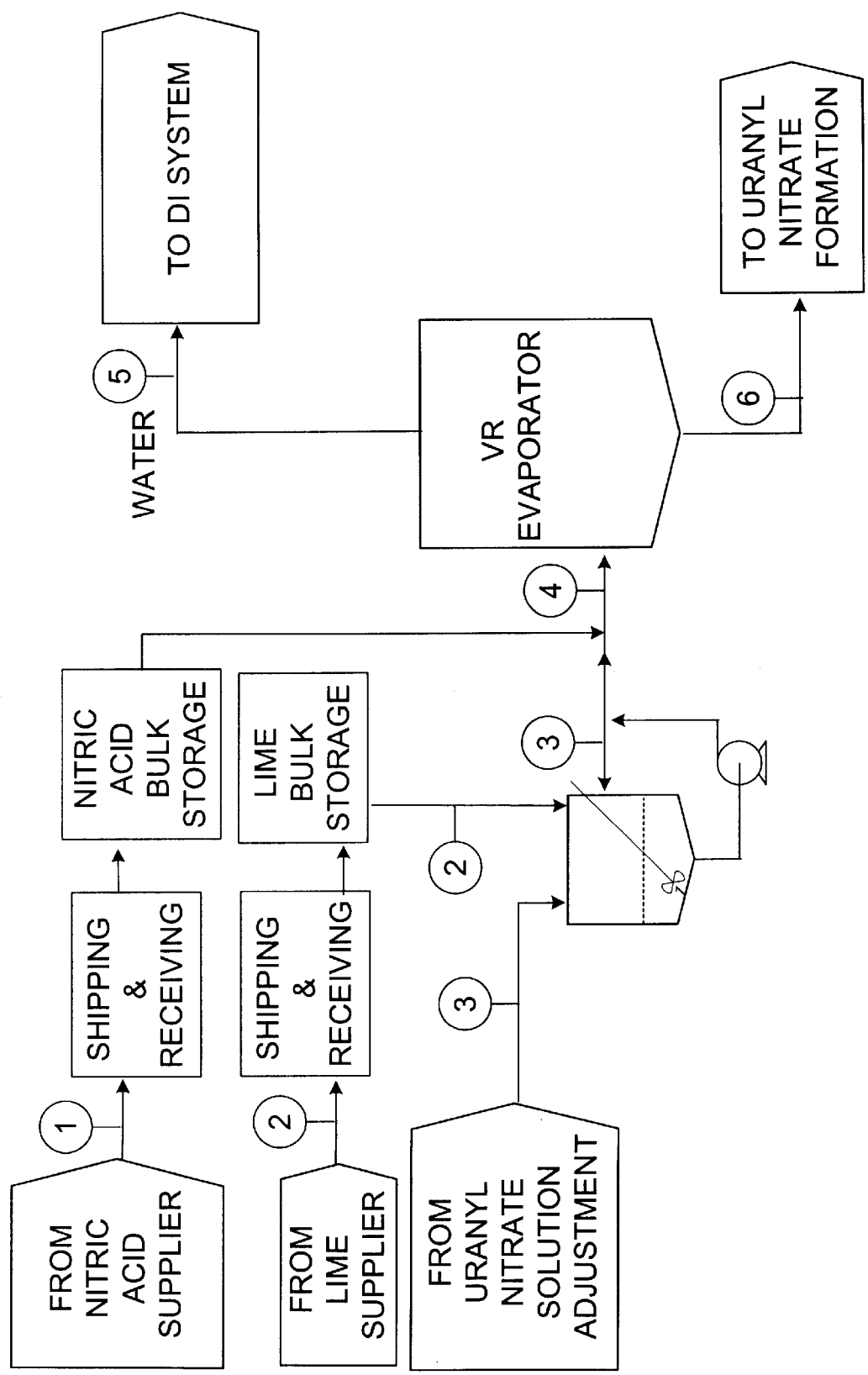
FIG. 4.17

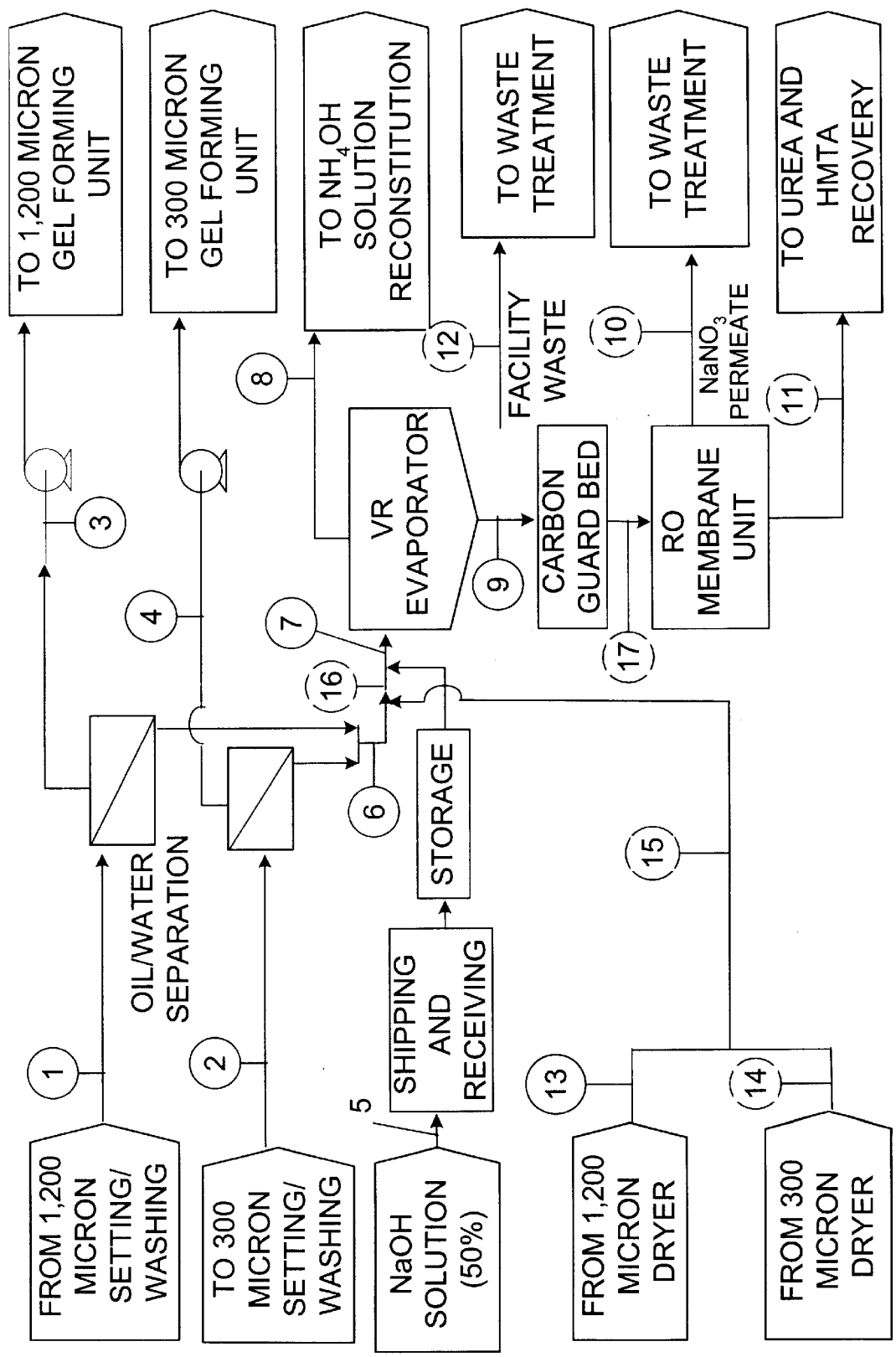
FIG. 4.18

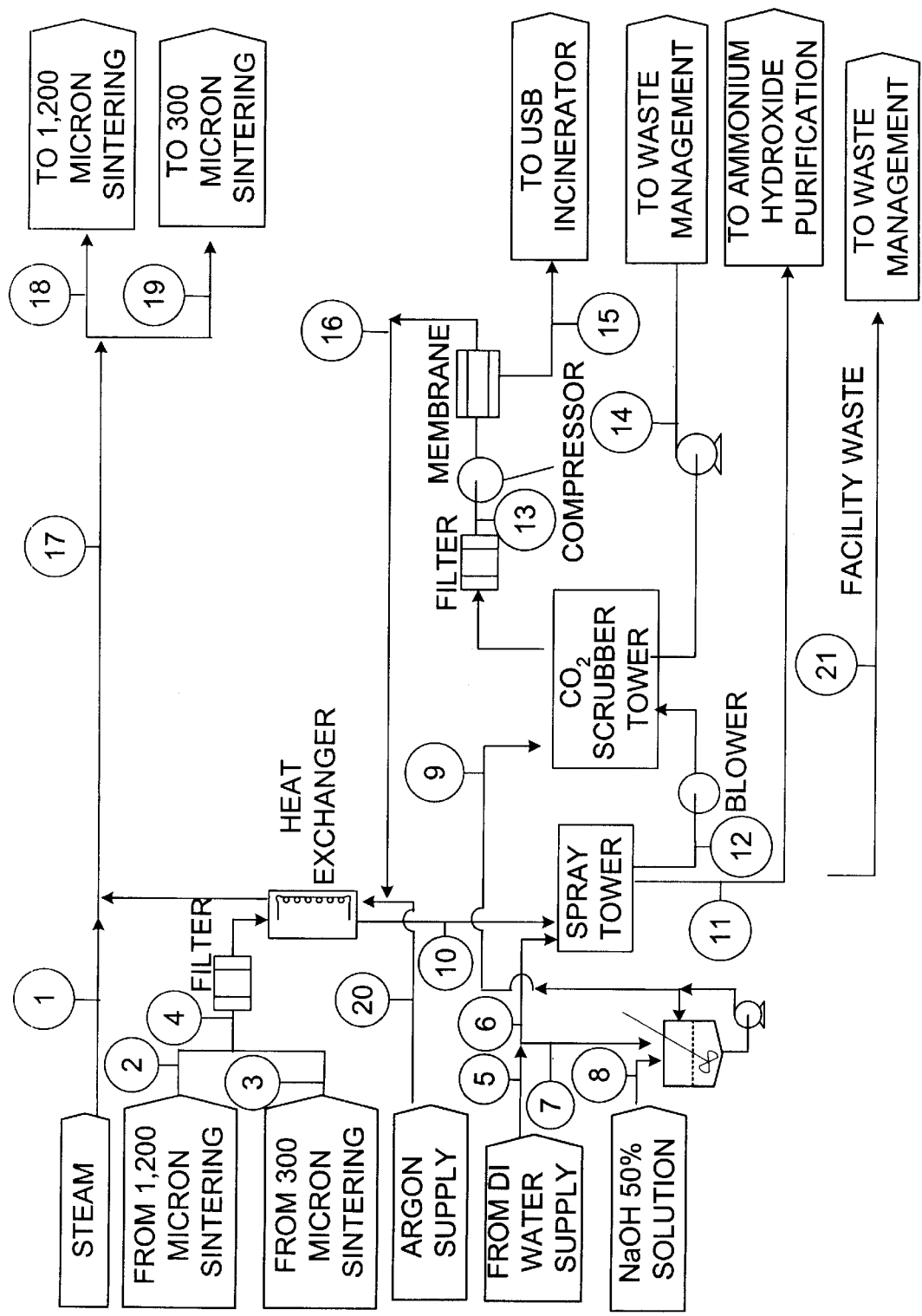
FIG. 4.19

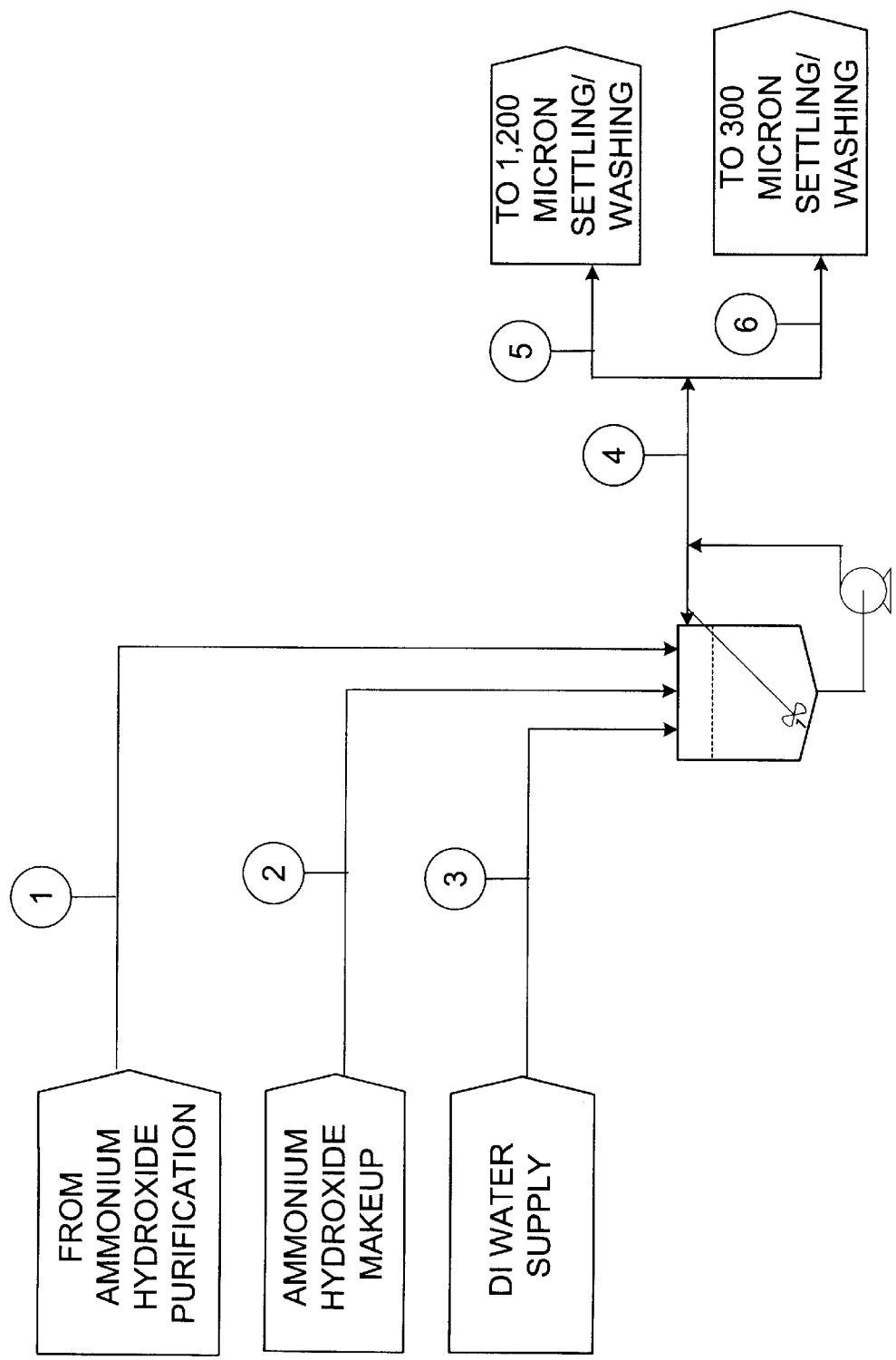
FIG. 4.20

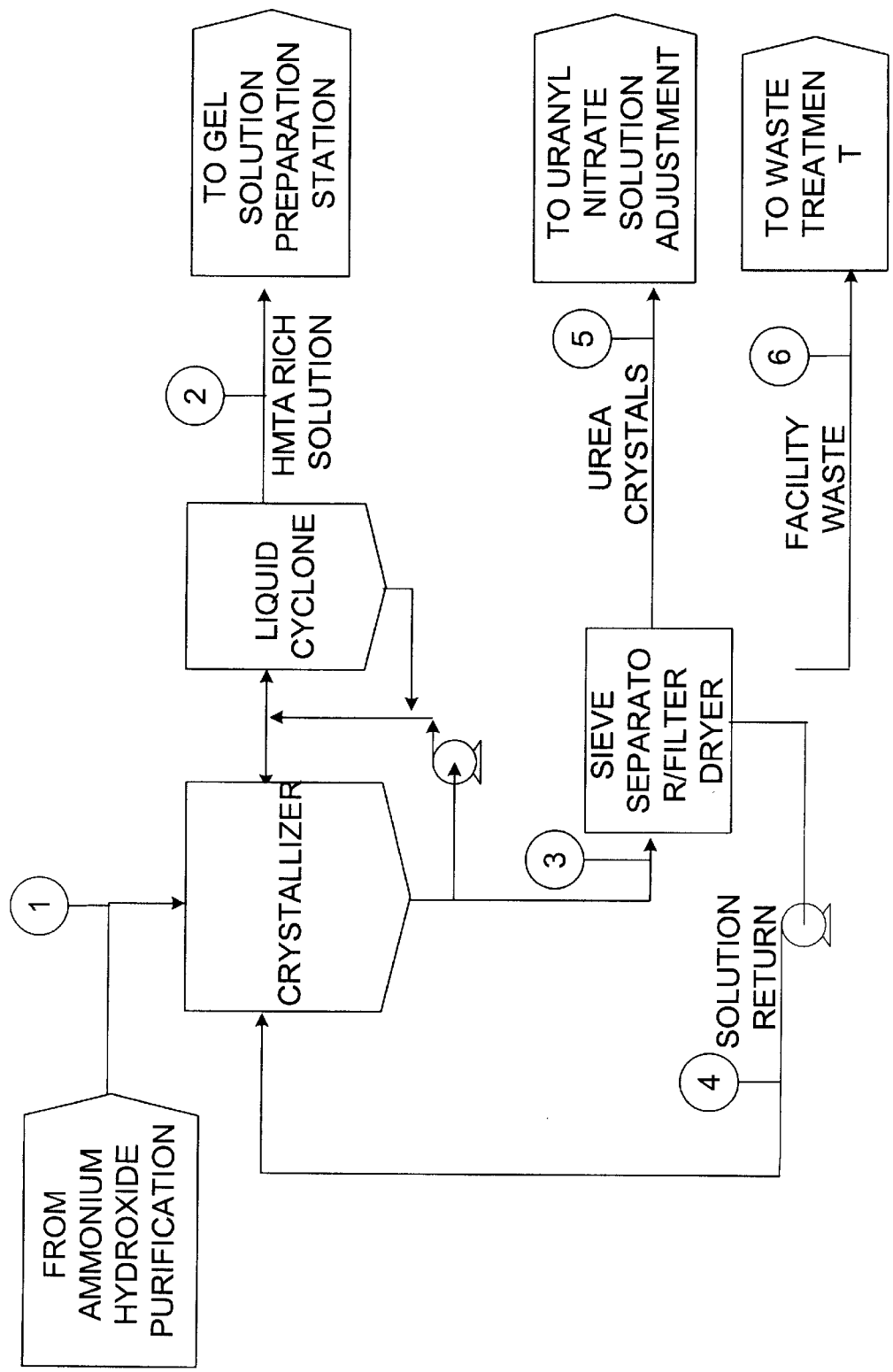
FIG. 4.21

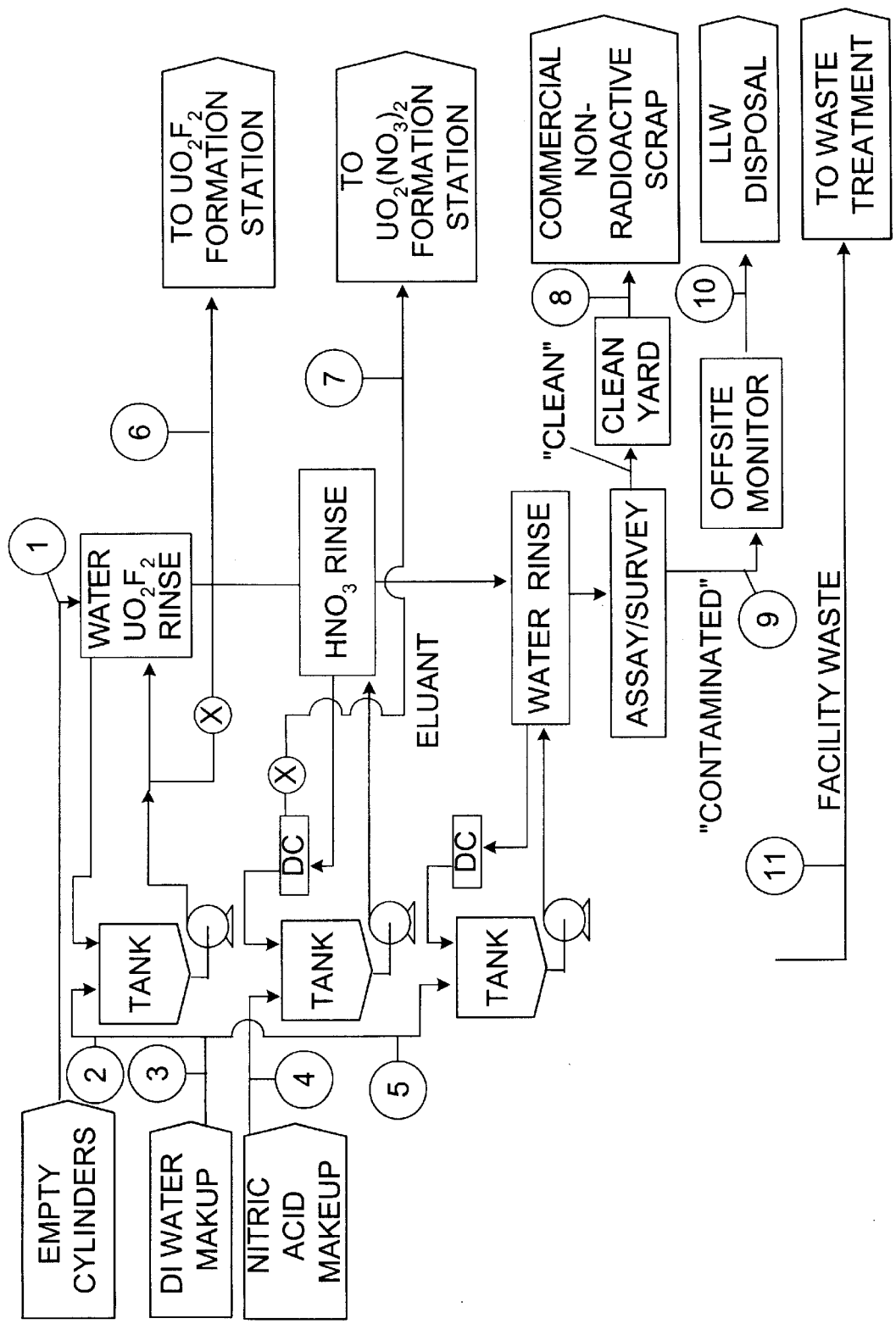
FIG. 4.22

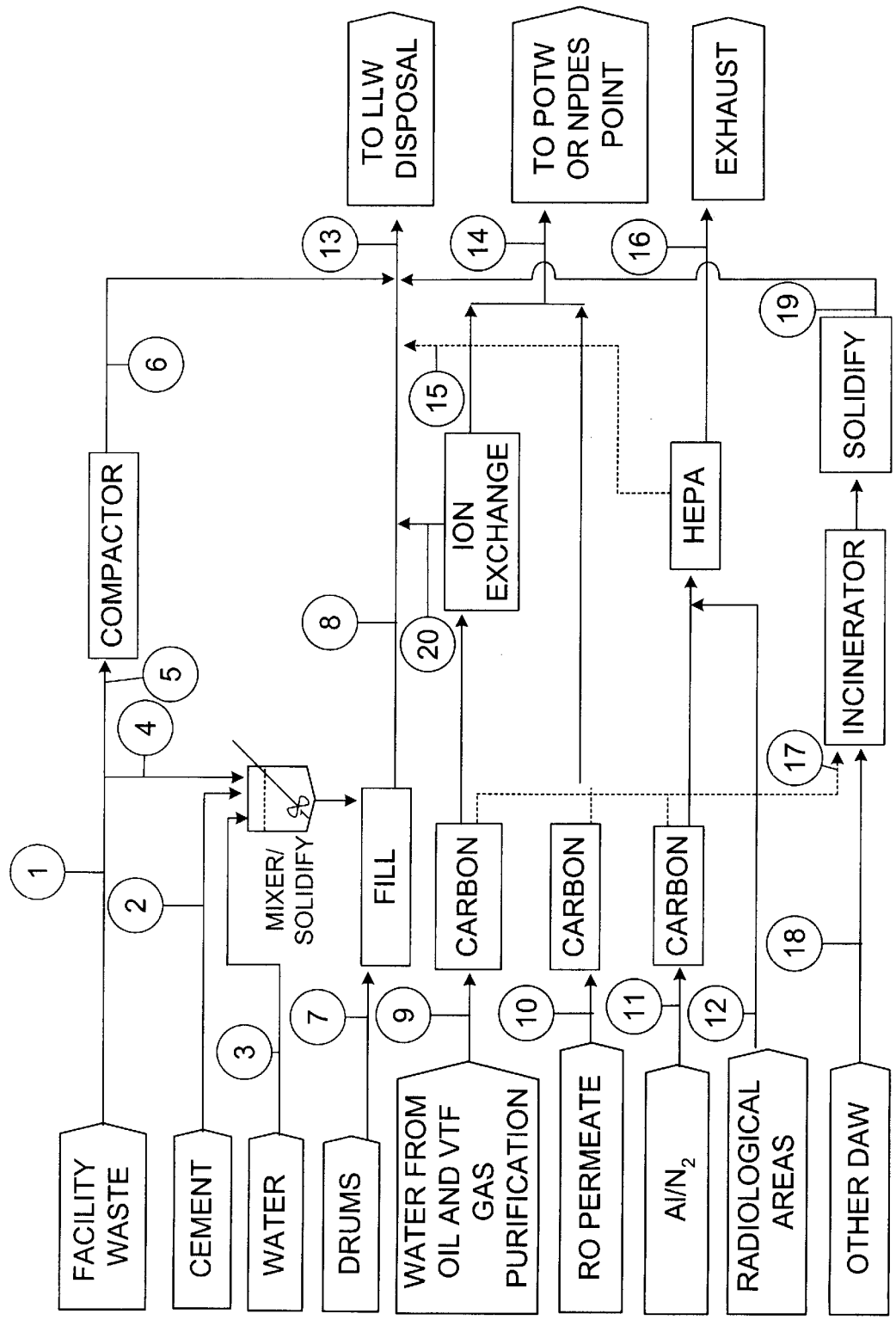
FIG. 4.23

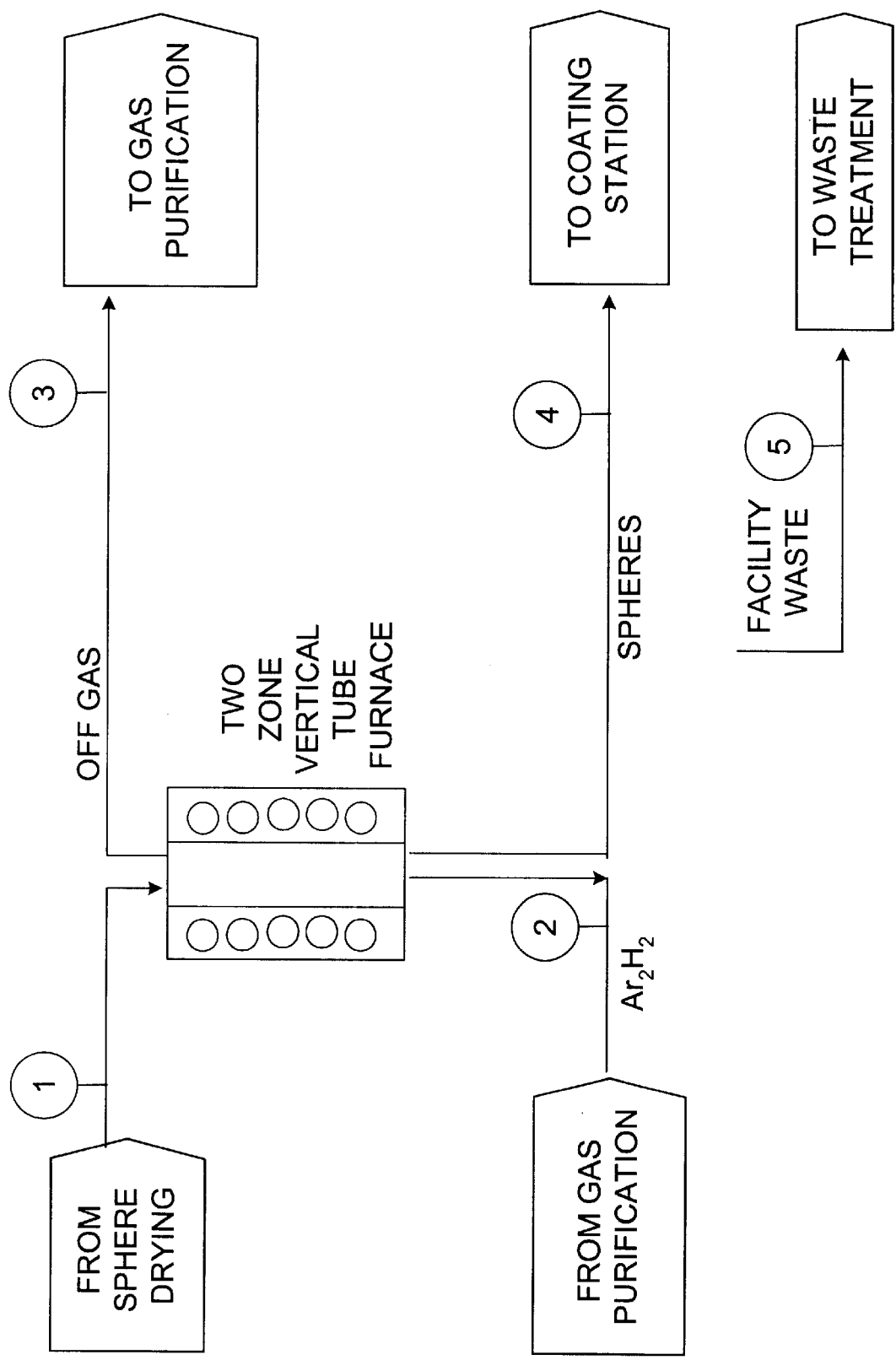
FIG. 4.24

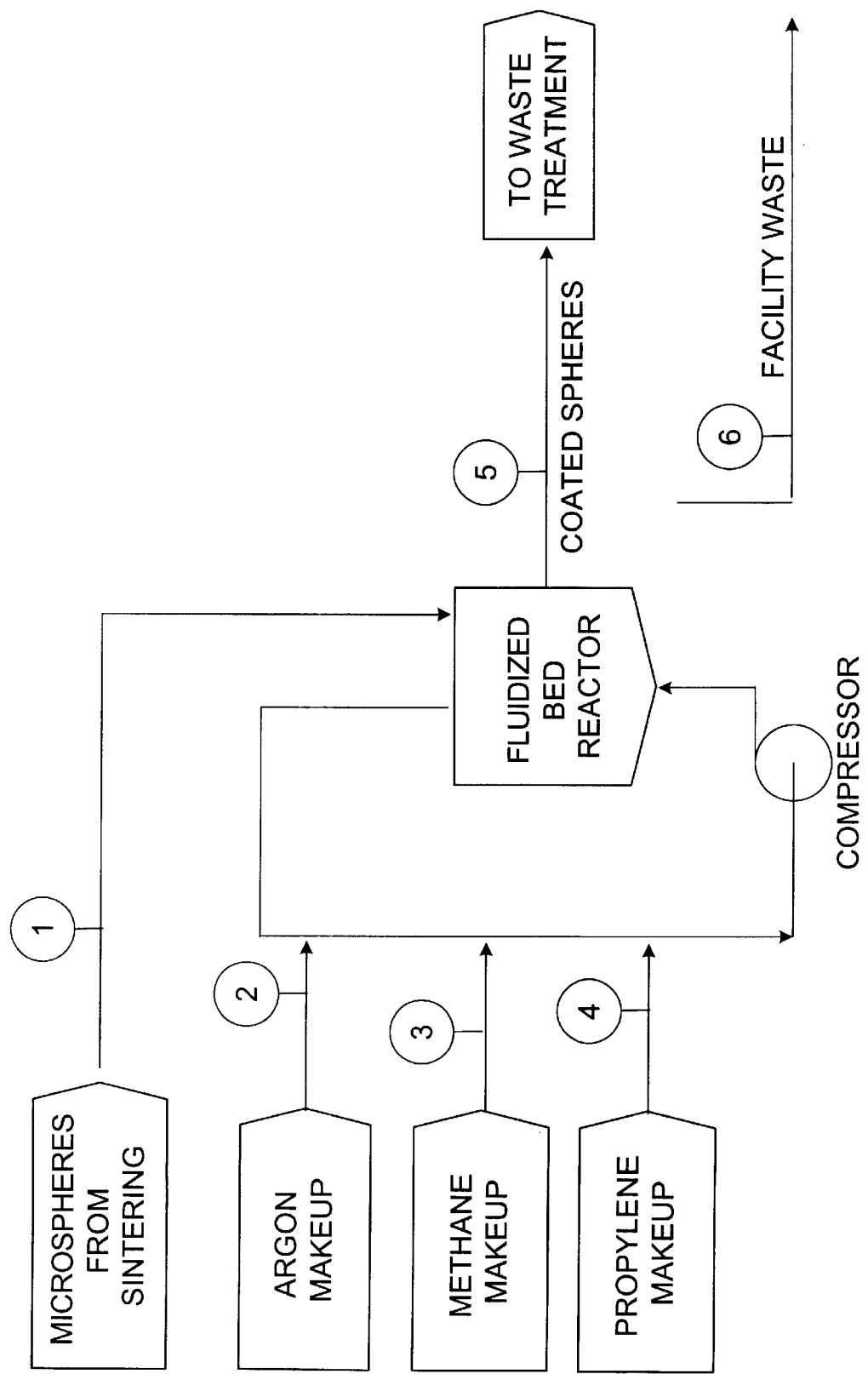
FIG. 4.25

RADIATION SHIELDING MATERIALS AND CONTAINERS INCORPORATING SAME

BACKGROUND OF THE INVENTION

This present invention relates generally to radiation shielding materials, radiation shielding containers and methods for preparing the same. More particularly, the present invention relates to radiation shielding materials incorporating uranium dioxide and/or uranium carbide and containers for radioactive materials incorporating these shielding materials. This invention also relates to methods for preparing uranium dioxide and uranium carbide microspheres for use in the radiation shielding materials of the present invention.

Storage, transportation, and disposal of radioactive waste, such as spent nuclear fuel ("SNF"), high level waste ("HLW"), mixed waste, and low level radiation waste is a growing problem in the United States and abroad. In 1995, the Department of Energy (DOE) estimated that the commercial SNF inventory was about 30,000 metric tonnes initial heavy metal ("MTIHM") and is expected to exceed 80,000 MTIHM within two decades. (1 tonnes=1 metric ton=2,205 pounds). Adding DOE's own inventory of SNF and HLW raises the domestic total to nearly 90,000 MTIHM.

Unfortunately, it appears that many U.S. commercial nuclear power plants do not have sufficient existing storage capacity to accommodate future SNF discharges. Moreover, much of the DOE's SNF and HLW inventory is currently located in unlicensed storage structures. Many of these storage structures will have to be upgraded or replaced, and the SNF and HLW relocated. Thus, there is a need for improved radiation shielding materials and radiation shielding containers incorporating these shielding materials for the storage, transportation, and disposal of radioactive materials, including, in particular, SNF waste.

Two principal types of storage methods are generally used for SNF: wet and dry. In wet storage, the SNF is typically immersed in a lined, water-filled pool which performs the dual functions of shielding and heat removal with the assistance of and reliance on active systems. Wet storage of SNF is generally required for a given period of time (about 5 years) after the SNF has been discharged from a nuclear reactor. Thereafter, the SNF can be placed into long term dry storage. Dry storage encompasses a wide spectrum of structures that house the fuel in a dry inert gas environment, with an emphasis on passive system design and operation. In dry storage, the radioactive material is typically disposed in dry vaults or dry casks. Dry vault installations generally utilize a concrete building or other concrete structure for radiation shielding. Dry cask storage, on the other hand, utilizes prefabricated containers including an appropriate shielding material. Because dry cask storage is usually accomplished more quickly and cheaply, it is generally preferred over vault storage. Dry cask storage is also preferred at sites having an existing infrastructure for receipt, examination, and loading of SNF for economic and scheduling reasons.

The design and manufacture of a suitable container for the dry storage of SNF involves a variety of factors, such as (1) subcriticality assurance, (2) shielding effectiveness, (3) structural integrity (i.e., containment), (4) thermal performance, (5) ease of use, (6) cost, and (7) environmental impact. Other factors that may affect the selection process are whether the design has been previously licensed and actually used to store SNF, or, if the design has not been licensed, its perceived ability to meet applicable regulations and standards.

The first factor in designing a storage container is the maintenance of subcriticality. In dry storage, the subcriticality design relies on controlling the fissile SNF and SNF spacing, and sometimes incorporates the use of neutron-absorbing materials. The subcriticality control design of dry storage containers is generally acceptable and does not typically provide any discriminating factors for selecting one design over another.

The second factor in designing a storage container is shielding effectiveness. Shielding effectiveness affects both onsite worker and public dose rates during the loading and subsequent storage of SNF. Both neutron and gamma ray shielding must be provided and ensured throughout the life of the storage system. Dry storage technology relies on a number of solid shielding materials, sometimes in combination, to reduce gamma and neutron dose rates. The most common solid shielding materials are different forms of concrete (low-density, high-density, or hydrogenated), metal (ductile cast iron, carbon steel, stainless steel, lead), borated resin, and polyethylene (for neutrons). Often, in order to function effectively, metal shielding materials must be combined with additional materials to enhance their neutron absorbing ability.

The third factor in designing a storage container is structural integrity (i.e., containment). Structural integrity ensures that the confinement boundary around the SNF is maintained under all operational and postulated accident conditions. All SNF storage technologies are required to meet the same standards for structural integrity in accordance with appropriate codes. Therefore, the selection of a suitable storage technology will include consideration of the structural integrity of the proposed design.

The fourth factor in container design is thermal performance. With the exception of steel and cast iron, most shielding materials have inherent limiting temperatures (i.e., a maximum allowable temperature that is lower than the fuel cladding temperature limit). Shielding material thermal limits include both absolute values of temperature and, in the case of concrete, temperature gradients that create thermal stresses. Adequate decay heat removal is vital to preventing degradation of the fuel cladding barrier to fission product releases.

Dry storage containers rely on a combination of conduction, convection (natural or forced), and radiation heat transfer mechanisms to maintain fuel cladding temperatures below appropriate long term storage limits. In particular, metal casks rely on a totally passive system for heat removal. The fuel decay heat, in an encapsulating inert gas atmosphere canister, is transferred to the canister's walls by a combination of radiation and conduction heat transfer. The canister walls, which are in contact with the metal cask wall, transfer this heat by conduction. At the outside of the metal cask, the heat is removed by conduction and natural convention to the environment. Metal cask typically are not susceptible to thermal limits, since the metals have a higher temperature limit than that of the fuel cladding. However, in those embodiments where the metal casks incorporate additional neutron shielding materials their favorable heat-transfer properties may be compromised.

As with metal casks, concrete casks use a passive heat removal system. Concrete casks, however, have an inherent vulnerability, because concrete's thermal conductivity is a factor of 10 to 40 lower than that of metal. Thus, in order to remove fuel decay heat and stay below both the fuel cladding and concrete temperature limits, concrete casks must include labyrinthine airflow passages that allow natural convection-driven air to enter the cavity enclosing the canister inside the concrete and then exit through higher elevation passages in the concrete to the enviromnent. The need for these airflow passages introduces the possibility of an accident in which adequate heat removal is reduced or eliminated because of inlets and/or outlets that are blocked by debris, snow, or even nests and hives. As a result, concrete casks require surveillance of their air inlet and outlet flow passages, thereby increasing the associated life-cycle costs and personnel radiation exposures.

The fifth factor in designing a storage container is ease of use, which is defined as the lack of complexity involved in the operation and maintenance of SNF. As noted above, the existence of labrynthine air passages in concrete casks means that additional operation and maintenance is required. Ease of use, however, is also related to the complexity associated with loading, transport, and storage of SNF. Thus, the weight and size of containers are also of particular importance. For example, since many existing storage sites are already equipped with a crane in the storage and receiving facility, it is desirable to utilize containers with weights that are within the typical crane capacity of 45 to 91 tonnes. Metal casks generally cannot be used with such cranes, because the weight of a fully-shielded metal cask loaded with a large number of SNF elements can easily exceed the 91 tonnes limit. Thus, even though metal casks have desirable heat transfer characteristics, the additional weight and size associated with metal systems limits their applicability.

Additional size and weight limits are imposed when containers are transported. The U.S. Department of Transportation and state highway regulations generally limit the gross weight of a waste-carrying road vehicle to about 80,000 pounds. Since the typical tractor trailer weighs about 30,000 pounds, the weight of a transportation container and its contents should not exceed about 50,000 pounds. Heavier weights can be transported by rail, but maximum container widths (diameters) are limited to approximately 9 feet to allow for adequate clearance between tracks. U.S. Nuclear Regulatory Commission regulations require that the container provide certain levels of shielding and be capable of sustaining certain impact stresses without yielding the waste. The end result of these regulations is that much of the available weight for the transportation container and its contents must be expended in providing adequate shielding and a shell that can withstand the designated impact stresses. The resulting thickness of the container walls leaves a relatively small amount of space in the container for SNF.

The sixth factor in designing a storage container is cost. Concrete casks are generally the least expensive, with a typical cost of about $350,000 to $550,000, versus $1 million to $1.5 million for their metal cask counterparts.

The seventh factor in designing a storage container is enviromnental impact. Over time, environmental mechanisms can degrade storage containers, possibly exposing the SNF directly to groundwater or air. Storage containers and shielding materials that minimize degradation arc preferred for long term storage and disposal.

In summary, metal casks are desirable because they are known to provide effective heat transfer and structural integrity. Unfortunately, metal casks are heavier and more expensive than concrete casks. Furthermore, in most SNF applications, metal casks must incorporate separate neutron shields, which may compromise their favorable heat transfer properties.

Thus, there is a significant need for improved, lower weight and higher heat-transfer shielding materials and, also, for containers for handling, storage, and disposal of radioactive waste that are superior in performance, size and cost, while providing acceptable structural strength, shielding effectiveness, and carrying capacity.

In light of the shortcomings associated with existing dry storage containers and the need for long term management of existing inventories of SNF, the DOE began to examine alternative means for the transportation, storage and disposal of such waste. As a result of its investigation, the DOE recommended that the transport and emplacement of commercial spent fuel into a DOE waste repository be accomplished using a class of containers known as the Multi-Purpose Cask (MPC) and Multi-Purpose Unit (MPU). MPC/MPU containers are intended to perform the three functions of storage, transport, and disposal by direct emplacement into a waste repository. The MPC is a thin-shelled container, without shielding, which, once filled, is not intended to be opened. Proposed MPC/MPU designs use metal canisters requiring massive fabrication techniques. As a result, the estimated costs are three to six times greater than that of concrete cask designs. Furthermore, the MPC containers hold approximately 12% less SNF than that of concrete storage casks. Finally, since the MPC casks do not include shielding, these casks must be outfitted with overpacks consisting of thick-walled steel and, typically, a separate, neutron-absorbing material to provide shielding.

Meanwhile, the DOE was investigating management options and alternative uses for large quantities of depleted uranium hexafluoride ("$DUF_6$") stored at gas diffusion plants. Among the various disposal options considered by the DOE was conversion of the uranium hexafluoride to uranium metal, which could be machined for use as a radiation shielding material. However, the high costs of uranium metal production (around $10/kg), combined with the handling, machining, and environmental costs associated with the use of uranium metal have historically limited its use to only a few small applications. In connection with the design of the MPC and MPU, for example, the DOE proposed that depleted uranium metal be used as an axial shield plug in the MPC and as a gamma shielding material for the MPU during transport.

Other applications of depleted uranium metal in the fabrication of storage containers includes a container made from a composite containing a fibrous mat of interwoven metallic fibers encased within a concrete-based mixture that can include depleted uranium metal. Another proposed application includes a depleted uranium metal core for absorbing gamma rays and a bismuth coating for preventing chemical corrosion and absorbing gamma rays. Alternatively, a sheet of gadolinium may be positioned between the uranium metal core and the bismuth coating for absorbing neutrons. The containers can be formed by casting bismuth around a pre-formed uranium metal container having a gadolinium sheeting, and allowing the bismuth to cool.

Still another proposed application incorporates a depleted uranium metal wire wound on the inner shell of a cask to create a radiation shield. And yet another proposed application utilizes a composite radiation shield made up of rods of depleted uranium metal. The spaces between the rods contain smaller rods and are backfilled with lead or other high-density material. Still other designs utilize pipes of depleted uranium metal, tungsten, or other dense metal, encapsulating polyethylene cores, dispersed in rows of concentric bore holes around the periphery of the cask body. None of these existing designs, however, provides a simple, low-cost, low-weight radiation shielding system for transportation, storage, and disposal of radioactive waste.

Uranium compounds have also been proposed for use as shielding materials. For example, some investigators have proposed that depleted uranium dioxide ($DUO_2$) pellets be mixed with a cement binder to form a material known as DUCRETE, which could be used as a shielding material in dry storage containers. The $DUO_2$ pellets replace the gravel aggregate normally used in concrete. Due to the increased density of $DUO_2$, however, the thickness of the shielding layer can be reduced. Thus, a storage container made from DUCRETE will have a greatly reduced weight and diameter compared to conventional concrete casks. In a typical cask, for example, the outer shell thickness can be reduced from approximately 2.5 feet for concrete to approximately one foot with DUCRETE. As a result, the cask diameter is reduced by approximately two-thirds, and the weight is reduced from approximately 123 tonnes to approximately 91 tonnes.

Despite these improvements in size and weight, however, DUCRETE casks systems suffer from disadvantages similar to those experienced with concrete casks. In particular, since DUCRETE has a low thermal conductivity and low temperature limit, DUCRETE casks must also incorporate labrynthine ventilation gaps. Furthermore, it is not expected that DUCRETE will be able to retain the uranium dioxide pellets in its cement matrix for a long period of time due to its high porosity of concrete and to the likelihood of water-cement-uranium dioxide reactions at warm temperatures (90–300° C.). DUCRETE may also be incompatible with expected repository requirements. Hence, the use of DUCRETE in significant quantities for SNF disposal is questionable.

Nuclear fuel manufacturing plants produce small particles of uranium dioxide and uranium carbide by powdered metallurgical processes. These processes generally involve production of a powder of the proper particle size and range, which is then pressed into pellets, sintered, and ground to size. Even though powdered processes have shown success, their capacity is limited due to mechanical complexity, particle size, reactivity, and mass transfer limitations. In practice, line capacities are limited to approximately 100 tonnes/year, and maximum plant sizes to around 1,000 tonnes/year.

It has been proposed that aqueous processes be used to generate uranium dioxide and uranium carbide. Work on aqueous processes, and in particular on aqueous gelation processes, began in the late 1960's. By the mid-1970's pilot-scale facilities for production of uranium oxide and uranium carbide had been constructed. Experimental and pilot plant studies focused primarily on the use of uranyl nitrate solutions. For gelation, these uranyl nitrate solutions were dispersed using single nozzles into columns of chlorinated solvents such as trichloroethylene (TCE) and perchloroethylene. The resulting microspheres were then processed using multiple washing operations with water and ammonium hydroxide. The resulting microspheres, typically 0.03 mm to 2 mm in diameter, were incorporated into cylindrical pellets. Unfortunately, these aqueous processes had small throughputs and the processing was manually intensive. Thus, for planned capacities greater than 100 tonnes/yr, these processes were generally inadequate.

It is anticipated that the demand for shielding materials in accordance with the present invention will require the production of 5,000 to 30,000 tonnes/year of uranium dioxide and/or uranium carbide. Thus, there is a need for improved process capable of producing greater than 100 tonnes/year, and preferably 5,000–30,000 tonnes/year, of uranium dioxide and uranium carbide in reasonably-sized plants with inexpensive equipment. There is a further need for a process for producing microspheres of uranium dioxide and uranium carbide over a wide size range (30–1,200 microns). There is also a need for an improved gelation process for production of uranium dioxide and uranium carbide directly from uranium hexafluoride. Finally, there is a need for an improved gelation process that avoids the necessity of converting uranium hexafluoride to uranyl nitrate in order accomplish gelation. The present invention addresses these and other needs.

SUMMARY OF THE INVENTION

Briefly, and in general terms, the present invention resides in an improved radiation shielding material and storage systems for radioactive materials incorporating the same. The shielding material is preferably formed from a PYRolytic Uranium Compound ("PYRUC") and provides improved radiation shielding in comparison with other shielding materials. In accordance with the invention, the shielding material can be used to form containment systems, container vessels, shielding structures, and containment storage areas, all of which can be used to house radioactive waste. The preferred embodiment of the shielding system is in the form of a container for storage, transportation, and disposal of radioactive waste.

The precursor for the PYRUC shielding material is preferably a mixture of a uranium compound and a binding material. In the preferred embodiment, the uranium compound is depleted uranium dioxide ($DUO_2$) or depleted uranium carbide (DUC or $DUC_2$). The uranium compound is preferably in the form of small particles, and more preferably in the form of pellets or microspheres, which can be coated or uncoated. The present invention incorporates a number of improvements over prior art methods for producing uranium dioxide and uranium carbide microspheres, whereby 5,000–30,000 tonnes/year of these microspheres can be produced in reasonably-sized plants and with inexpensive equipment. The improved gelation process of the present invention permits the use of oil in the gel forming column, deliberate carryover of oils to the sintering steps for supplying carbon and hydrogen, use of nitrogen as the sintering carrier gas, and use of peroxide for gelation of both uranium oxides and carbides.

In some cases, the precursor material can simply be cured to form a radiation shielding material. However, in preferred embodiments, the particles are immersed in a matrix of a binding material, so that the binding material fills the interstitial spaces and also provides additional neutron shielding. In accordance with the present invention, the binder is advantageously comprised of (1) a carbonaceous material (such as pitch); (2) a high-temperature resin (such as a polyimide); (3) a metal (such as aluminum powder); and/or (4) a metal-oxide (such as alumina). In addition, materials such as hydrogen, boron, gadolinium, hafnium, erbium, and/or indium in their non-radioactive isotopes, can be added in the mixture in the appropriate chemical form (usually the oxide) to provide additional neutron shielding effectiveness. The shielding materials are formed by applying sufficient heat to the mixture to cause a pyrolytic reaction that forms a solid material.

The present invention also resides in an method for manufacturing storage containers utilizing PYRUC shielding materials. In accordance with the invention, the precursor mixture can be poured or extruded into the container and then pyrolyized to form a solid shield. In a particularly preferred embodiment, the precursor starting materials are poured or extruded into a space formed by the inner and outer wall of a container and then pyrolized. The manufacturing process provides maximum flexibility in designing shielding shapes. The walls of the container provide the shape, structural support, and missile and drop protection, and also function as the secondary confinement barrier for the depleted uranium. The use of PYRUC simplifies shield manufacture and avoids the massive metal forging and machining activities associated with metal casks.

PYRUC shielding materials in accordance with the present invention offer superior gamma and neutron radiation shielding with the desirable thermal properties of metal at a much lower thickness, weight, and life-cycle cost than conventional materials. Furthermore, the PYRUC shielding materials can be optimized for specific circumstances and source terms. The use of depleted uranium reduces the assay (enrichment) level of the overall package, which provides for criticality mitigation. Furthermore, since PYRUC shielding materials have high thermal conductivities, the need for labyrinthine air passages and daily inspections is avoided. Similarly, PYRUC materials have higher thermal conductivities and temperature limits than concrete or DUCRETE and, thus, do not limit the design. In particular, the thermal conductivities of PYRUC materials exceed DUCRETE values by 25–100%. The temperature limits of carbonaceous PYRUC materials exceed 1000° C. and PYRUC materials using other binders have temperature limits above 300° C. Moreover, the high thermal conductivity and the high material temperature limit of PYRUC eliminate the need for a separate, inner canister for containing SNF. As a result, the PYRUC shielding materials can be used in SNF containers with direct contact between the shield's inner annulus and the basket containing the SNF, which further reduces size and weight.

It is believed that PYRUC-shielded SNF containers will cost about $600,000 to $700,000 each, with the PYRUC component accounting for about $200,000 of the cost. The PYRUC container, although having an initial capital cost slightly greater than the concrete cask, is expected to be significantly less expensive than the metal cask while having similar advantages. Lower life-cycle costs are also expected for the PYRUC container as compared with either concrete or DUCRETE containers, since PYRUC's superior heat transfer properties will preclude the need for frequent inspection and subsequent maintenance activities. Thus, PYRUC containers should be cost-competitive with traditional containers.

PYRUC is also environmentally desirable because it utilizes a waste product from the nuclear industry (depleted uranium) and, in one form, a waste product from the petrochemical industry (carbonaceous binder material) and converts them to environmentally stable forms. The PYRUC shielding material is also environmentally desirable because it is both microencapsulated and macroencapsulated, and has enhanced leach resistance. As a result, the material is potentially stable for geologic time periods. Thus, by virtue of its composition and expected behavior in a disposal environment, PYRUC is an environmentally friendly material.

Thus, the present invention satisfies the need for a shielding material having combined shielding performance, high temperature resistance, high thermal conductivity, and environmentally desirable characteristics, and for smaller, lighter containers for storage, transportation, and disposal of radioactive materials. While the primary applications for PYRUC are containers for SNF and HLW storage, transport, and disposal, PYRUC shielding materials can also be utilized in radiopharmaceutical containers, ion exchange resins, reactor cavity shielding and activated materials (i.e., made radioactive by neutron absorption) among others.

BRIEF DESCRIPTION OF THE FIGURES AND TABLES

The present invention will be more clearly understood for a reading of the following detailed description in conjuction with the accompanying figures.

FIGURES

Figure 1:
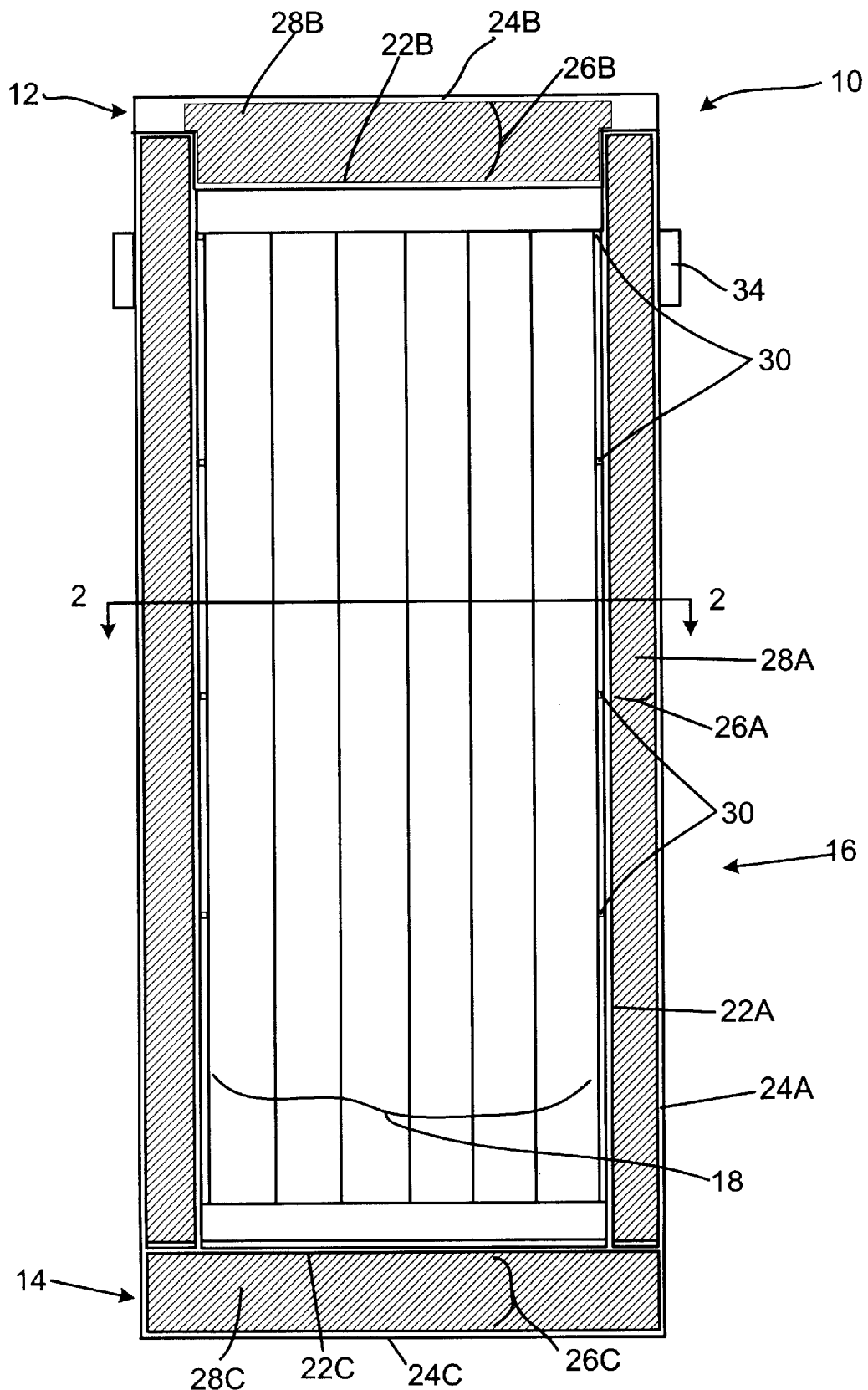
FIG. 1 is a cross-sectional view of a container for storage, transport, and disposal of radioactive material which includes a PYRUC shielding material in accordance with the present invention.
Figure 5:
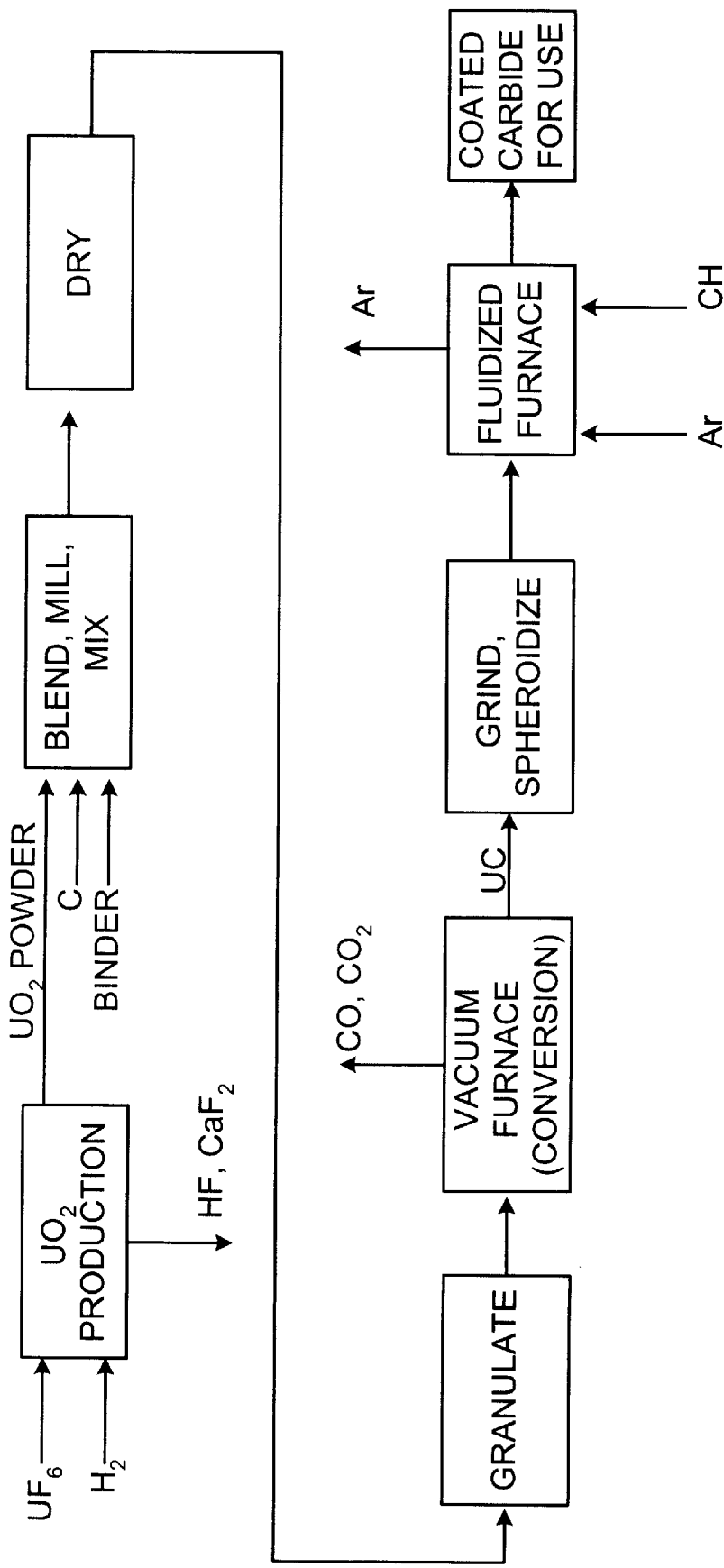
Figure 6:
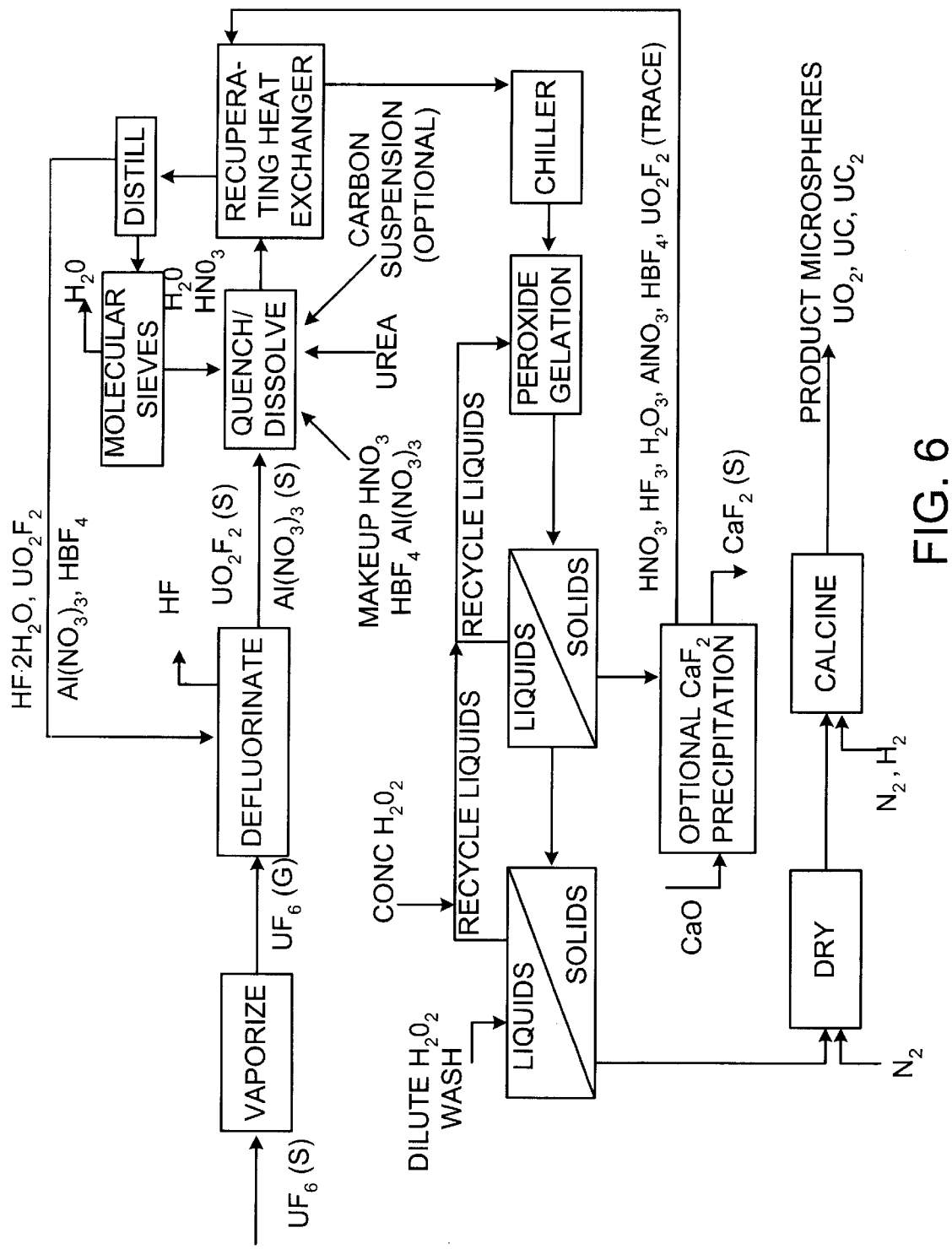

FIG. 4.1 is an overview in block form of the gelation process for producing uranium dioxide microspheres in accordance with the present invention;

FIG. 4.1a is an overview in block form of the gelation process for producing uranium carbide microspheres in accordance with the present invention;

FIG. 4.2.1 and FIG. 4.2.2 is an overall process flow diagram and material and energy balances for the production of uranium dioxide microspheres in accordance with the present invention;

FIG. 4.2a is an overall process flow diagram and material and energy balances for the production of uranium carbide microspheres in accordance with the present invention;

FIG. 4.3 is a process flow diagram for a depleted uranium hexafluoride receiving and volatilization station in accordance with the present invention;

FIG. 4.4 is a process flow diagram for a the $UO_2F_2$ production station in accordance with the present invention;

FIG. 4.5 is a process flow diagram for an uranyl nitrate formation station in accordance with the present invention;

FIG. 4.6.1 is a process flow diagram for a carbon suspension formation station utilized in connection with the production of uranium carbide microspheres in accordance with the present invention;

FIG. 4.6.2 is a process flow diagram for an uranyl nitrate solution adjustment station for manufacture of uranium dioxide in accordance with the present invention;

FIG. 4.6.2a is process flow diagram for an uranyl nitrate solution adjustment station for production of uranium carbide in accordance of the present invention;

FIG. 4.7 is a process flow diagram for a gel solution preparation station in accordance with the present invention;

FIG. 4.8 is a process flow diagram for a gel formation station for production of 1,200 micron spheres in accordance with the present invention;

FIG. 4.9 is a process flow diagram for a gel formation station for 300 micron spheres in accordance with the present invention;

FIG. 4.10 is a process flow diagram for an oil purification system in accordance with the present invention;

FIG. 4.11 is a process flow diagram for a 1,200 micron sphere setting/washing station in accordance with the present invention;

FIG. 4.12 is a process flow diagram for a 300 micron sphere setting/washing station in accordance with the present invention;

FIG. 4.13 is a process flow diagram for a 1,200 micron sphere drying station in accordance with the present invention;

FIG. 4.14 is a process flow diagram for a 300 micron sphere drying station in accordance with the present invention;

FIG. 4.15 is a process flow diagram for a 1,200 micron sphere conversion and sintering station in accordance with the present invention;

FIG. 4.16 is a process flow diagram for a 300 micron sphere conversion and sintering station in accordance with the present invention;

FIG. 4.17 is a process flow diagram for a calcium nitrate reconstitution station in accordance with the present invention;

FIG. 4.18 is a process flow diagram for a ammonium hydroxide solution purification station in accordance with the present invention;

FIG. 4.19 is a process flow diagram for a vertical tube furnace gas purification station in accordance with the present invention;

FIG. 4.20 is a process flow diagram for a ammonium hydroxide reconstitution station in accordance with the present invention;

FIG. 4.21 is a process flow diagram for an urea and HMTA recovery station in accordance with the present invention;

FIG. 4.22 is a process flow diagram for a cylinder decontamination station in accordance with the present invention;

FIG. 4.23 is a process flow diagram for a waste management station in accordance with the present invention;

FIG. 4.24 is a process flow diagram for an uranium carbide sintering station in accordance with the present invention;

FIG. 4.25 is a process flow diagram for an uranium carbide coating station in accordance with the present invention; and FIG. 5 is a process flow diagram for a graphite route for production of the uranium carbide microspheres in accordance with the present invention; and FIG. 6 is a process flow diagram for a peroxide gelation process in accordance with the present invention.

TABLES

Table 1 sets forth the material properties and estimated costs for various shielding materials;

Table 2 sets forth the shielding properties for various shielding materials;

Table 4.2 sets forth the overall material and energy balances for production of uranium dioxide microspheres in accordance with the present invention;

Table 4.2a sets forth the overall material and energy balances for the production of dense uranium carbide microspheres in accordance with the present invention;

Table 4.3 sets forth the material and energy balances of the depleted uranium hexafluoride receiving and volatilization station for production of uranium dioxide microspheres or uranium carbide microspheres in accordance with the present invention;

Table 4.4 sets forth the material and energy balances for the uranyl fluoride production station for production of uranium dioxide microspheres in accordance with the present invention;

Table 4.4a sets forth the material and energy balances for the uranyl fluoride production station for production of uranium carbide microspheres in accordance with the present invention;

Table 4.5 sets forth the material and energy balances for the uranyl nitrate formation station for production of uranium dioxide microspheres in accordance with the present invention;

Table 4.5a sets forth the material and energy balances for the uranyl nitrate formation station for production of uranium carbide microspheres in accordance with the present invention;

Table 4.6.1 sets forth the material and energy balances for the carbon suspension formation station for production of uranium dioxide microspheres in accordance with the present invention;

Table 4.6.2 sets forth the material and energy balances for the uranyl nitrate solution adjustment station for production of uranium dioxide microspheres in accordance with the present invention;

Table 4.6.2a sets forth the process flow diagram for a uranyl nitrate solution adjustment station for production of uranium carbide microspheres in accordance with the present invention;

Table 4.7 sets forth the material and energy balances for the gel solution preparation station for production of uranium dioxide microspheres in accordance with the present invention;

Table 4.7a sets forth the material and energy balances for the gel solution preparation station for production of uranium carbide microspheres in accordance with the present invention;

Table 4.8 sets forth the material and energy balances for the gel formation station for the production of 1,200 micron spheres in accordance with the present invention;

Table 4.8a sets forth the material and energy balances for the gel formation station for production of 1,200 micron spheres of uranium carbide in accordance with the present invention;

Table 4.9 sets forth the material and energy balances for the gel formation station for the production of 300 micron spheres in accordance with the present invention;

Table 4.9a sets forth the material and energy balances for the gel formation station for production of uranium carbide microspheres in accordance with the present invention;

Table 4.10 sets forth the material and energy balances for the oil purification station for production of uranium dioxide microspheres in accordance with the present invention;

Table 4.10a sets forth the material and energy balances for the oil purification station for production of uranium carbide microspheres in accordance with the present invention;

Table 4.11 sets forth the material and energy balances for the 1,200 micron sphere setting/washing station for production of uranium dioxide microspheres in accordance with the present invention;

Table 4.11a sets forth the material and energy balances for the 1,200 micron sphere setting/washing station for production of uranium carbide microspheres in accordance with the present invention;

Table 4.12 sets forth the material and energy balances for the 300 micron sphere setting/washing station for production of uranium dioxide microspheres in accordance with the present invention;

Table 4.12a sets forth the material and energy balances for the 300 micron sphere setting/washing station for production of uranium carbide microspheres in accordance with the present invention;

Table 4.13 sets forth the material and energy balances for the 1,200 micron sphere drying station for production of uranium dioxide microspheres in accordance with the present invention;

Table 4.13a sets forth the material and energy balances for the 1,200 micron sphere drying station for production of uranium carbide microspheres in accordance with the present invention;

Table 4.14 sets forth the material and energy balances for the 300 micron sphere drying station for production of uranium dioxide microspheres in accordance with the present invention;

Table 4.14a sets forth the material and energy balances for the 300 micron sphere drying station for production of uranium carbide microspheres in accordance with the present invention;

Table 4.15 sets forth the material and energy balances for the 1,200 micron conversion and sintering station for production of uranium dioxide microspheres in accordance with the present invention;

Table 4.15a sets forth the material and energy balances for the 1,200 micron conversion and sintering station for production of uranium carbide microspheres in accordance with the present invention;

Table 4.16 sets forth the material and energy balances for the 300 micron conversion and sintering station for production of uranium dioxide microspheres in accordance with the present invention;

Table 4.16a sets forth the material and energy balances for the 300 micron conversion and sintering station for production of uranium carbide microspheres in accordance with the present invention;

Table 4.17 sets forth the material and energy balances for the calcium nitrate reconstitution station for production of uranium dioxide microspheres in accordance with the present invention;

Table 4.17a sets forth the material and energy balances for the calcium nitrate reconstitution station for production of uranium carbide microspheres in accordance with the present invention;

Table 4.18 sets forth the material and energy balances for the Ammonium hydroxide solution purification station for production of uranium dioxide microspheres in accordance with the present invention;

Table 4.18a sets forth the material and energy balances for the ammonium hydroxide solution purification station for production of uranium carbide microspheres in accordance with the present invention;

Table 4.19 sets forth the material and energy balances for the vertical tube furnace gas purification station for production of uranium dioxide microspheres in accordance with the present invention;

Table 4.19a sets forth the material and energy balances for the vertical tube furnace gas purification station for production of uranium carbide microspheres in accordance with the present invention;

Table 4.20 sets forth the material and energy balances for the ammonium hydroxide reconstitution station for production of uranium dioxide microspheres in accordance with the present invention;

Table 4.20a sets forth the material and energy balances for the ammonium hydroxide reconstitution station for production of uranium carbide microspheres in accordance with the present invention;

Table 4.21 sets forth the material and energy balances for the urea and hmta recovery station for production of uranium dioxide microspheres in accordance with the present invention;

Table 4.21a sets forth the material and energy balances for the urea and HMTA recovery station for production of uranium carbide microspheres in accordance with the present invention;

Table 4.22 sets forth the material and energy balances for the cylinder decontamination station for production of uranium dioxide microspheres in accordance with the present invention;

Table 4.22a sets forth the material and energy balances for the cylinder decontamination station for production of uranium carbide microspheres in accordance with the present invention;

Table 4.23 sets forth the material and energy balances for the waste management station for production of uranium dioxide microspheres in accordance with the present invention;

Table 4.23a sets forth the material and energy balances for the waste management station for production of uranium carbide microspheres in accordance with the present invention;

Table 4.24 sets forth the material properties and energy balances for the uranium carbide and sintering station for production of uranium carbide microspheres in accordance with the present invention; and Table 4.25 sets forth the material and energy balances for the uranium carbide coating station for production of uranium carbide microspheres in accordance with the present invention.

DETAILED DESCRIPTION OF THE PREFERRED EMBODIMENTS

Figure 2:
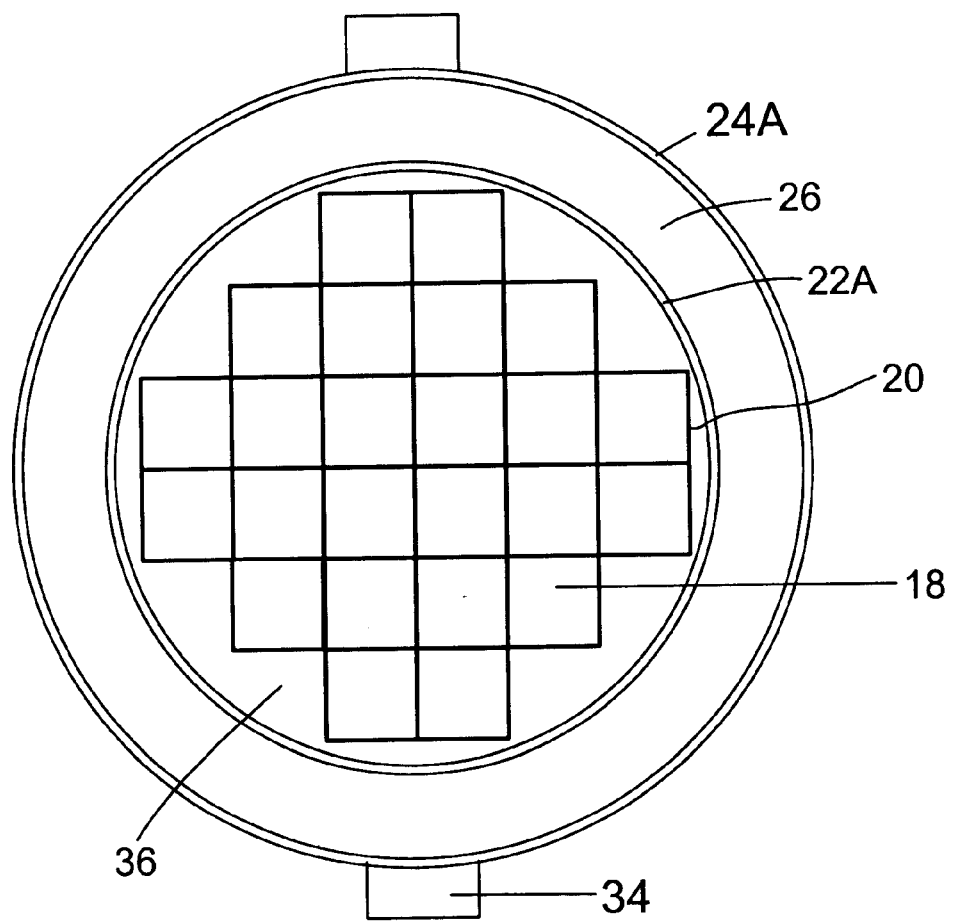
FIG. 2 is a cross-sectional view of the container shown in FIG. 1 along the line 2—2 in accordance with the present invention.

With reference now to the exemplary drawings, and particularly to FIGS. 1–2, there is shown, in cross-section, a container 10 in accordance with the present invention. The container includes a lid 12, a base 14 and a body 16 defining a central cavity 18. The container 10 is used to store waste material, including, in particular, radioactive waste materials, such as SNF. In this regard, a plurality of pressurized water reactor ("PWR") assemblies housing waste material are fitted inside of a basket assembly 20 disposed within the container 10, as best seen in FIG. 2. The container 10 can have a variety of geometries. In the embodiment shown in FIGS. 1 and 2, the container is cylindrical, having a circular cross-section. Alternatively, the container could have a cross-section that can be square or hexagonal, among other geometries, in order to facilitate various packing and storing configurations.

The body 16 includes an inner wall 22a and an outer wall 24a thereby defining cavity 26a. A PYRUC shielding material 28a is disposed within the cavity 26a. The shielding material advantageously absorbs neutrons from neutron-emitting waste materials and gamma rays from gamma-emitting waste materials. As described in detail, below, during manufacture of the container, the PYRUC precursor material is prepared and poured or extruded into the cavity between the inner wall and outer wall of the body and then pyrolized to form a solid radiation shield. Alternatively, the solid radiation shield may be formed by several sequential castings, forming successive axial and radial rings, thereby allowing the shield to be tailored to a variety of requirements. For example, it may be desirable to utilize two radial layers of different PYRUC shielding materials, such as a more dense inner layer which will absorb neutrons more effectively in combination with a less dense outer layer that will absorb gamma rays.

The inner wall 22a and outer wall 24a are formed from forged steel from about 0.10 to about 3.00 inches thick, preferably from about 0.5 to about 1.0 inches thick. The preferred embodiment shown in FIGS. 1 and 2, is an MPU designed to hold twenty-four PWR assemblies. In this particular embodiment, the body 16 is 160 inches in height, the diameter of the central cavity 18 formed by the inner wall is 65.8 inches, the outer diameter of the outer wall is 81.8 inches, and the inner wall 22a and outer wall 24a of the body 16 define an eight-inch cavity 26a. It will be understood, however, that the thickness of the inner and outer walls 22a and 24a and size of the cavities 18 can vary according to the strength and shielding requirements of the container 10 and the size of the waste to be contained. Forged steel is desirable because it is economical, easy to manufacture, and a reasonably good conductor of heat. Alternatively, other materials such as carbon steel, stainless steel, titanium, aluminum, or the like can be used. While stainless steel would be generally more expensive, it provides the additional advantage of corrosion resistance.

The lid 12 and base 14 are attached to body 16 and each includes an inner wall 22b and 22c and an outer wall 24b and 24c which define a cavity 26b and 26c, respectively. In this particular embodiment, both cavities are about thirteen inches high and incorporate a PYRUC shielding material 28b and 28c. The lid and base are constructed from the same materials as are used to construct the body.

The container 10 or any of its components, body 12, base 14 and lid 16, can be manufactured with an inner wall 22 and outer walls 24 that are coated. Coatings can be used, by way of example, to decrease permeability or to enhance radioactivity absorbing characteristics of the container or for corrosion resistance. Typical permeability coatings include glass coatings, epoxy coatings, and inorganic coatings (such as those containing silica), galvanizing materials (zinc) and zirconia, among others. The coating thickness is typically from about 1.0 to 2,000 microns. As best seen in FIG. 1, a liner 30 is located adjacent to the inner wall 22a. This liner 30 can be a one inch perforated support plate constructed from materials such as steel, lead, and the like.

Turning now to the details of the basket 20, as shown in FIG. 2, the basket 20 is dimensioned to hold multiple PWR assemblies. The central cavity 18 is equipped with a means (not shown), such as a locking pin, which secures the basket in an upright, centralized position. The basket is a removable compartmentalized structure, preferably made of metal, which is designed to hold assemblies of the radioactive material in a segregated manner. In a preferred embodiment, a number of baskets having different configurations are interchangeable so that both large (24 or 21 PWR) and small (12 PWR) assemblies can be accommodated. It is also desirable to equip the container 10 with a lifting trunnion 34 attached to the body 16. This lifting trunnion advantageously facilitates handling of the container 10.

In use, the base 14 is attached to the container 10 and the container is filled with SNF by wet or dry methods. After loading, the lid 12 is seal welded to the body 16 of the container. Alternately, bolt closures with flexitallic, elastomeric, or metallic o-ring/groove sealing (not shown) can be used to seal the lid. If the container was loaded under water, the water is removed via a drain valve (not shown) and the container dried with warm nitrogen gas by circulation through a top vent (not shown). Subsequently, nitrogen or helium is introduced, and the vent and drain are welded to the container 10.

In some embodiments, suitable granular material is added to fill the spaces 36 between the basket and the inner wall 22 of the container 10, thereby improving heat transfer and shielding. For storage applications, this granular material includes carbon spheres and sand, particularly colemonite sand, which includes boron and bound water. For MPC and related applications, uranium oxide and uranium carbide could be added, although adjustments may be necessary to account for varying crane weight limits at particular storage or disposal sites.

Figure 3:
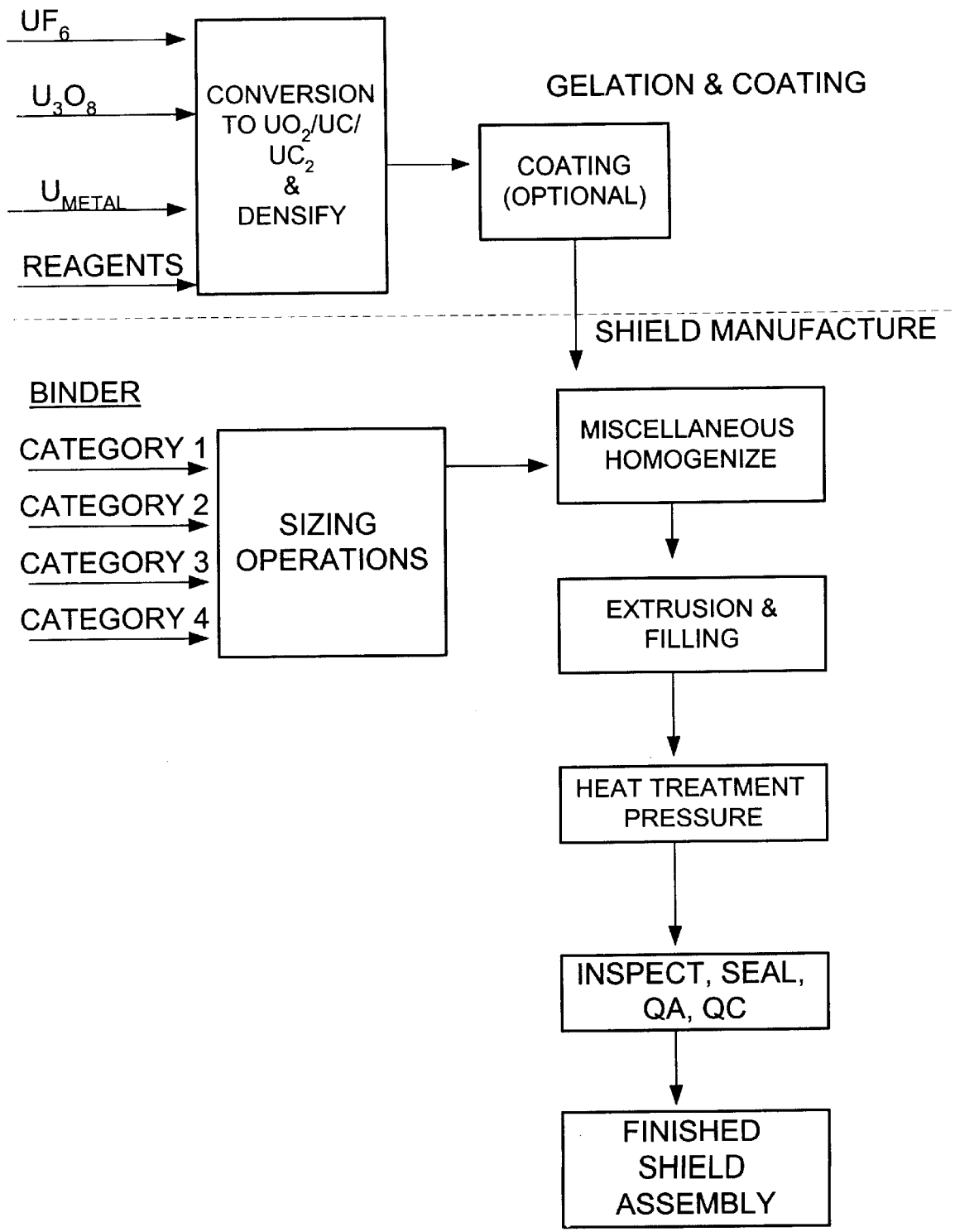
FIG. 3 is a flow diagram setting forth the overall process for manufacture of a container incorporating PYRUC shielding materials in accordance with the present invention.

Referring now to FIG. 3, an overview of the process for preparation of PYRUC shielding materials is shown. In accordance with the preferred embodiment of the invention, depleted uranium hexafluoride is converted by an improved gelation process, discussed below, into microspheres of a pyrolytic uranium compound, most preferably, into uranium dioxide, uranium monocarbide, and/or uranium dicarbide microspheres (collectively "uranium carbide or "UC"). In some embodiments, at least two sizes of microspheres are utilized to promote higher spatial densities. Also, in some embodiments, the particles are coated with materials such as carbon, silica, pitch, metal, or the like. During the gelation process, other uranium-containing materials, such as uranium metal and $U_3O_8$ can be incorporated and processed to produce microspheres.

Binding materials are sized and classified to match the size of the microspheres. Two sizes of binding material can be used to maximize the density and minimize pore volume of the shielding material. The microspheres and binding material are then mixed and homogenized to form a precursor mixture. The precursor mixture is poured or extruded into the cavity 26 defined by the inner wall 22 and outer wall 24 of the container 10. Heat treatment and pressure are advantageously used to pyrolize the microspheres and form a solid shielding material. Inspections and sealing complete the assembly of the container 10.

The precursor mixture contains from about 5 to 100% of a particulate pyrolytic uranium compound. Preferred mixtures contain uranium dioxide and/or uranium carbide. microspheres. The size of the particles can all be the same size (uniform), can be distributed over a range of sizes (distributed), or can be classified into several discrete size ranges (classified). Preferred particle sizes range from 0.030 mm to 2.0 mm. Smaller particles can be used, but are generally too fine for easy handling and create environmental concerns. Larger particles can also be used, but require long times for densification, as by sintering, and do not pack as well.

The preferred particle shape is spherical, but particles can be any suitable shape, including cylindrical, rectangular, and/or irregular. The preferred embodiment uses spherical particles of two discrete size ranges: 300 to 500 microns and 1,000 to 1,300 microns in diameter, including, in particular, a mixture of 300 micron and 1,200 micron spheres. It is believed that these particles provide a suitable combination of packing, handling, environmental and densification requirements. In a particularly preferred embodiment, the precursor mixture contains 80% pyrolytic uranium microspheres. Various binders or additives make up the remaining portion of the material. The microspheres, in turn, are preferably comprised of 70% uranium monocarbide coated with pyrolytic carbon, as a 1,000 to 1,300 micron diameter particle, and 30% uranium dioxide coated with pyrolytic carbon, as a 300 to 500 micron particle.

As noted above, in preferred embodiments, the binding materials are added to fill the interstitial spaces, provide additional shielding, and enhance the overall performance of the shielding material. The binding materials generally constitute up to 95% of the precursor mixture. Typically, a binding materials is selected based upon an assessment of the radiation spectrum of the material requiring shielding.

The main categories of precursor mixtures in accordance with the present invention are classified by the binding material utilized in their production: (1) carbonaceous binders; (2) resin binders; (3) metal binders; and (4) metal oxide binders. Suitable carbonaceous binders are formed by the low temperature pyrolysis (heating) of pitch, tar, polyvinyl alcohol and related compounds, graphite, coke byproduct or the like. The preferred form of carbonaceous binder is pitch, because it mixes well with the pyrolytic uranium compound and forms a continuous structure upon pyrolysis. The carbonaceous binders are preferably pyrolized to the empirical formula $C_1H_{0-2}$, with $C_1H_{0.5}$ most preferred. An advantage of this combination is that it forms an environmentally inert shielding material. When pyrolytic uranium dioxide is mixed with a carbonaceous binder, it is preferred that the uranium dioxide first be coated with, for example, pyrolytic carbon, for better carbon-uranium dioxide adhesion.

Resin binders are polymers and include mixtures of polymers, such as polyethylene, polypropylene, polyurethane, polyimides, and polyamides. Resin binders provide the advantage of excellent neutron shielding, albeit with some heat transfer penalties. The resin binder can be a thermoplastic resin, such as polyethylene, polypropylene, or polyurethane, that can be melted and extruded as a paste or viscous liquid. Advantageously, however, resin binders are comprised of non-thermoplastic resin binders, delineated herein as thermoset resins, which do not melt readily, but which bond when the precursor mixture is heated and/or pressed. Examples of such resins include polytetrafluoroethylene (sold under the tradename TEFLON), polyamides, polyimides, teflon analogues, FEP (fluorinated ethylenepropylene, which is a copolymer of tetrafluoroethylene and hexafluoropropylene), polyvinylidene fluoride (sold under the tradename KYNAR), and a copolymer of chlorotrifluoroethylene and ethylene (sold under the tradename HALAR), and PFA (perfluoralkoxy), among others. Polyamides include materials such as nylon-6 and nylon-6,6. Polyimides, on the other hand, have a phthalimide structure and are typically formed from dianhydrides and diamines containing aryl groups. Polyimides generally have high strength, stability, and thermal resistance, in some cases greater than 500° C. Typical polyimides include the reaction products of benzophenone tetracarboxylic dianhydride (BTDA) and 4,4'-diaminodiphenyl ether (DAPE) (sold under the tradenames KAPTON, TORAY, PYRO-ML, and PYALIN), a BDTA/m-phenylenediamine (MPD) derivative (sold under the tradenames MELDIN and SKYBOND), and trimellitic anhydride (TMA)/MPD (sold under the tradenames KERIMID, KERMEL, and ISOMID). In addition, it is believed that both thermoplastic and thermosetting polyfunctional resins will be advantageously utilized in accordance with the present invention. Polyfunctional resins contain at least two chemical functional groups in each repeating polymer unit. In addition to polyurethane and the polyimides and polyamides identified above, other suitable polyfunctional resins include acetonitrile butadiene styrene (ABS), polyphylene sulfide (PPS), polysulfones, polyesters (including dacron-type polyesters), phenolic plastics, and fiberglass reinforced plastic combinations. The preferred resin is both thermosetting and polyfunctional. In the preferred embodiment, the resin binder is a 100% polyimide resin.

Suitable metal binding materials include copper, zinc, nickel, tin, aluminum, aluminium/boron mixtures and the like. Preferred metal binders contain aluminum powder. Most preferred is an aluminum/boron mixture, because it exhibits both high heat transfer and neutron shielding effectiveness.

Metal oxide binders include both ceramic and refractory materials. Suitable metal oxides include alumina, magnesia, silica, hafnia, hematite, magnetite, silica, and zirconia, among others. Alumina is the generally preferred metal-oxide binder. A castable alumina material, with 6% boric/ and acid added, is the most preferred, because of its neutron shielding effectiveness and adhesion to uranium dioxide.

While any one or any combination of the binding materials can be used, the use of one binding material will be preferred for simplicity and greater mechanical robustness. By way of example, high heat load waste is advantageously shielded using a shielding material containing a binder having high heat transfer properties, such as a metal binder. In contrast, mixed uranium-plutonium oxide waste is advantageously shielded by a shielding material containing a binder optimized for neutron shielding.

The composition of the precursor mixture varies with the category of binder material used and application. While the precursor can contain up to 100% of the uranium material (essentially close packing of the microspheres or pellets), optimum shielding weight is achieved with 55–80% pyrolytic uranium compound and 45–20% binder; based on the weight of the precursor mixture.

The precursor mixture also advantageously includes additives, comprising typically up to 20% of the binding material, for enhanced shielding, heat transfer, or stability. Typical additives include hydrogen, boron, gadolinium, hafnium, erbium, indium and the like. These additives are included in the appropriate chemical forms. For example, an alumina binder can be combined with boric acid and/or gadolinium oxide. A particularly preferred additive is boron-10, which can be added as granular boric acid and converted to $B_2O_3$ when the precursor mixture is pyrolized. Alternatively, sodium borate can be utilized. In addition, for gadolinium, halfnium, erbium and indium, the oxide form is generally preferred. Mechanical additives such as steel shot or glass beads may also be added to the PYRUC mixture. Alternatively, additives such as gadolinium, hafnium, erbium, and indium can be added to the gel-forming step of the gelation process, so that they reside within the spheres of uranium dioxide/carbide as their respective oxides.

Once the components of the precursor mixture have been selected, they are combined, and then homogenized. Mixing is advantageously accomplished by either batch or continuous methods, such as twin-screw auger extruders, and slight heating may be applied.

The homogenized mixture is placed within the cavity 26a formed by the inner wall 22a and outer wall 24a of the body 16 by extrusion/pumping (preferred for viscous binder combinations) and/or vibratory methods (preferred for powder blends). Slight heat and pressure may be applied. After filling, sufficient heat (100–1000° C.) and pressure (0–20 atmosphere) are applied to the container, to pyrolize and form a solid shielding material. An end closure is attached to the body 16 by suitable means, such as tungsten inert gas welding in order to seal the body 16. Thereafter, the container 10 is brushed and polished. Gamma radiography and other non-destructive examination (NDE) methods are used check the body 16 prior to use. The lid 12 and base 14 can be similarly manufactured.

In those embodiments where a combination of carbonaceous binding materials are employed, the pyrolitic uranium component, carbon powder, additives, and pitch are mixed in an extruder. The extruder then deposits a first annular layer of the precursor mixture into the cavity 26a, Next the layer is pyrolized in an inert atmosphere of nitrogen, argon or similar gases to form the solid shielding material. Pyrolysis typically requires from about 0.1 to about 24 hours at temperatures of from about 300–800° C. Thereafter, additional annular layers of precursor material are extruded into the cavity 26a and pyrolized under similar conditions.

Alternatively, the inner wall 22a can be removed for better heat transfer and heat-treated in one step. If carbon powder is used by itself as the binder material, then the mixture is dry-fed into the cavity 18a. Heat is applied as before and the material is pressed, thus forming the shield. In the preferred embodiment, heat is supplied by electrical resistance inductance or radiance. Heat may also be supplied by direct or indirect fired equipment.

For resin-based PYRUC materials, powdered resins are dry blended by mechanical and vibratory means with the uranium form and loaded by vibratory means into the cavity 18a. Electric heating is preferably used to heat the material to 400–600° C., typically for 0.1 to 24 hours, to form the PYRUC monolith. If thermal resins are used, they are mixed in an extruder under heat. Thereafter, the mixture is extruded into the container 10 as a viscous fluid. Heat and pressure are then applied to form the solid monolith in a manner similar to the carbon forms.

For metal-based PYRUC materials, the container 10 is heated electrically or by a fired furnace under an inert cover gas to the melting point of the metal binder. For the typical metals cited, this temperature will fall between 400 and 1,000° C., preferably below the melting point of the container's materials of construction. Thereafter, an initial amount of molten metal binder is added to the container 10 to form a layer 1 cm to 4 m thick, followed by an initial quantity of preheated uranium material. Due to its density, the uranium material will sink through and to the bottom of the molten metal layer, forming a packed bed of the particles with the metal filling the interstitial points. The process is repeated until the cavity 18a is filled. Thereafter, the heat source is removed, and the shield cools and solidifies. Alternatively, where a powdered metal, such as a copper or nickel powder, is used, the metal powder, uranium form, and any additives are dry blended by mechanical and vibratory means and vibratorily loaded into the cavity 18. Heating is used to melt the powder, causing the matrix to congeal and fuse together into a monolith. It is particularly preferred to heat the material by induction, utilizing induction coils. As before, typical temperatures of 400–1,000° C. and times of 0.1 to 24 hours are required.

For metal-oxide PYRUC materials, the metal oxide and uranium form can be combined with water (0–40 wt %), mixed, and then pumped into the cavity 18a. It is believed that water hydrates the metal oxide binder and, therefore, assists in bonding of the material. The material is preferably allowed to harden for 2 to 96 hours and then heat treated for 0.1 to 24 hours at temperatures up to 400° C. In the preferred embodiment, the shielding material is formed in sequential layers in order to facilitate heat and mass transfer. Alternatively, the inner wall of the body 16 can be removed and replaced with a temporary, combustible wall (e.g., manufactured from wood products) for casting as before. This allows the number of casting steps to be reduced significantly, in some cases, allowing a single step. The thermal step burns away the combustible inner wall.

The choice, mix, and arrangement of the shielding materials used in the PYRUC mixture will vary with the type and quantity of radioactive material being transported or stored. Thus, the thickness, diameter, number and arrangement of the shielding materials will be varied to provide optimum protection against the neutrons and gamma radiation emitted by the particular type and quantity of radioactive material.

The use of uranium dioxide and uranium carbide advantageously facilitates simpler and less expensive manufacturing routes for both the uranium material and the shielding cask. It essentially involves the direct casting of the PYRUC material from a mixer or an extruder into the cavity formed between the two metal walls of the cask. Only low temperatures are involved, and the casting and machining of uranium metal are eliminated. Finally, uranium dioxide and coated uranium carbide have good heat transfer and thermal characteristics. Thus, their use eliminates the need for the labyrinthine air cooling passages present in concrete-shielded storage containers, thereby reducing monitoring requirements and costs.

Table 1 presents a comparison of material properties and estimated costs for various shielding materials, including PYRUC. As summarized in Table 1, PYRUC is a shielding material that provides superior thermal conductivity and temperature limits at a competitive cost, while offering superior neutron and gamma shielding.

TABLE 1

Material Properties and Estimated Costs

| Material | Thermal Conductivity (BTU/hr-ft-° F.) | Temperature Limit (° F.) | Representative Gamma Shielding Thickness | Representative Neutron Shielding Thickness | Estimated Cost ($000) |
|---|---|---|---|---|---|
| Uranium Metal | 15.8 | >1000 | 3.4 | 18.9 | >1,500 |
| PYRUC-UO$_2$ | 7.8 | >1000 | 7.4 | 13.3 | 600–700 |
| PYRUC-UC | 16.5 | >1000 | 5.9 | 14.5 | 600–700 |
| Ducrete | 5.8 | 250 | 14.6 | 18.5 | 600–700 |
| Concrete | 3.6 | 250 | 36.0 | 36.0 | 450–550 |
| Steel | 9.4 | >1000 | 12.0 | 12.0 | 1000–1,500 |
| Cast Iron | 29 | >1000 | 12.0 | 12.0 | 1000–1,500 |

Similarly Table 2 presents a comparison of the properties of PYRUC with other shielding materials. As shown in Table 2, casks incorporating PYRUC typically offer thermal performance and gamma shielding capabilities approaching that of metal. Meanwhile, PYRUC materials provide low temperature ease of fabrication, and chemically non-reactive forms which are not susceptible to combustion or chemical interaction above ground or in an SNF repository.

TABLE 2

Cask Shielding Properties

| Property | Concrete | Metal (steel and uranium) | Ducrete | PYRUC | Ideal Cask Shield |
|---|---|---|---|---|---|
| Gamma Shielding | Fair | Excellent | Good | Excellent | Excellent |
| Neutron Shielding | Excellent | Fair | Very Good | Excellent | Excellent |
| Temperature. Limit, ° F. | 200 | 1000 (U) 2000 (Steel) | 200 | >1000 | >750 Clad Limit |
| Thermal Conductivity | Low | High | Low | High | High |
| Integrity Time Frame, Years | <300 | 300.(U) 1000. (Steel) | >300 | >1000 | >1000 |
| Cost | Low | High | Medium | Medium | Low |
| Weight | High | Medium | Medium | Medium | Low |
| Internal Air Passage Reg. | Yes | No | Yes | No | No |
| Cask Applicability | Storage | Multi-Purpose | Storage | Multi-Purpose | Multi-Purpose |

Other potential applications for PYRUC include radiopharmaceutical containers, ion exchange resins, reactor cavity shielding, and activated materials. PYRUC may also have utility in other applications as a shielding material for utility resin shields, reactor cavities, naval reactors, spacecraft, and Greater Than Class C (GTCC) materials.

As discussed above, in the preferred embodiment, it is desirable to utilize substantially spherical uranium dioxide or uranium carbide particles of generally less than 1,300 microns. There are several types of processes known in the art that can be used to produce such particles: (1) Powder Metallurgy Processes (Granulation processes); (2) Melting Processes (Arc glazing, Plasma burner glazing, Suspension melting, Glazing of hydrate salts); and (3) Fluid Processes (Synthetic resin condensation, Emulsion processes, and Gelation processes). In accordance with the present invention, the small particles of uranium dioxide and uranium carbide can be generated by any suitable means.

In the past, however, only power metallurgy processes have provided the basis for commercial production and only for commercial production of uranium dioxide particles. Processes for the production of uranium dioxide and uranium carbide are also described in *Controlled Nuclear Chain Reaction: The First 50 Years*, American Nuclear Society, 1992, La Grange Park, Ill., and M. Benedict, T. Pigford, and H. Levi, *Nuclear Chemical Engineering*, Second Edition, McGraw-Hill, New York, N.Y., 1981, incorporated herein by reference.

Such processes are mechanically intensive. They typically start with a low density uranium dioxide powder, produced in a rotary kiln from depleted hexafluoride, followed by mixing, granulation, pressing a pellet, sintering, and pellet-grinding to produce dense uranium dioxide particles. Furthermore, powder process-based plants are generally modular, small throughput operations. Thus, scale up to the requirement for uranium materials contemplated for use in accordance with the present invention would necessitate hundreds of process lines.

Other nonfluid methods for the manufacture of uranium dioxide were investigated in the late 1970s and early 1980s, which avoid the mechanically intensive, powder processes. These alternative processes are described in S. M. Tiegs, et al., "The Sphere-Cal Process: Fabrication of Fuel Pellets from Gel Microspheres," ORNL/TM-6906, September, 1979; "Fuels Recycle and Development," (FRAD) Program Review, Battelle Northwest, Sep. 13–15, 1978, and J. M. Pope, "Spherical UC Fuel Via Gel-Precipitation," American Nuclear Society, Annual Meeting, Miami, Jun. 7–11, 1981, incorporated herein by reference. Additional information is available in "Fuels Refabrication and Development (FRAD) Program Review," Battelle Pacific Northwest Laboratories, Sep. 13–15, 1978; "NPR-MHTGR Fuel Development Program," Idaho National Engineering Laboratory (INEL), EGG-NPR-8971, June 1990; and R. H. Perry and C. H. Chilton, *Chemical Engineers' Handbook*, Fifth Edition, New York, N.Y., 1973, also incorporated herein by reference.

Furthermore, granulation processes are suitable for dense uranium carbide particles, but cannot produce dense particles of uranium oxide. Melting processes have the drawback of being expensive and yielding an excessively-large range of particle sizes.

Accordingly, for economic and capacity reasons, it is preferably most desirable to generate the uranium particles using gelation processes. An overview of the conversion of depleted uranium hexafluoride into spheric, dense uranium dioxide particles by gelation is presented in A. P. Murray, S. Mirsky, P. Hogroian, and S. Krill, "Gelation Conversion Of Depleted Uranium Hexafluoride Into Dense Uranium Dioxide Microspheres," Third International Uranium Hexafluoride Conference Proceedings, Nov. 28–Dec. 1, 1995, Paducah, Ky., incorporated herein by reference. These processes include variously as sol-gel, gel-precipitation, internal gelation, external gelation, particle fuel, microsphere, and solution precipitation processes. In gelation processes, hydrodynamics is used to form spheres of ammonium diuranate ("ADU"), which are subsequently cured, dried, and sintered into dense uranium dioxide microspheres typically ranging from 30 to 1,500 microns in size. Furthermore, for a specific size, a narrow-size distribution can be obtained.

Gelation processes are based on the fact that if a colloidal solution ("sol" or "broth") of a uranium dioxide precursor (e.g., uranyl nitrate) is dispersed into a fluid with which it is immiscible, or only slightly miscible, spherical droplets are formed which solidify by gelling (hence, the "gel"). The critical part of the processes occurs when the colloidal solution is dispersed in the fluid. In order to promote gelling, while maintaining droplet integrity, it is necessary to remove the positive charge on the droplets for greater immiscibility and precipitation potential. This can be advantageously accomplished by either (a) extraction of water; (b) extraction of acid; or (c) addition of alkali.

Gelation methods are generally classified as either external or internal gelation routes. In external gelation routes, microspheres of uranium dioxide or uranium carbide are produced by introducing droplets of a uranyl nitrate solution into a column containing ammonia gas. As the droplets fall through the gas, surface tension effects cause them to form spheres of ADU. Due to size effects upon mass transfer, external gelation generally requires careful design for production of spheres larger than about 800 microns. In contrast, internal gelation uses aqueous phase immiscibility in an organic liquid as the basis for sphere formation. The gel formers in internal gelation are typically organic oils or solvents containing ammonia-releasing compounds such as amines that release ammonia (e.g. hexamethylenetetramine ("HMTA")). Due to better mass transfer, internal gelation can typically produce larger, more uniform microspheres. Furthermore, since there is better heat transfer between the gel former solution and the droplet, shorter columns with longer residence times can be used. Thus, in the present invention, internal gelation is preferred.

MANUFACTURE OF DENSE URANIUM DIOXIDE AND EXEMPLARY PROCESS

FIG. 4.1 provides an overview of the preferred gelation process for producing uranium dioxide ($UO_2$) microspheres according to the present invention from depleted uranium hexafluoride ("$DUF_6$").

Depleted uranium hexafluoride gas is reacted with steam ("$H_2O$") to produce solid uranyl fluoride ("$UO_2F_2$") and gaseous hydrogen fluoride ("HF"). The hydrogen fluoride gas is recovered in the anhydrous form, and the uranyl fluoride solid is collected, quenched, and dissolved in water. Thereafter, any residual hydrogen fluoride in the uranyl fluoride solution can optionally be removed by distillation. However, as discussed in detail below, the resulting uranyl fluoride solution can be used directly in the gelation process for the production of uranium dioxide microspheres. The presence of residual hydrogen fluoride does not significantly affect the gelation steps, and any residual fluoride hydrogen can be removed from the final uranium dioxide product in the subsequent steps of aging and washing. Alternatively, the uranyl fluoride so produced can be further reacted and converted to uranyl nitrate which in turn is used to make uranyl dioxide. As shown in FIG. 4 conversion of uranyl fluoride is accomplished by adding calcium nitrate ("$Ca(NO_3)_3$") to the aqueous uranyl fluoride solution, thereby precipitating calcium fluoride ("$CaF_2$") and forming aqueous uranyl nitrate ("$UO_2NO_3)_2$"). Prior to gelation, the resulting uranyl nitrate solution is adjusted by evaporation, urea is added, and the solution chilled.

In the preferred internal gelation routes in accordance with the present invention, vibrating nozzles are used to disperse the uranyl nitrate solution into droplets which are then introduced into a vertical column of an immiscible oil, gel-forming solution. The size of the nozzles and the vibration frequency determine the droplet sizes, and, thus, the microsphere sizes. As the uranyl nitrate droplets fall vertically within the gel-forming solution, heat transfer between the gel-forming solution and the droplets causes the uranyl nitrate to form ADU from the ammonia produced by the decomposition of hexanethylenesracmine ("HMTA"). Preferably, the gel-forming solution will flow in the opposite direction of the droplets to slow the descent of the droplet and permit additional time for the uranyl nitrate solution to form microspheres with sufficient strength to avoid sphere deformation at the bottom of the column. Column heating to 50–100° C. advantageously increases the formation of ADU. The ADU gel spheres are collected at the bottom of the column. Typically, the gel spheres are fragile and require careful handling to avoid breakage.

The gel spheres are then aged in an ammonium hydroxide solution. After aging, the "green" gel spheres are dried at low temperatures to remove water and excess ammonia. Subsequently, a vertical tube furnace converts and sinters the microspheres under an inert gas-hydrogen atmosphere. While argon and helium are acceptable inert gases, it is preferable to utilize nitrogen due to its low cost and availability. Furthermore, since nitrogen is slightly reactive, it will advantageously form uranium nitrides in concentrations up to 10,000 ppm, and more typically in the range of 300 to 1,000 ppm, which will also function as a radiation shielding material.

The final, sintered spheres have individual densities usually exceeding 95% of the theoretical density for uranium dioxide. Coarse microspheres (e.g., about 1,000 microns in diameter) might provide spatial densities of 65–70% of theoretical, and the addition of a finer microsphere (e.g., about 300 microns in diameter) might provide spatial densities of 80–85% of theoretical. As a result, two or three size fractions are typically preferred in order to achieve spatial densities approaching 90%. For example, a 60 wt. % fraction of 1,000 micron spheres, a 20 wt. % fraction of 300 micron spheres, and a 20 wt. % fraction of 30 micron spheres can be used to achieve spatial densities in the 90–95% range.

Table 4.2 and Table 4.2a show the overall material and energy balances for production of uranium dioxide microspheres and uranium carbide microspheres in accordance with the present invention.

TABLE 4.2

| Component | Input, Percent of Nominal | | | Output, Percent of Nominal | | |
|---|---|---|---|---|---|---|
| | 50% | 100% | 150% | 50% | 100% | 150% |
| $UF_6$ | 14,000 | 28,000 | 42,000 | 0 | 0 | 0 |
| $UO_2$ | 0 | 0 | 0 | 10,640 | 21,280 | 31,920 |
| HF | 0 | 0 | 0 | 3,180 | 6,360 | 9,540 |
| $CaF_2$ | 0 | 0 | 0 | 3,062 | 6,123 | 9,185 |
| HMTA | 414 | 827 | 1,241 | 0 | 0 | 0 |
| Urea | 287 | 574 | 861 | 0 | 0 | 0 |
| Ammonium Hydroxide | 1,400 | 2,700 | 4,100 | (0) | (0) | (0) |
| Argon | 77 | 153 | 230 | 0 | 0 | 0 |
| Nitrogen | 6,511 | 13,022 | 19,533 | 0 | 0 | 0 |
| Water | 28,000 | 56,000 | 84,000 | 0 | 0 | 0 |
| CaO (lime) | 2,200 | 4,400 | 6,600 | 0 | 0 | 0 |
| NaOH | 6,000 | 12,100 | 18,000 | 0 | 0 | 0 |
| Oil (Column) | 578 | 1,156 | 1,734 | 0 | 0 | 0 |
| Electricity, KW | 9,100 | 18,184 | 27,300 | 0 | 0 | 0 |
| Natural Gas, SCM | 1E6 | 1E6 | 1.5E6 | 0 | 0 | 0 |
| Diesel Fuel, Liters | 6,000 | 11,500 | 18,000 | 0 | 0 | 0 |

TABLE 4.2a

| Component | Input | | | Output | | |
|---|---|---|---|---|---|---|
| | 50% | 100% | 150% | 50% | 100% | 150% |
| $UF_6$ | 14,000 | 28,000 | 42,000 | 0 | 0 | 0 |
| $UC_2$ | 0 | 0 | 0 | 10,500 | 20,840 | 31,500 |
| $HF_{(nh)}$ | 0 | 0 | 0 | 3,180 | 6,360 | 9,540 |
| $CaF_2$ | 0 | 0 | 0 | 3,062 | 6,123 | 9,185 |
| HMTA | 414 | 827 | 1,241 | 0 | 0 | 0 |
| Urea | 287 | 574 | 861 | 0 | 0 | 0 |
| Ammonium Hydroxide | 1,400 | 2,700 | 4,100 | (0) | (0) | (0) |
| Carbon Pigment | 1,425 | 2,850 | 4,275 | 0 | 0 | 0 |
| Argon | 600 | 1,200 | 1,800 | 0 | 0 | 0 |
| Nitrogen | 6,511 | 13,022 | 19,533 | 0 | 0 | 0 |
| Water | 28,000 | 56,000 | 84,000 | 0 | 0 | 0 |
| CaO (lime) | 2,200 | 4,400 | 6,600 | 0 | 0 | 0 |
| NaOH | 9,000 | 17,600 | 27,000 | 0 | 0 | 0 |
| Methane | 1,850 | 3,726 | 5,550 | 0 | 0 | 0 |

TABLE 4.2a-continued

| Com- | Input | | | Output | | |
|---|---|---|---|---|---|---|
| ponent | 50% | 100% | 150% | 50% | 100% | 150% |
| Propylene | 2,070 | 4,141 | 6,210 | 0 | 0 | 0 |
| Oil (Column) | 578 | 1,156 | 1,734 | 0 | 0 | 0 |
| Electricity, KW | 10,000 | 20,100 | 30,000 | 0 | 0 | 0 |
| Natural Gas SCM | 1E6 | 1E6 | 1.5E6 | 0 | 0 | 0 |
| Diesel Fuel, Liters | 6,000 | 11,500 | 18,000 | 0 | 0 | 0 |

Each of the following steps are now addressed in greater detail:
A. Uranium Hexafluoride Receiving And Volatilization;
B. Uranyl Fluoride Production By Reaction Of Uranium Hexafluoride And Steam;
C. Uranyl Fluoride Collection, Quenching And Addition Of Water To Form An Aqueous Uranyl Fluoride Solution;
D. Uranyl Fluoride Solution Distillation To Adjust Residual Hydrogen Fluoride Concentration;
E. Uranyl Nitrate Solution Formation By Addition Of Calcium Nitrate And Precipitation Of Calcium Fluoride;
F. Uranyl Nitrate Solution Adjustment By The Addition Of Urea And Increase In Acidity;
G. Gel Solution Preparation And Addition To Uranyl Nitrate Solution;
H. Gel Sphere Formation By Internal Gelation Techniques;
I. Oil Purification;
J. Gel Sphere Aging By Setting/Washing With Ammonium Hydroxide;
K. Gel Sphere Drying And Liberation Of Ammonia And Water;
L. Gel Sphere Conversion And Sintering;
M. Gel Sphere Collection;
The following additional steps are advantageously undertaken in connection with the overall process design:
N. Calcium Nitrate Reconstitution;
O. Ammonium Hydroxide Solution Purification;
P. Vertical Tube Furnace Gas Purification;
Q. Ammonium Hydroxide Reconstitution;
R. Urea And HMTA Recovery;
S. Cylinder Decontamination; and
T. Waste Management.

A. Uranium Hexafluoride Receiving and Volatilization

FIG. 4.3 depicts the flow sheet for the Depleted Uranium Hexafluoride Receiving and Volatilization Station. Correspondingly, Table 4.3 shows the material and energy balances for the streams of flow identified by numerals inside circles in FIG. 4.3 (for example, Stream 1 is identified by ①). In a similar manner hereinafter in this specification, a table having a specific numerical identification will correspond with a figure having the same specific numerical identification (such as Table 4.3 and FIG. .4.3 or Table 4.4 and FIG. 4.4).

TABLE 4.3

| | Stream Number, Metric Tons per Year (Te/yr) | | | | | | |
|---|---|---|---|---|---|---|---|
| Component | 1 | 2 | 3 | 4 | 5 | 6 | 7 |
| $UF_6$ (solid) | 28,000 | 0 | 0 | 51 | 0 | 0 | 0 |
| $UF_6$ (gas) | 0 | 28,000 | 28,000 | 0 | 0 | 0 | 0 |
| Steam | 0 | 0 | 0 | 0 | 1,680 | 0 | 0 |
| Water (Con) | 0 | 0 | 0 | 0 | 0 | 1,680 | 0 |
| Cylinders | (2,240) | 0 | 0 | (2,240) | 0 | 0 | 0 |
| Facility Waste | 0 | 0 | 0 | 0 | 0 | 0 | 2,880 l/yr |
| Total | 28,000 | 28,000 | 28,000 | 3,411 | 1,680 | 1,680 | 2,880 l/yr |
| Temp., ° C. | 25 | 60 | −70 | −25 | −125 | −50 | 25 |
| Flow, liter/hr | 1,507 | −511,000 | 365,000 | 1,507 | 144,000 | 192 | 2,880 l/yr |

Depleted uranium hexafluoride is obtained from enrichment plants in standard, 14 tonne cylinders; a typical 14 tonne cylinder will contain about 12.5 tonnes of solid uranium hexafluoride. The extra space provides room for expansion, when the solid uranium hexafluoride is heated. These uranium hexafluoride cylinders 1 are received by truck and rail in the Cylinder Shipping and Receiving Station and stored until needed. It is desirable to utilize a storage building having capacity for enough cylinders for one month's operation (i.e. approximately 300 cylinders) and additional capacity for storage of an equivalent number of empty cylinders 4 while they await shipment to the Cylinder Disposal Facility. Prior to use, the uranium hexafluoride cylinders are transferred to the Full Cylinder Temporary Storage Station.

A feed of uranium hexafluoride gas is obtained by heating the uranium hexafluoride cylinders in an autoclave. Heating causes the solid uranium hexafluoride to sublime, so that the pressurized uranium hexafluoride vapor above the phase can be extracted. Heating of the cylinders is achieved by heating air within the autoclave with steam 5 from a Steam Plant. The oven is heated to a temperature sufficient to cause sublimation but, below the liquefaction temperature for uranium hexafluoride (about 150° F.). The heating rate is preferably selected to maintain the uranium hexafluoride under subatmospheric pressure. In a preferred embodiment, the oven is heated to about 140° F. in one hour. At this temperature, the uranium hexafluoride temperature will be lower, e.g., about 125° F., and the corresponding cylinder pressure will be below atmospheric pressure, e.g. 10 psia. At these pressures, stresses on the cylinders are avoided.

The pressure of the uranium hexafluoride gas 4 is then slightly increased (5–10 psig) to near atmospheric conditions using a feed compressor. This increase in pressure also causes the temperature of the uranium hexafluoride gas to increase to about 212° F.

The uranium hexafluoride feed 4 is then directed sent to the $UO_2F_2$ Production Facility for further processing. In the exemplary process set forth in FIG. 4.3, uranium hexafluoride feed rates of about 28,000 tones/year, i.e. 3,200 kg/hr, are employed. At these feed rates, approximately 88 tonnes of uranium hexafluoride can be processed on a daily basis, requiring approximately 7 cylinders of depleted uranium hexafluoride per day. A typical gas diffusion plant has a gaseous feed station consisting of three ovens: (1) a first oven heating a full cylinder of uranium hexafluoride (requiring approximately two hours); (2) a second oven supplying gaseous uranium hexafluoride to the enrichment operations at typical feed rates of 1,500–2,000 kg/hr (requiring approximately four to six hours); and (3) a third oven cooling down (requiring approximately 1–2 hours). Thus, a typical gas diffusion plant can process about four cylinders per day. Nevertheless, the preferred feed rates of 3,200 kg/hr can be achieved by utilizing five ovens, sequenced as follows: (1) Oven 1: Heating, two hours; (2) Oven 2: Feeding, first two hours; (3) Oven 3: Feeding, second two hours; (4) Oven 4: Feeding, third two hours; (5) Oven 5: Cooling, 1–2 hours (i.e., hot cylinders have to be cooled prior to moving). It would also be desirable to have an additional oven as a spare for use during maintenance or in the event of a breakdown. Adding two additional ovens, one as a spare for the heating phase and one as a spare for the feeding operation would also assist in assuring an uninterrupted supply of uranium hexafluoride at the design flow rate.

The approach set forth above represents "hot feeding" of the cylinders, with pressures exceeding 25 psig. Where concerns exist regarding the pressure rating of the uranium hexafluoride cylinders, cylinder pressurization can be avoided by "cold feeding" the uranium hexafluoride at temperatures below 147° F. using a withdrawal compressor with sublimation from the solid uranium hexafluoride. Since cold feeding is generally restricted to lower feedrates, typically in the 360–450 kg/hr (800–1,000 lb/hr) range per cylinder, it would take approximately 35 hours to empty a cylinder containing 12.5 tonnes of uranium hexafluoride. (The feedrate typically drops to 180–200 kg/hr about 400 lb/hr when a withdrawal compressor is not used.) Thus, in order to obtain the desired overall feedrate of 3200 kg/hr at 360 kg/hr per oven, the gelation plant would require simultaneous feeding of about 9 cylinders. The following oven sequence would be advantageous in this situation: (a) Oven 1: Heating, two hours maximum; (b) Oven 2–10: Feeding, probably on a 3–4 hour sequence/changeout schedule; (c) Oven 11: Cooling, one–two hours; (d) Oven 12: Spare, for heating/feeding; and (e) Oven 13: Spare, for cooling. Once again, it would be desirable to have an additional oven as a spare for use during maintenance or in the event of a breakdown.

In order to minimize or avoid cylinder pressurization, the flow sheets and mass balances set forth in this exemplary process utilize the 100% baseline case for cold-feeding of uranium hexafluoride using thirteen autoclaves and one spare.

After the uranium hexafluoride is discharged, a "heeling" compressor (not shown) is used to reduce the empty cylinder pressure to less than 1 psia and the residual uranium hexafluoride "heel" to 4.5 kg (10 lb). Heel compressor requirements shown in Table 4.3 are estimated as 10% of the main compressor. Empty cylinders 4 are sent to Empty Cylinder Temporary Storage before shipping to Cylinder Shipping and Receiving and, eventually, forwarded to the Cylinder Disposal Facility.

Condensate 6 from the Autoclave Facility is fed to the Condensate Return and recycled to the steam plant. Facility waste 7, such as personnel protective clothing and equipment, is sent to the waste treatment station.

B. Uranyl Fluoride Production By Reaction Of Uranium Hexafluoride and Steam

FIG. 4.4 depicts the flow sheet for the $UO_2F_2$ Production Station, including, inter alia, the reaction of depleted uranium hexafluoride gas with steam to produce $UO_2F_2$. The material and energy balances for the exemplary process are shown in Table 4.4.

TABLE 4.4

Section 1

Stream Number, Metric Tons per Year (Te/yr)

| Component | 1 | 2 | 3 | 4 | 5 | 6 |
|---|---|---|---|---|---|---|
| $UF_6$ (gas) | 28,000 | 0 | 0 | 0 | 0 | 0 |
| $UO_2F_2$ (solid) | 0 | 0 | 0 | 0 | Trace | 0 |
| Steam | 0 | 1,430 | 0 | 3.472 | 0 | 0 |
| Water | 0 | 0 | 3,472 | 0 | 0 | 0 |
| HF | 0 | 0 | 0 | 0 | 6,360 | 0 |
| Facility Waste | 0 | 0 | 0 | 0 | 0 | 2,880 l/yr |
| Total | 28,000 | 1,430 | 3,472 | 3,472 | 6,360 | 2,880 l/yr |
| Temp., ° C. | −70 | 125 | 25 | 125 | 200 | 25 |
| Flow, l/hr | 365,000 | 122,000 | 400 | 300,000 | 726 | 2880 l/yr |

TABLE 4.4

Section 2

Stream Number, Metric Tons per Year (Te/yr)

| Component | 7 | 8 | 9 | 10 | 11 | 12 |
|---|---|---|---|---|---|---|
| $UF_6$ (gas) | 0 | 0 | 0 | 0 | 0 | 0 |
| $UO_2F_2$ (solid) | 0 | 0 | 0 | 24500 | 0 | 245,000 |
| Steam | 0 | 0 | 0 | 0 | 0 | 0 |
| Water | 212,360 | 17,700 | 0 | 0 | 90,862 | 963,000 |
| HF | 0 | 0 | 6,360 | 320 | 0 | 3,200 |
| Facility Waste | 0 | 0 | 0 | 0 | 0 | 0 |
| Total | 212,360 | 17,700 | 6,360 | 24,820 | 90,862 | 1,212,000 |
| Temp., ° C. | 25 | 25 | 25 | −100 | 25 | 25 |
| Flow, l/hr | 24,240 | 2,020 | 726 | 1,420 | 10,400 | 115,000 |

TABLE 4.4

Section 3

Stream Number, Metric Tons per Year (Te/yr)

| Component | 13 | 14 | 15 | 16 | 17 | 18 |
|---|---|---|---|---|---|---|
| $UF_6$ (gas) | 0 | 0 | 0 | 0 | 0 | 0 |
| $UO_2F_2$ solid | 24,500 | 0 | 24500 | 245000 | 0 | 0 |
| Steam | 0 | 0 | 0 | 0 | 0 | 0 |
| Water | 96,350 | 580 | 96,350 | 963,500 | 17,660 | 17,660 |

TABLE 4.4-continued

Section 3

Stream Number, Metric Tons per Year (Te/yr)

| Component | 13 | 14 | 15 | 16 | 17 | 18 |
|---|---|---|---|---|---|---|
| HF | 320 | 320 | 0 | 0 | 0 | 0 |
| Facility Waste | 0 | 0 | 0 | 0 | 0 | 0 |
| Total | 121,200 | 900 | 120,850 | 1,208,500 | 17,660 | 17,700 |
| Temp., ° C. | 25 | 25 | 25 | 25 | 25 | 45 |
| Flow, l/hr | 11,500 | 103 | 11,500 | 115,000 | 2,016 | 2,020 |

TABLE 4.4

Section 4

Stream Number, Metric Tons per Year (Te/yr)

| Component | 19 | 20 | 21 | 22 | 23 | 24 |
|---|---|---|---|---|---|---|
| $UF_6$ (gas) | 0 | 0 | 0 | 0 | 0 | 0 |
| $UO_2F_2$ (solid) | 0 | 0 | 0 | 0 | 0 | 0 |
| Steam | 0 | 0 | 0 | 0 | 0 | 0 |
| Water | 17,660 | 177,000 | 212,360 | 177,00 | 87,390 | 0 |
| HF | 0 | 0 | 0 | 0 | 0 | 6,360 |
| Facility Waste | 0 | 0 | 0 | 0 | 0 | 0 |
| Total | 17,660 | 177,000 | 212,360 | 177,000 | 87,390 | |
| Temp., ° C. | 45 | 45 | 45 | 45 | 25 | 100 |
| Flow, l/hr | 2,016 | 20,210 | 24,240 | 20,210 | 10,000 | 726 |

TABLE 4.4

Section 5

Stream Number, Metric Tons per Year (Te/yr)

| Component | 25 | 26 | 27 | 28 |
|---|---|---|---|---|
| $UF_6$ (gas) | 0 | 0 | 0 | 0 |
| $UO_2F_2$ (solid) | 0 | 0 | 0 | 52 |
| Steam | 2,066 | 636 | 0 | 0 |
| Water | 0 | 0 | 636 | 8,966 |
| HF | 0 | 0 | 0 | 0 |
| Facility Waste | 0 | 0 | 0 | 0 |
| Total | 2,066 | 636 | 636 | 9,012 |
| Temp., ° C. | 125 | 125 | 25 | 25 |
| Flow, l/hr | 237,000 | 73,000 | 73 | 1,030 |

Uranium hexafluoride is reacted with steam according to the following equation:

$$UF_6 + 2H_2O \rightarrow UO_2F_2 + 4HF_{(anh)} + 256KW_{(t)}$$

In the preferred embodiment, uranium hexafluoride gas 1 from the $DUF_6$ Receiving and Volatilization Station and steam 2 from the steam plant 25 are combined in a reactor vessel, such as a pyrolysis reactor or kiln. In the exemplary process shown in FIG. 4.4, the uranium hexafluoride gas 1 and steam 2 are introduced concurrently into a pyrolysis reactor at about 200–300° C. This reaction is exothermic and proceeds spontaneously. At temperatures over about 150° C., no excess steam is required and this reaction produces essentially anhydrous hydrogen fluoride. Thus, stoichiometric efficiencies are assumed in the flow sheet shown in FIG. 4.4. In order to prevent runaway temperatures and provide steam for subsequent use in the Steam Plant, the heat of reaction is advantageously used to generate steam 4 from deionized water stream 3.

The gas 5 exiting the reactor vessel consists primarily of anhydrous hydrogen fluoride gas with traces of entrained uranyl fluoride powder. The uranyl fluoride powder is removed downstream of the reactor vessel using cyclone separators and filters. The hydrogen fluoride gas 24 can be subsequently condensed and collected in an HF Storage Facility. The stored hydrogen fluoride 9 can be dispensed as a saleable product.

C. Uranyl Fluoride Collection, Quenching and Formation Of An Aqueous Uranyl Fluoride Solution FIG. 4.4 depicts the flow sheet for the $UO_2F_2$ Production Station, including, inter alia, the collection of $UO_2F_2$ and the subsequent quenching and formation of an aqueous uranyl fluoride solution. The material and energy balances for the exemplary process are shown in Table 4.4.

The uranyl fluoride powder 10 formed in the pyrolysis reactor is collected and removed by a screw auger device (not shown). Since the uranyl fluoride powder formed in the reactor vessel is discharged at elevated temperatures, the powder 10 is preferably quenched in a water spray and dissolved in a water solution made up of deionized water 23 and wash water 28 from the Cylinder Decontamination Station. The hydration reaction is represented by the following equation:

$$UO_2F_{2(s)} + 6H_2O \rightarrow UO_2F_2 \cdot 6H_2O + 5kCal_{(t)}$$

The heat of hydration is removed by the circulation of cooling water 17 through coils (not shown) disposed in the quenching system. The resulting uranyl fluoride solution 13 is transmitted to the Distillation Station for further processing.

D. Uranyl Fluoride Solution Distillation To Adjust Residual Hydrogen Fluoride Concentration FIG. 4.4 depicts the flow sheet for the $UO_2F_2$ Production Station, including, inter alia, distillation of the uranyl fluoride solution to adjust the residual hydrogen fluoride concentration. The material and energy balances for the exemplary process are shown in Table 4.4.

A small fraction, approximately 5%, of the anhydrous hydrogen fluoride produced in the pyrolysis reactor may be entrained with the uranium fluoride powder and, thus, become hydrated in the Quench Reactor. It is expected that the hydrated hydrogen fluoride in the quenched uranyl fluoride solution 13 can be removed by distillation in the Distillation Station. Heat for the distillation is provided by steam 26 provided from the steam plant 25. The distilled product 14 can be returned to the pyrolysis reactor as the azeotrope, $HF \cdot 2H_2O$. The sizing of the distillation column shown in exemplary process in Table 4.6.2 is based upon 5% carryover of hydrogen fluoride. Facility waste 6 is sent to Waste Management.

The distilled uranyl fluoride solution 15 is shipped to the $UO_2F_2$ Storage facility where it is available for shipping to the $UO_2F_2$ Precipitation Station.

E. Uranyl Nitrate Solution Formation By Addition Of Calcium Nitrate and Precipitation Of Calcium Fluoride FIG. 4.5 depicts the flow sheet for the Uranyl Nitrate Formation Station. The material and energy balances for the exemplary process are shown in Table 4.5.

TABLE 4.5

Section 1

Stream Number, Metric Tons per Year (Te/yr)

| Component | 1 | 2 | 3 | 4 | 5 | 6 | 7 |
|---|---|---|---|---|---|---|---|
| $UO_2F_2$ | 24,500 | 0 | 0 | 0 | 0 | 0 | 0 |
| $UO_2(NO_2)_2$ | 0 | 0 | 0 | 0 | 0 | (trace) | 0 |
| Water | 96,350 | 6,123 | 0 | (trace) | 6,123 | 6,123 | 51,496 |
| Calcium Nitrate | 0 | 0 | (trace) | 0 | 0 | 0 | 12,874 |
| $CaF_2$ | 0 | 0 | 0 | 0 | 0 | (trace) | 0 |
| Facility Waste | 0 | 0 | 0 | 0 | 0 | 0 | 0 |
| Total | 120,850 | 6,123 | (trace) | (trace) | 6,123 | 6,123 | 64,370 |
| Temp., °C. | 25 | 25 | 25 | 25 | 25 | 25 | 25 |
| Flow, liter/hr | 11,500 | 700 | (trace) | (trace) | 700 | 700 | 6,100 |

TABLE 4.5

Section 2

Stream Number, Metric Tons per Year (Te/yr)

| Component | 8 | 9 | 10 | 11 | 12 | 13 | 14 |
|---|---|---|---|---|---|---|---|
| $UO_2F_2$ | 0 | 0 | 0 | 0 | 0 | 0 | 0 |
| $UO_2(NO_2)_2$ | 30,929 | 0 | 30,929 | 0 | 0 | 0 | 0 |
| Water | 154,295 | 6,123 | 148,172 | 6,123 | 0 | 6,123 | 51,496 |
| Calcium Nitrate | 0 | 0 | 0 | 0 | 0 | 0 | 12,874 |
| $CaF_2$ | 6,123 | 6,123 (1) | 0 | 6,123 (1) | 0 | 6,123 (1) | 0 |
| Facility Waste | 0 | 0 | 0 | 0 | $2,880^2$ | 0 | 0 |
| Total | 191,347 | 12,246 | 179,101 | 12,246 | $2,880^2$ | 12,246 | 64,370 |
| Temp, °C. | 25 | 25 | 25 | 25 | 25 | 25 | 25 |
| Flow, liter/hr | 18,200 | 930 | 17,000 | 700 | $2,880^2$ | 700 | 6,100 |

In the past, gelation methods for producing dense uranium dioxide utilized nitrate solutions generated from uranium oxides as chemical substitutes for nitrate solutions from reprocessing nuclear fuels. Nevertheless, it is believed that uranium fluoride solutions can be used directly for gel formation without subsequent processing. The direct use of uranyl fluoride solutions uses concentrations between 0.1 and 40%, and preferably 15–25% in uranyl fluoride. However, since nitrate solutions have previously found favorable application in the past, the exemplary process shown in FIG. 4.5 includes the additional steps for forming the nitrate solution. The material and energy balances relating to this conversion are contained in Table 4.5.

A calcium nitrate solution 14 from the Calcium Nitrate Reconstitution Station and, as needed, fresh calcium nitrate powder 3 are combined with deionized water 4 obtained from the Deionized Water Supply 2 in a mixing vessel. The resulting calcium nitrate solution 7 and uranyl fluoride solution 1 from the $UO_2F_2$ Storage facility are introduced into a precipitator vessel. Tramp and washwater 6 from the Slurry Washer/Dryer, described below, may also be introduced into the Precipitator. The aqueous calcium nitrate reacts with the uranyl fluoride solution to form a slurry 8 of uranyl nitrate and calcium fluoride according to the following stoichiometric relation:

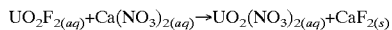

$$UO_2F_{2(aq)} + Ca(NO_3)_{2(aq)} \rightarrow UO_2(NO_3)_{2(aq)} + CaF_{2(s)}$$

The heat of reaction is expected to negligible. The slurry 8 is transferred to a liquid cyclone where the calcium fluoride precipitate is removed. A fraction of the calcium fluoride can be recirculated to function as seed crystals in the Precipitator.

The calcium fluoride precipitate 9 is washed and dried in the Slurry Washer/Dryer using deionized water 5 from the Deionized Water Supply. The resulting dry calcium fluoride product 11 is transmitted to a $CaF_2$ Storage Facility. Since the uranium concentration associated with the calcium fluoride is anticipated to be sufficiently low, the stored calcium fluoride 13 can be dispensed as a saleable product.

The uranyl nitrate solution 10 is sent to the Uranyl Nitrate Solution Adjustment Station.

Waste 12 from the Uranyl Nitrate Formation Station is forwarded to Waste Treatment.

F. Uranyl Nitrate Solution Adjustment By The Addition Of Urea, Concentrating The Solution, And Increasing The Acidity FIG. 4.6.2 depicts the flow sheet for the Uranyl Nitrate Adjustment Station. The material and energy balances for the exemplary process for production of uranium dioxide microspheres and uranium carbide microspheres arc shown in Table 4.6.2 and Table 4.6.2a, respectively.

TABLE 4.6.2

Section 1

Stream Number, Metric Tons per Year (Te/yr)

| Component | 1 | 2 | 3 | 4 | 5 | 6 | 7 |
|---|---|---|---|---|---|---|---|
| $UO_2(NO_3)_2$ | 30,929 | 0 | 0 | 23,197 | 23,197 | 0 | 0 |
| U (complexed) | 0 | 0 | 0 | 4,671 | 4,671 | 0 | 0 |
| Urea | 0 | 0 | 5,890 | 5,890 | 5,890 | 0 | 5,316 |
| $HNO_3$ | 0 | 3,110 | 0 | 0 | 0 | 0 | 0 |
| Water | 148,172 | 141,214 | 23,560 | 30,469 | 30,469 | 13,398 | 10,162 |
| Facility Waste | 0 | 0 | 0 | 0 | 0 | 0 | 0 |
| Total | 179,101 | 144,324 | 29,450 | 64,227 | 64,227 | 13,398 | 15,478 |
| Temp., °C. | 25 | 60 | 25 | 60 | 0 | 25 | 25 |
| Flow, liter/hr. | 17,000 | 16,475 | 3,050 | 4,073 | 4,073 | 1,529 | 1,472 |

TABLE 4.6.2

Section 2

Stream Number, Metric Tons per Year (Te/yr)

| Component | 8 | 9 | 10 | 11 | 12 | 13 |
|---|---|---|---|---|---|---|
| $UO_2(NO_3)_2$ | 0 | 23,197 | 0 | 23,197 | 0 | 0 |
| U (complexed) | 0 | 4,671 | 0 | 4,671 | 0 | 0 |
| Urea | 574 | 5,890 | 0 | 5,890 | 0 | 0 |
| $HNO_3$ | 0 | 0 | 0 | 0 | 0 | 0 |
| Water | 0 | 30,469 | 0 | 30,469 | 71,400 | 71,400 |
| Facility Waste | 0 | 0 | $2,880^3$ | 0 | 0 | 0 |
| Total | 574 | 64,227 | $2,880^3$ | 64,277 | 71,400 | 71,400 |
| Temp., °C. | 25 | 0 | 25 | 38 | 25 | 45 |
| Flow, liter/hr. | 33 | 4,073 | $2,880^3$ | 4,073 | 8,151 | 8,151 |

TABLE 4.6.2a

Section 1

Stream Number, Metric Tons per Year (Te/yr)

| Component | 1 | 2 | 3 | 4 | 5 | 6 | 7 |
|---|---|---|---|---|---|---|---|
| $UO_2(NO_3)_2$ | 30,929 | 0 | 0 | 23,197 | 23,197 | 0 | 0 |
| U (complexed) | 0 | 0 | 0 | 4,671 | 4,671 | 0 | 0 |
| Urea | 0 | 0 | 5,890 | 5,890 | 5,890 | 0 | 5,316 |
| $HNO_3$ | 0 | 3,110 | 0 | 0 | 0 | 0 | 0 |
| Carbon | 0 | 0 | 0 | 2,850 | 2,850 | 0 | 0 |
| Water | 148,172 | 152,614 | 23,560 | 30,469 | 30,469 | 13,398 | 10,162 |
| Facility Waste | 0 | 0 | 0 | 0 | 0 | 0 | 0 |
| Total | 179,101 | 155,724 | 29,450 | 64,227 | 64,227 | 13,398 | 15,478 |
| Temp., °C. | 25 | 60 | 25 | 60 | 0 | 25 | 25 |
| Flow, liter/hr | 17,000 | 17,727 | 3,050 | 4,073 | 4,073 | 1,529 | 1,472 |

TABLE 4.6.2a

Section 2

Stream Number, Metric Tons per Year (Te/yr)

| Component | 8 | 9 | 10 | 11 | 12 | 13 | 14 |
|---|---|---|---|---|---|---|---|
| $UO_2(NO_3)_2$ | 0 | 23,197 | 0 | 23,197 | 0 | 0 | 0 |
| U (complexed) | 0 | 4,671 | 0 | 4,671 | 0 | 0 | 0 |
| Urea | 574 | 5,890 | 0 | 5,890 | 0 | 0 | 0 |
| $HNO_3$ | 0 | 0 | 0 | 0 | 0 | 0 | 0 |
| Carbon | 0 | 2,850 | 0 | 0 | 0 | 0 | 2,850 |
| Water | 0 | 30,469 | 0 | 30,469 | 71,400 | 71,400 | 11,400 |
| Facility Waste | 0 | 0 | $2,880^{(3)}$ | 0 | 0 | 0 | 0 |
| Total | 574 | 67,077 | $2,880^{(3)}$ | 64,277 | 71,400 | 71,400 | 14,250 |
| Temp., °C. | 25 | 0 | 25 | 38 | 25 | 45 | 50 |
| Flow, liter/hr | 33 | 4,254 | $2,880^{(3)}$ | 4,073 | 8,151 | 8,151 | 1,356 |

It has been found that more desirable gelation occurs if the uranyl nitrate solution is adjusted prior to gelation. In particular, it is desirable to decrease the acidity of uranyl nitrate solution and to add urea ($CO(NH_2)_2$) in order to stabilize the uranyl ion.

Recycled urea 7 from the Urea Recycle Station, described below, is combined with deionized water 6 obtained from the Deionized Water Supply in a mixing vessel. The urea is dissolved and, as necessary, urea powder 8 is added to form a solution having a molar ratio of 1 to 1.5, and preferably 1.25, urea to uranium.

The urea solution 3 is added to the uranyl nitrate solution 1 from the Uranyl Nitrate Formation Station in a Vapor Recompression (VR) Evaporator. The VR Evaporator provides the benefits of multistage evaporation in a single-stage unit and achieves typical evaporation efficiencies of 0.0452 KW-hr per kg of water (35 BTU/lb of water evaporated, as compared to normal values of around 1,000 BTU/lb). The evaporator advantageously performs three functions: (1) mixing the urea with the uranium solution to form the urea/uranium complex; (2) concentrating the uranium solution; and (3) rendering the solution slightly acid deficient (i.e., having an anion (nitrate and fluoride) to uranium molar ratio of 1.5 instead of 2). The uranyl nitrate solution generated by the VR Evaporator contains uranium in the 4.8–3.0 molar concentration range (Table 4.6.2 utilizes a value of 2.2 molar) and is dense, with a specific gravity of approximately 4.8. The overhead product evolved from the VR Evaporator is a dilute nitric acid solution 2 (approximately 2%), which is transferred to the Calcium Nitrate Reconstitution Station, described below.

As the uranyl nitrate solution is generated in the VR Evaporator it is transferred to a Uranyl Nitrate Storage Tank. The uranyl nitrate solution 4 is then chilled to approximately 0° C. before the chilled solution 9 is transferred to the Gel Solution Preparation Station. Since the solution boiling point elevation data for this solution is not readily available, the evaporation energy shown in the material and energy balance in Table 4.6.2 is estimated at 0.1292 KW-hr/kg (100 BTU/lb).

Facility waste 10 from the Uranyl Nitrate Adjustment Station is sent to Waste Treatment.

In the preferred gelation process, the uranium feed material is obtained in the form of uranium hexafluoride. However, Uranium and, in particular, depleted uranium is available in a variety of forms, such as uranium metal, low density uranium oxides, and uranium tetrafluoride. Thus, it is desirable to incorporate theses forms into the gelation process. In accordance with the present invention, the uranyl fluoride solution beneficially assists the dissolution of alternative feed materials. In particular, the uranyl fluoride solution can be used to dissolve alternative uranium feed materials. It is believed that this alternative route will be particularly advantageous because it utilizes fewer reagents, requires less precipitant, and generates less waste. Thus, it is expected that 80–100% of its total uranium feed will be obtained as uranyl fluoride, derived from the uranium hexafluoride, with the remaining 0–20% of the uranium feed obtained from alternative sources of uranium. It may be desirable to facilitate the process by adding less than stoichiometric amounts of nitric or hydrofluoric acid and 0.0001–0.5% a catalyst such as fluorboric acid ($HBF_4$), fluorboric acid as a catalyst. Urea at a 1–1.5 molar ratio (to the total uranium) is also added prior to dissolution of the alternative uranium form. After dissolution, 0.01–10% of aluminium, as the fluoride or nitrate, is added to complex the fluoride ion.

G. Preparation Of Gel-Former Solution Having An Ammonia Releasing Compound

FIG. 4.7 depicts the flow sheet for the Gel Former Preparation Station. The material and energy balances for the exemplary process for production of uranium dioxide microspheres and uranium carbide microspheres are shown in Table 4.7 and Table 4.7a, respectively.

TABLE 4.7

Section 1

| Component | Stream Number, Metric Tons per Year (Te/yr) | | | | | | |
|---|---|---|---|---|---|---|---|
| | 1 | 2 | 3 | 4 | 5 | 6 | 7 |
| $UO_2(NO_3)_2$ | 23,197 | 0 | 0 | 0 | 0 | 0 | 0 |
| U (complexed) | 4,671 | 0 | 0 | 0 | 0 | 0 | 0 |
| Urea | 5,890 | 0 | 280 | 0 | 0 | 0 | 0 |
| HMTA | 0 | 0 | 5,715 | 827 | 16,542(1) | 165,542 | 16,542 |
| Water | 30,469 | trace | 22,844 | 0 | 22,844 | 228,440 | 22,844 |
| Facility Waste | 0 | 0 | 0 | 0 | 0 | 0 | 0 |
| Total | 64,227 | trace | 8,559 | 827 | 393,386 | 39,386 | 39,386 |
| Temp., ° C. | 0 | 25 | 25 | 25 | 25 | 0 | 0 |
| Flow, liter/hr. | 4,073 | trace | 3,650 | 50 | 3,747 | 37,470 | 3,747 |

TABLE 4.7

Section 2

| Component/Item | Stream Number, Metric Tons per Year (Te/yr) | | | |
|---|---|---|---|---|
| | 8 (3) | 9 (3) | 10 (3) | 11 |
| $UO_2(NO_3)_2$ | 23,197 | 16,238 | 6,959 | (trace) |
| U (complexed) | 4,671 | 3,270 | 1,401 | (trace) |
| Urea | 5,890 | 4,123 | 1,767 | 0 |
| HMTA | 16,542 | 11,579 | 4,963 | 0 |
| Water | 53,313 | 37,319 | 15,994 | 0 |
| Facility Waste | 0 | 0 | 0 | 2,880[5] |
| Total | 103,613 | 72,529 | 31,084 | 2,880[5] |
| Temp., ° C. | 0 | 0 | 0 | 25 |
| Flow, liter/hr. | 6,571 (2) | 4,600 | 1,971 | 2,880[5] |

TABLE 4.7a

Section 1

Stream Number, Metric Tons per Year (Te/yr)

| Component | 1 | 2 | 3 | 4 | 5 | 6 | 7 |
|---|---|---|---|---|---|---|---|
| $UO_2(NO_3)_2$ | 23,197 | 0 | 0 | 0 | 0 | 0 | 0 |
| U (complexed) | 4,671 | 0 | 0 | 0 | 0 | 0 | 0 |
| Urea | 5,890 | 0 | 280 | 0 | 0 | 0 | 0 |
| HMTA | 0 | 0 | 15,715 | 827 | 16,542(1) | 165,542 | 16,542 |
| Carbon | 2,850 | 0 | 0 | 0 | 0 | 0 | 0 |
| Water | 30,469 | trace | 22,844 | 0 | 22,844 | 228,440 | 22,844 |
| Facility Waste | 0 | 0 | 0 | 0 | 0 | 0 | 0 |
| Total | 67,077 | trace | 38,559 | 827 | 39,386 | 393,386 | 39,386 |
| Temp., °C. | 0 | 25 | 25 | 25 | 25 | 0 | 0 |
| Flow, liter/hr. | 4,254 | trace | 3,650 | 50 | 3,747 | 37,470 | 3,747 |

TABLE 4.7a

Section 2

Stream Number, Metric Tons per Year (Te/yr)

| Component | 8 | 9 | 10 | 11 |
|---|---|---|---|---|
| $UO_2(NO_3)_2$ | 23,197 | 16,238 | 6,959 | (trace) |
| U (complexed) | 4,671 | 3,270 | 1,401 | (trace) |
| Urea | 5,890 | 4,123 | 1,767 | 0 |
| HMTA | 16,542 | 11,579 | 4,963 | 0 |
| Carbon | 2,850 | 1,995 | 855 | 0 |
| Water | 53,313 | 37,319 | 15,994 | 0 |
| Facility Waste | 0 | 0 | 0 | 2,880[5] |
| Total | 106,463 | 74,524 | 31,939 | 2,880[5] |
| Temp., °C. | 0 | 0 | 0 | 25 |
| Flow, liter/hr. | 6,571 (2) | 4,600 | 1,971 | 2,880[5] |

As discussed above, in the preferred embodiment, gelation is preferably accomplished using an internal gelation technique. Internal gelation of the chilled uranium nitrate solution from the Uranyl Nitrate Adjustment Station preferably utilizes a gel formation solution comprising an ammonia releasing compound, such as hexamethylenetetramine ("HMTA"), $(CH_2)_6N_4$. Other amines can also be used, such as ethylene diamine ("EDA").

HMTA powder 4 is dissolved in deionized water 2 from the Deionized Water Supply in a Mixing Tank. Recycled HMTA solution 3 from the HMTA Recycling Station, described below, is introduced to form a solution having about a 3 molar concentration. The HMTA solution 5 is subsequently chilled to around 0° C. The chilled HMTA solution 7 is combined with the chilled urea-uranyl nitrate solution from the Uranyl Nitrate Adjustment Station in a Static Mixer. The resulting HMTA-containing urea-uranyl nitrate broth is chilled to about 0° C. in order to avoid HMTA decomposition and premature precipitation of ADU. Even at these reduced temperatures, however, the solution has a limited shelf-life, on the order of 1–3 days. Stabilizers, such as surfactants and aliphatic hydrocarbons can be added to the solution to extend its shelf-life. For example, a low concentration (0.001 to 1%) of a surfactant can be added to the solution to aid sphere formation and to inhibit particle agglomeration during gel formation.

In the exemplary process shown in FIG. 4.7 and Table 4.7, a first portion 9 containing approximately 70% of the chilled broth solution 8 is transferred to a 1,200 Micron Gel Formation Station, and a second portion 10 containing approximately 30% of the chilled broth solution 8 is transferred to a 300 Micron Gel Formation Station. Both of these facilities are described in additional detail below. As described previously, a minimum of two particle sizes are desirable; one size relatively coarse (1000 to 2000 microns, and preferably 1000 to 1300 microns diameter) and one size relatively fine (30 to 1000 microns, preferably 300 to 500 microns in diameter). This allows for closer packing and higher densities, resulting in better shielding.

Facility waste 11 from the Gel Former Preparation Station is sent to Waste Treatment.

H. Gel Sphere Formation Of Uranium/Ammonium Diuranate Precipitate By Internal Gelation Techniques FIG. 4.8 depicts the flow sheet for the 1200 Micron Gel Formation Station. The material and energy balances for the exemplary process for production of uranium dioxide microspheres and uranium carbide microspheres are shown in Table 4.8 and Table 4.8a, respectively.

TABLE 4.8

Section 1

Stream Number, Metric Tons per Year (Te/yr)

| Component | 1 | 2 | 3 | 4 | 5 | 6 | 7 |
|---|---|---|---|---|---|---|---|
| $UO_2(NO_3)_2$ | 16,238 | 0 | 0 | 0 | 16,238 | 0 | 0 |
| U (complexed) | 3,270 | 0 | 0 | 0 | 3,270 | 0 | 0 |
| Urea | 4,123 | 0 | 0 | 0 | 4,123 | 0 | 0 |
| HMTA | 11,579 | 0 | 0 | 0 | 11,579 | 0 | 0 |
| Water | 37,319 | 0 | 8,740 | <5,000 | 3,869 | 33,450 | −35,000 |
| Oil | 0 | 0 | 0 | 3.35E7 | 15,706 | 6.69E7 | 6.69E7 |
| Nitrogen | 0 | 4,462 | 0 | 0 | 0 | 0 | 0 |
| Facility Waste | 0 | 0 | 0 | 0 | 0 | 0 | 0 |

TABLE 4.8-continued

Section 1

Stream Number, Metric Tons per Year (Te/yr)

| Component | 1 | 2 | 3 | 4 | 5 | 6 | 7 |
|---|---|---|---|---|---|---|---|
| Total | 72,529 | 4,462 | 8,740 | 3.35E7 | 54,785 | 6.69E7 | 6.69E7 |
| Temp.,° C. | 0 | 25 | 150 (Steam) | 70 | 70 | 70 | 69 |
| Flow, liter/hr. | 4,600 | 409,000 | 1E6 | 4.8E6 | 3,474 | 9.54E6 | 9.54E6 |

TABLE 4.8

Section 2

Stream Number, Metric Tons per Year (Te/yr)

| Component | 8 | 9 | 10 | 11 | 12 | 13 |
|---|---|---|---|---|---|---|
| $UO_2(NO_3)_2$ | 0 | 0 | 0 | 0 | 0 | 0 |
| U (complexed) | 0 | 0 | 0 | 0 | 0 | 0 |
| Urea | 0 | 0 | 0 | 0 | 0 | 0 |
| HMTA | 0 | 0 | 0 | 0 | 0 | 0 |
| Water | 66,900 | 0 | 33,450 | 33,450 | 8,740 | 0 |
| Oil | 6.69E7 | 10 | 3.35E7 | 3.35E7 | 0 | 0 |
| Nitrogen | 0 | 4,462 | 0 | 0 | 0 | 0 |
| Facility Waste | 0 | 0 | 0 | 0 | 0 | 2,880[5] |
| Total | 6.7E7 | 4,472 | 3.35E7 | 3.35E7 | 8,740 | 2,880[5] |
| Temp., ° C. | 69 | 25 | 69 | 69 | 150 | 25 |
| Flow, liter/hr | 9.54E6 | 409,000 | 4.8E6 | 4.8E6 | 1,000 | 2,880[5] |

TABLE 4.8a

Section 1

Stream Number, Metric Tons per Year (Te/yr)

| Component | 1 | 2 | 3 | 4 | 5 | 6 | 7 |
|---|---|---|---|---|---|---|---|
| $UO_2(NO_3)_2$ | 16,238 | 0 | 0 | 0 | 16,238 | 0 | 0 |
| U (complexed) | 3,270 | 0 | 0 | 0 | 3,270 | 0 | 0 |
| Urea | 4,123 | 0 | 0 | 0 | 4,123 | 0 | 0 |
| HMTA | 11,579 | 0 | 0 | 0 | 11,579 | 0 | 0 |
| Carbon | 1,995 | 0 | 0 | 0 | 1,995 | 0 | 0 |
| Water | 37,319 | 0 | 8,740 | <5,000 | 3,869 | 33,450 | −35,000 |
| Oil | 0 | 0 | 0 | 3.35E7 | 15,706 | 6.69E7 | 6.69E7 |
| Nitrogen | 0 | 4,462 | 0 | 0 | 0 | 0 | 0 |
| Facility Waste | 0 | 0 | 0 | 0 | 0 | 0 | 0 |
| Total | 74,524 | 4,462 | 8,740 | 3.35E7 | 56,780 | 6.69E7 | 6.69E7 |
| Temp., ° C. | 0 | 25 | 150 (steam) | 70 | 70 | 70 | 69 |
| Flow, liter/hr | 4,600 | 409,000 | 1E6 | 4.8E6 | 3,474 | 9.54E69 | 9.54E6 |

TABLE 4.8a

Section 2

Stream Number, Metric Tons per Year (Te/yr)

| Component | 8 | 9 | 10 | 11 | 12 | 13 |
|---|---|---|---|---|---|---|
| $UO_2(NO_3)_2$ | 0 | 0 | 0 | 0 | 0 | 0 |
| U (complexed) | 0 | 0 | 0 | 0 | 0 | 0 |
| Urea | 0 | 0 | 0 | 0 | 0 | 0 |
| HMTA | 0 | 0 | 0 | 0 | 0 | 0 |
| Carbon | 0 | 0 | 0 | 0 | 0 | 0 |
| Water | 66,900 | 0 | 33,450 | 33,450 | 8,740 | 0 |
| Oil | 6.69E7 | 10 | 3.35E7 | 3.35E7 | 0 | 0 |
| Nitrogen | 0 | 4,462 | 0 | 0 | 0 | 0 |
| Facility Waste | 0 | 0 | 0 | 0 | 0 | 2,880[5] |
| Total | 6.7E7 | 4,472 | 3.35E7 | 3.35E7 | 8,740 | 2,880[5] |
| Temp.,° C. | 69 | 25 | 69 | 69 | 150 | 25 |
| Flow, liter/hr | 9.54E6 | 409,000 | 4.8E6 | 4.8E6 | 1,000 | 2,880[5] |

In the Gel Formation Station, spheres of uranium dioxide are preferably formed by an internal gelation process. In this process, small drops of the chilled broth solution 1 from the Gel Solution Preparation Station are dispersed using vibrating feed nozzles (not shown) into a Gel Forming Column containing oil. In the past, gelation was accomplished using columns of chlorinated solvents such as trichloroethylene (TCE) and perchloroethylene. The preferred embodiment, however, uses an oil, such as kerosene or fuel oil nos. 1, 2 or 3, which are relatively non-toxic and nonflammable. These oils also have low ash and residue contents and gum less than other oils, such as heat transfer oils. Further, use of oils eliminates the production of acid gases that is associated with the use of halogen-containing solvents. Still further, when oil is used, washing operations can be advantageously scaled back, because any oil carried over to the sintering step can be burnt away. Alternatively, oil that is carried over to the sintering process can be pyrolized to carbon for carbide production, dissociated into a coating, or reformed into hydrogen gas.

While the prior art uses high velocity or air impact/impingement nozzles. The preferred embodiment uses low kinetic energy nozzles, such as ultrasonic nozzles, which reduce energy consumption, reduce gas handling, reduce deformation, increase homogeneity, and provide better control with wider operational ranges. The vibrating nozzles fragment the chilled broth solution into droplets 0.1–6 mm diameter in an air space above the Gel Forming Columns. Fragmentation of the chilled broth solution can optionally be undertaken using a nitrogen purge 2. Nozzle flowrates will vary, but are relatively small, on the order of liters of solution per hour. As the immiscible droplets fall through the oil, surface tension effects form each droplet into a sphere, the diameter of which is determined by the size and vibration frequency of the feed nozzles. The higher temperature of the oil, ranging from 50 to 100° C., initiates the dissociation of the ammonia-releasing compound (HMTA) and the formation of a uranium/ADU-like precipitate. Typically, the "green" gel spheres formed in the Gel Formation Station are about three times the desired diameter of the final product. Therefore, for a final uranium dioxide microsphere diameter of 1,200 microns, the green gel sphere diameter should be about 3,600 microns.

The typical minimum free-fall residence time for gel sphere formation in the Gel Forming Column is in the 20–30 second range, after which the gel spheres are sufficiently well-formed to avoid sticking and deformation. This residence time is achieved by having a column of sufficient height, by countercurrent flow of the oil, or by a combination of both. The preferred embodiment uses both.

In the exemplary process described in Table 4.8, the following system characteristics are utilized: (1) nozzle flow rate: 4 liters/min; (2) green sphere diameter: 3,600 microns (0.36 cm); (3) column residence free-fall time: one minute. Column height is predicated upon one-minute residence time, which translates into an active height of approximately 22 meters without any credit for the oil flow. Using an upwards oil flow velocity of 30 cm/sec (1 ft/sec) produces a column height of 4 meters (13 feet). For piping and plumbing connections, flow disengagement sections, and sphere aging, Table 4.8 utilizes a 6.1 meter height (20 feet). A four-inch diameter represents the full-length column diameter required per nozzle (i.e., no converging/diverging sections). Setting residence time is sixty minutes. Thus, a nominal column diameter of 30 cm (1 foot) would accommodate approximately seven nozzles, have an aqueous feed rate of approximately 28 liters per hour (0.12 gpm), and an oil flow rate of 79,500 liters per hour (350 gpm). In contrast, a nominal column diameter of 51 cm (20 inches) would accommodate nineteen nozzles, have an aqueous feed rate of 76 liters per hour (0.33 gpm), and an oil flow rate of 223,000 liters per hour (980 gpm). These analyses assume a nominal column diameter of 31 cm (i.e., 7 nozzles) for producing the 1,200 micron gel spheres.

After the green gel spheres have been formed and fallen to the bottom of the column, they will have developed sufficient strength to resist deformation under their own weight. These green gel spheres remain in the hot oil for thirty to sixty minutes for setting. Setting advantageously permits additional precipitation to occur and hardens the spheres. Even after setting, however, only about 1% of the HMTA will typically decompose, and, thus, only about 5% of the precipitation reaction will have gone to completion. As much as about 30 cm of a static bed of green spheres will accumulate at the bottom of the Gel Forming Column during the setting process. These green gel spheres 5 are removed from the Gel Forming Column and transferred to the 1,200 Micron Sphere Aging/Washing Station.

Oil from the column overflows to an Oil Overflow Tank. a portion 7 of the of the oil 8 from the Oil Overflow Tank is recirculated through a heat exchanger and the heated oil 6 is returned to the Gel Forming Column. Since the oil in the Gel Forming Column absorbs some water from the gel spheres (up to its saturation limit), a fraction of the oil 10 is sent to the Oil Purification Station, described below, for water removal and the purified oil 4 returned to the Gel Forming Column.

Facility waste 13 from the 1,200 Micron Gel Formation Station is sent to Waste Treatment.

FIG. 4.9 depicts the flow sheet for the 300 Micron Gel Formation Station. The material and energy balances for the exemplary process for production of uranium dioxide microspheres and uranium carbide microspheres are shown in Table 4.9 and Table 4.9a, respectively.

TABLE 4.9

Section 1

| Component | Stream Number, Metric Tons per Year (Te/yr) 1 | 2 | 3 | 4 | 5 | 6 | 7 |
|---|---|---|---|---|---|---|---|
| $UO_2(NO_3)_2$ | 6,959 | 0 | 0 | 0 | 6,959 | 0 | 0 |
| U (complexed) | 1,401 | 0 | 0 | 0 | 1,401 | 0 | 0 |
| Urea | 1,767 | 0 | 0 | 0 | 1,767 | 0 | 0 |
| HMTA | 4,963 | 0 | 0 | 0 | 4,963 | 0 | 0 |
| Water | 15,994 | 0 | 4,034 | <1,000 | 9,944 | 6,050 | ~6,100 |
| Oil | 0 | 0 | 0 | 6.05E6 | 7,101 | 1.21E7 | 1.21E7 |
| Nitrogen | 0 | 744 | 0 | 0 | 0 | 0 | 0 |
| Facility Waste | 0 | 0 | 0 | 0 | 0 | 0 | 0 |

TABLE 4.9-continued

Section 1

| Component | Stream Number, Metric Tons per Year (Te/yr) | | | | | | |
|---|---|---|---|---|---|---|---|
| | 1 | 2 | 3 | 4 | 5 | 6 | 7 |
| Total | 31,084 | 744 | 4,034 | 6.05E6 | 32,135 | 1.21E7 | 1.21E7 |
| Temp., °C. | 0 | 25 | 150 steam | 70 | 70 | 70 | 69 |
| Flow, liter/hr | 1,971 | 68,160 | 460,000 | 8.65E5 | 2,038 | 1.73E6 | 1.73E6 |

TABLE 4.9

Section 2

| Component | Stream Number, Metric Tons per Year (Te/yr) | | | | | |
|---|---|---|---|---|---|---|
| | 8 | 9 | 10 | 11 | 12 | 13 |
| $UO_2(NO_3)_2$ | 0 | 0 | 0 | 0 | 0 | 0 |
| U (complexed) | 0 | 0 | 0 | 0 | 0 | 0 |
| Urea | 0 | 0 | 0 | 0 | 0 | 0 |
| HMTA | 0 | 0 | 0 | 0 | 0 | 0 |
| Water | 12,100 | 0 | 6,050 | 6,050 | 4,034 | 0 |
| Oil | 1.21E7 | 2 | 6.05E6 | 6.05E6 | 0 | 0 |
| Nitrogen | 0 | 744 | 0 | 0 | 0 | 0 |
| Facility Waste | 0 | 0 | 0 | 0 | 0 | 2,880[5] |
| Total | 1.21E7 | 746 | 6.05E6 | 6.05E6 | 4,034 | 2,880[5] |
| Temp., °C. | 69 | 25 | 69 | 69 | 150 | 25 |
| Flow, liter/hr | 1.73E6 | 68,160 | 8,65E5 | 8,65E5 | 461 | 2,880[5] |

TABLE 4.9a

Section 1

| Component/ Item | Stream Number, Metric Tons per Year (Te/yr) | | | | | | |
|---|---|---|---|---|---|---|---|
| | 1 | 2 | 3 | 4 | 5 | 6 | 7 |
| $UO_2(NO_3)_2$ | 6,959 | 0 | 0 | 0 | 6,959 | 0 | 0 |
| U (complexed) | 1,401 | 0 | 0 | 0 | 1,401 | 0 | 0 |
| Urea | 1,767 | 0 | 0 | 0 | 1,767 | 0 | 0 |
| HMTA | 4,963 | 0 | 0 | 0 | 4,963 | 0 | 0 |
| Carbon | 855 | 0 | 0 | 0 | 855 | 0 | 0 |
| Water | 15,994 | 0 | 4,034 | <1,000 | 9,944 | 6,050 | −6,100 |
| Oil | 0 | 0 | 0 | 06.05E6 | 7,101 | 1.21E7 | 1.21E7 |
| Nitrogen | 0 | 744 | 0 | 0 | 0 | 0 | 0 |
| Facility Waste | 0 | 0 | 0 | 0 | 0 | 0 | 0 |
| Total | 31,939 | 744 | 4,034 | 6.05E6 | 32,990 | 1.21E7 | 1.21E7 |
| Temp., °C. | 0 | 25 | 150 (steam) | 70 | 70 | 70 | 69 |
| Flow, liter/hr | 1.971 | 68,160 | 460,000 | 8.65E5 | 2,038 | 1.73E6 | 1.73E6 |

TABLE 4.9a

Section 2

| Component/ Item | Stream Number, Metric Tons per Year (Te/yr) | | | | | |
|---|---|---|---|---|---|---|
| | 8 | 9 | 10 | 11 | 12 | 13 |
| $UO_2(NO_3)_2$ | 0 | 0 | 0 | 0 | 0 | 0 |
| U (complexed) | 0 | 0 | 0 | 0 | 0 | 0 |
| Urea | 0 | 0 | 0 | 0 | 0 | 0 |
| HMTA | 0 | 0 | 0 | 0 | 0 | 0 |
| Carbon | 0 | 0 | 0 | 0 | 0 | 0 |
| Water | 12,100 | 0 | 6,050 | 6,050 | 4,034 | 0 |
| Oil | 1.21E7 | 2 | 6.05E6 | 6.05E6 | 0 | 0 |
| Nitrogen | 0 | 744 | 0 | 0 | 0 | 0 |
| Facility Waste | 0 | 0 | 0 | 0 | 0 | 2,880[3] |
| Total | 1.21E7 | 746 | 6.05E6 | 6.05B6 | 4,034 | 2,880[3] |
| Temp., °C. | 69 | 25 | 69 | 69 | 150 | 25 |
| Flow, l.hr | 1.73E6 | 68,160 | 8.65E5 | 8.65E5 | 461 | 2,880[3] |

The gel formation column for the 300 micron spheres is sized in the same manner as the 1,200 micron spheres, only the nozzle flow rates are different the values set forth above for the 1,200 micron case.

For a 300 micron final diameter, the green, gel sphere diameter would be approximately 900 microns (0.09 cm). This results in a terminal velocity of approximately 18.3 cm/sec. Assuming the same droplet velocity as in the 1,200 micron column (6.6 cm/sec), then the upward oil velocity would have to be 14.7 cm/sec. This translates into an oil flow rate of 31,000 liters per hour (136 gpm) and 86,300 liters per hour (380 gpm) for the 31 and 51 cm columns, respectively. The number of nozzles and the aqueous feedrates would be the same as for the 1,200 micron case. For simplicity and to bound the case, the columns for the 300 micron diameter spheres are the same height as the columns for the 1,200 micron microspheres. A 51 cm column diameter is used as the basis because it provides similar oil flow rate characteristics as for the 1,200 micron columns, and, thus, would require the same sized equipment. This column size translates into 19 nozzles.

I. Oil Purification

FIG. 4.10 depicts the flow sheet for the Oil Purification Station. The material and energy balances for the exemplary process for production of uranium dioxide microspheres and uranium carbide microspheres are shown in Table 4.10 and Table 4.10a, respectively.

TABLE 4.10

Section 1

| Component | Stream Number, Metric Tons per Year (Te/yr) | | | | | | |
|---|---|---|---|---|---|---|---|
| | 1 | 2 | 3 | 4 | 5 | 6 | 7 |
| Oil | 3.35E7 | 6.05E6 | 21,667 | 3.96E7 | 3.96E7 | 3.96E7 | 3.96E7 |
| Water | 33,450 | 6,050 | 39,522 | 39,522 | 39,522 | 39,522 | <6,000 |
| Facility Waste | 0 | 0 | 0 | 0 | 0 | 0 | 0 |
| Total | 3.35E7 | 6.05E6 | 21,689 | 3.96E7 | 3.96E7 | 3.96E7 | 3.96E7 |
| Temp., ° C. | 69 | 69 | 25 | 69 | 2 | 0 | 0 |
| Flow, liter/hr | 4.8E6 | 8.65E5 | 3,095 | 5.73E6 | 5.73E6 | 5.73E6 | 5.73E6 |

TABLE 4.10

Section 2

| Component | Stream Number, Metric Tons per Year (Te/yr) | | | | | | |
|---|---|---|---|---|---|---|---|
| | 8 | 9 | 10 | 11 | 12 | 13 | 14 |
| Oil | 4 | 1,156 | 3.96E7 | 3.96E7 | 3.35E7 | 6.05E6 | 0 |
| Water | 35,550 | 0 | <6,000 | <6,000 | <5,000 | <1,000 | 0 |
| Facility Waste | 0 | 0 | 0 | 0 | 0 | 0 | 2,880[(6)] |
| Total | 35,554 | 1,156 | 3.96E7 | 3.96E7 | 3.35E7 | 6.05E6 | 2,880[(6)] |
| Temp., ° C. | 5 | 25 | 70 | 70 | 70 | 70 | 25 |
| Flow, liter/hr | 4,059 | 165 | 5.73E6 | 5.73E6 | 4.8E6 | 8.65E5 | 2,880[(6)] |

TABLE 4.10a

Section 1

| Component | Stream Number, Metric Tons per Year (Te/yr) | | | | | | |
|---|---|---|---|---|---|---|---|
| | 1 | 2 | 3 | 4 | 5 | 6 | 7 |
| Oil | 3.35E7 | 6.05E6 | 21,667 | 3.96E7 | 3.96E7 | 3.96E7 | 3.96E7 |
| Water | 33,450 | 6,050 | 39,522 | 39,522 | 39,522 | 39,522 | <6,000 |
| Facility Waste | 0 | 0 | 0 | 0 | 0 | 0 | 0 |
| Total | 3.35E7 | 6.05E6 | 21,689 | 3.96E7 | 3.96E7 | 3.96E7 | 3.96E7 |
| Temp., ° C. | 69 | 69 | 25 | 69 | 2 | 0 | 0 |
| Flow, liter/hr | 4.8E6 | 8.65E5 | 3,095 | 5.73E6 | 5.73E6 | 5.73E6 | 5.73E6 |

TABLE 4.10a

Section 2

| Component/ Item | Stream Number, Metric Tons per Year (Te/yr) | | | | | | |
|---|---|---|---|---|---|---|---|
| | 8 | 9 | 10 | 11 | 12 | 13 | 14 |
| Oil | 4 | 1,156 | 3.96E7 | 3.96E7 | 3.35E7 | 6.05E6 | 0 |
| Water | 35,550 | 0 | <6,000 | <6,000 | <5,000 | <1,000 | 0 |
| Facility Waste | 0 | 0 | 0 | 0 | 0 | 0 | 2,880[(6)] |
| Total | 35,554 | 1,156 | 3.96E7 | 3.96E7 | 3.35E7 | 6.05E6 | 2,880[(6)] |
| Temp., ° C. | 5 | 25 | 70 | 70 | 70 | 70 | 25 |
| Flow, liter/hr | 4,059 | 165 | 5.73E6 | 5.73E6 | 4.8E6 | 8.65E5 | 2,880[(6)] |

As discussed above, the oil used in the Gel Formation Columns will absorb water from the gel spheres, up to the solubility limit of water in the oil. While exact limits are not defined, gel formation precedes more advantageously with oils that are not water saturated. Therefore, it is desirable to dry the oil.

Drying can be accomplished by several methods. Chilling of the oil followed by phase separation is the most straight-forward method, but requires equipment and piping. Alteratively, molecular sieves and other adsorbents could be used to remove water from the oil, but would require a regeneration system and handling of the tramp oil. Membrane systems could also be used, but are probably not cost effective. Therefore, in the preferred embodiment, chilling followed by phase separation is used to dry the oil.

The wet oil stream 1 from the 1,200 Micron Gel Formation Station, the wet oil stream 2 from the 300 Micron Gel Formation Station, and the wet oil stream 3 from the Ammonium Hydroxide Setting/Washing Station, described below, are fed to the Oil Purification Station. Wet oil streams 1–3 will likely contain around 1,000 ppm dissolved water, a typical value for oils around 70° C. The wet oil streams 1–3 are combined into a single stream 4 which is introduced into a Heat Exchanger and cooled. The oil 5 is then passed through a Chilling System and cooled to around 5° C. At this low temperature, the water solubility is only about 100 ppm. As a result, phase separation occurs. The resulting oil/water mixture 6 is sent to an Oil/Water Separator which coalesces and recovers the water. The dried oil 7 is reheated using the heat exchanger. Makeup oil 9 is added to the heated, dried oil. The resulting mixture 11 is divided into a first portion 12 that is returned to the 1,200 Micron Gel Formation Station and a second portion 13 that is returned to the 300 Micron Gel Formation Station. The water 8, which is saturated with oil, is pumped to Waste Treatment.

J. Gel Sphere Aging By Setting/Washing With Ammonium Hydroxide

FIG. 4.11 depicts the flow sheet for the 1200 Microshpere Setting/Washing Station. The material and energy balances for the exemplary process for production of uranium dioxide microspheres and uranium carbide microspheres are shown in Table 4.11 and Table 4.11a, respectively.

TABLE 4.11

Section 1

| Component/Item | Stream Number, Metric Tons per year (Te/yr) | | | | | | |
|---|---|---|---|---|---|---|---|
| | 1 | 2 | 3 | 4 | 5 | 6 | 7 |
| $UO_2(NO_3)_2$ | 16,238 | 0 | 0 | 0 | 0 | 0 | 0 |
| U (complexed) | 3,270 | 0 | 0 | 0 | 0 | 0 | 0 |
| $(NH_4)_2U_2O_7$ | 0 | 0 | 0 | 0 | 0 | 0 | 0 |
| Urea | 4,123 | 0 | 0 | 0 | 0 | 3,917 | 3,917 |
| HTMA | 11,579 | 0 | 0 | 0 | 0 | 11,000 | 11,000 |
| $NH_4OH$ | 0 | 0 | 14,717 | 14,717 | 0 | 12,152 | 12,152 |
| Oil | 15,706 | 0 | 0 | 0 | 0 | 16 | 16 |
| Water | 3,869 | 0 | 132,451 | 0 | 129,124 | 9 | 129,124 |
| $HNO_3$ | 0 | 0 | 0 | 0 | 0 | 12,454 | 2,454 |
| Nitrogen | 0 | 4,462 | 0 | 0 | 4,462 | 0 | 0 |
| Facility Waste | 0 | 0 | 0 | 0 | 0 | 0 | 0 |
| Total | 54,785 | 4,462 | 147,168 | 147,168 | 4,462 | 158,663 | 158,663 |
| Temp., ° C. | 70 | 25 | 25 | 25 | 25 | 25 | 25 |
| Flow, liter/hr | 3,474 | 409,000 | 16,800 | 16,800 | 404,000 | 18,112 | 18,112 |

TABLE 4.11

Section 2

| Component/Item | Stream Number, Metric Tons per Year (Te/yr) | | | |
|---|---|---|---|---|
| | 8 | 9 | 10 | 11 |
| $UO_2(NO_3)_2$ | 0 | 0 | 0 | 0 |
| U (complexed) | 0 | 0 | 0 | 0 |
| $(NH_4)_2U_2O_7$ | 0 | 17,160 | 0 | 0 |
| Urea | 0 | 206 | 0 | 0 |
| HTMA | 0 | 579 | 0 | 0 |
| $NH_4OH$ | 1 | 640 | 0 | 0 |
| Oil | 0 | 769 | 14,921 | 0 |
| Water | 9 | 6,796 | 14 | 0 |
| $HNO_3$ | 0 | 129 | 0 | 0 |
| Nitrogen | 0 | 0 | 0 | 0 |
| Facility Waste | 0 | 0 | 0 | 2,880[3] |
| Total | 10 | 26,279 | 14,935 | 2,880[3] |
| Temp., ° C. | 25 | 25 | 25 | 25 |
| Flow, liter/hr | 1.1 | 1,667 | 2,131 | 2,880[3] |

TABLE 4.11a

Section 1

| Component/Item | Stream Number, Metric Tons per Year (Te/yr) | | | | | | |
|---|---|---|---|---|---|---|---|
| | 1 | 2 | 3 | 4 | 5 | 6 | 7 |
| $UO_2(NO_3)_2$ | 16,238 | 0 | 0 | 0 | 0 | 0 | 0 |
| U (complexed) | 3,270 | 0 | 0 | 0 | 0 | 0 | 0 |
| $(NH_4)_2U_2O_7$ | 0 | 0 | 0 | 0 | 0 | 0 | 0 |
| Urea | 4,123 | 0 | 0 | 0 | 0 | 3,917 | 3,917 |
| HTMA | 11,579 | 0 | 0 | 0 | 0 | 11,000 | 11,000 |
| $NH_4OH$ | 0 | 0 | 14,717 | 14,717 | 0 | 16 | 16 |
| Oil | 15,706 | 0 | 0 | 0 | 0 | 16 | 16 |
| Carbon | 1,995 | 0 | 0 | 0 | 0 | 0 | 0 |
| Water | 3,869 | 0 | 132,451 | 0 | 129,124 | 9 | 129,124 |
| $HNO_3$ | 0 | 0 | 0 | 0 | 0 | 12,454 | 2,454 |
| Nitrogen | 0 | 4,462 | 0 | 0 | 4,462 | 0 | 0 |
| Facility Waste | 0 | 0 | 0 | 0 | 0 | 0 | 0 |
| Total | 56,780 | 4,462 | 147,168 | 147,168 | 4,462 | 158,663 | 158,663 |
| Temp., °C. | 70 | 25 | 25 | 25 | 25 | 25 | 25 |
| Flow, liter/hr | 3,474 | 409,000 | | | | | |

TABLE 4.11a

Section 2

| Component/Item | Stream Number, Metric Tons per Year (Te/yr) | | | |
|---|---|---|---|---|
| | 8 | 9 | 10 | 11 |
| $UO_2(NO_3)_2$ | 0 | 0 | 0 | 0 |
| U (complexed) | 0 | 0 | 0 | 0 |
| $(NH_4)_2U_2O_7$ | 0 | 17,160 | 0 | 0 |
| Urea | 0 | 206 | 0 | 0 |
| HTMA | 1 | 579 | 0 | 0 |
| $NH_4OH$ | 0 | 640 | 0 | 0 |
| Oil | 0 | 769 | 14,921 | 0 |
| Carbon | 0 | 1,995 | 0 | 0 |
| Water | 9 | 6,796 | 14 | 0 |
| $HNO_3$ | 0 | 129 | 0 | 0 |
| Nitrogen | 0 | 0 | 0 | 0 |
| Facility Waste | 0 | 0 | 0 | 2,880[3] |
| Total | 10 | 28,274 | 14,935 | 2,880[3] |
| Temp., °C. | 25 | 25 | 25 | 25 |
| Flow, liter/hr | 1.1 | 1,667 | 2,131 | 2,880[3] |

Additional ammonia necessary to complete the ADU-like precipitation reaction is supplied by washing the spheres in a setting solution of 10% ammonium hydroxide solution. The stoichiometry for this reaction is:

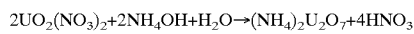

$$2UO_2(NO_3)_2 + 2NH_4OH + H_2O \rightarrow (NH_4)_2U_2O_7 + 4HNO_3$$

During this process, the spheres 1 are periodically discharged from the 1,200 Micron Gel Formation Column into a Setting Washing Column having the same diameter as the formation column (31 cm). A setting solution 4 of 10% ammonium hydroxide is formed by combining the ammonium hydroxide stream 3 from the Ammonium Hydroxide Purification Station, described below, and a portion 8 of the ammonium hydroxide 6 from the Ammonium Hydroxide Overflow Fank. The setting solution 4 is circulated through the bed of spheres in the Setting/Washing Column, causing them to harden. Typical washing times are about one hour. Typical flow rates are on the order of five to ten times the initial broth solution feed rate to the column. Ambient temperatures are believed to supply sufficient heat for the reaction.

During washing, impurities such as urea and HMTA are removed from the spheres by leaching (i.e., preferential absorption into the aqueous phase), typically with efficiencies of 90–95%, because of favorable thermodynamics.

About 95% of the tramp oil carried over from the Gel Formation Station is skimmed from the Ammonium Hydroxide Overflow Tank. This oil 10 is then recycled to the Oil Purification Station. A portion of the oil is believed to dissolve to ammonium hydroxide solution, approximately 100 ppm, while the remainder clings to the spheres. The ammonium hydroxide also causes reformation of any HMTA that initially reacted with the ADU.

After washing, a majority 7 of the ammonium hydroxide 6 collected in the Ammonium Hydroxide Overflow Tank is sent to the Ammonium Hydroxide Purification System to remove impurities (i.e., the urea and HMTA) and to allow its recycle. The purified ammonium hydroxide solution 3 is then returned to the 1,200 Micron Sphere Setting/Washing Station and combined with a minority 8 of the ammonium hydroxide solution 8 collected in the from the Ammonium Hydroxide Overflow Tank.

As set forth in the material and energy balances in Table 4.11, it is believed that the remaining 95% of the precipitation reaction occurs in this step. Furthermore, oil carryover is believed to be equivalent to the void space in the packed bed volume of the spheres. The recirculation rate is calculated based upon five times the broth solution feed to a 31 cm diameter column; this corresponds to approximately 2.3 liters per minute (0.62 gpm) per column.

After setting and washing of the gel spheres is complete (i.e., the uranium is completely converted to ADU and no more ammonium hydroxide reacts), the aged spheres 9 are transferred to the 1,200 Micron Drying Station for further processing.

Facility waste 11 from the 1,200 Micron Sphere Setting/Washing Station is sent to Waste Treatment.

FIG. 4.12 depicts the flow sheet for the 300 Microsphere Setting/Washing Station. The material and energy balances for the exemplary process for production of uranium dioxide microspheres and uranium carbide microspheres are shown in Table 4.12 and Table 4.12a, respectively.

TABLE 4.12

Section 1

| Component/Item | Stream Number, Metric Tons per Year (Te/yr) | | | | | | |
|---|---|---|---|---|---|---|---|
| | 1 | 2 | 3 | 4 | 5 | 6 | 7 |
| UO$_2$(NO$_3$)$_2$ | 6,959 | 0 | 0 | 0 | 0 | 0 | 0 |
| U (complexed) | 1,401 | 0 | 0 | 0 | 0 | 0 | 0 |
| (NH$_4$)$_2$U$_2$O$_7$ | 0 | 0 | 0 | 0 | 0 | 0 | 0 |
| Urea | 1,767 | 0 | 0 | 0 | 0 | 1,679 | 1,679 |
| HTMA | 4,963 | 0 | 0 | 0 | 0 | 4,715 | 4,715 |
| NH$_4$OH | 0 | 0 | 6,658 | 6,658 | 0 | 5,541 | 5,514 |
| Oil | 7,101 | 0 | 0 | 0 | 0 | 8 | 8 |
| Water | 9,944 | 0 | 59,918 | 59,918 | 0 | 66,164 | 66,164 |
| HNO$_3$ | 0 | 0 | 0 | 0 | 0 | 1,410 | 1,410 |
| Nitrogen | 0 | 744 | 0 | 0 | 744 | 0 | 0 |
| Facility Waste | 0 | 0 | 0 | 0 | 0 | 0 | 0 |
| Total | 32,135 | 744 | 66,576 | 66,576 | 744 | 79,4907 | 79,490 |
| Temp., ° C. | 70 | 25 | 25 | 25 | 25 | 25 | 25 |
| Flow, liter/hr | 2,038 | 68,160 | 7,600 | 68,160 | 9,074 | 9,074 | 1.1 |

TABLE 4.12

Section 2

| Component/Item | Stream Number, Metric Tons per Year (Te/yr) | | | |
|---|---|---|---|---|
| | 8 | 9 | 10 | 11 |
| UO$_2$(NO$_3$)$_2$ | 0 | 0 | 0 | 0 |
| U (complexed) | 0 | 0 | 0 | 0 |
| (NH$_4$)$_2$U$_2$O$_7$ | 0 | 7,488 | 0 | 0 |
| Urea | 0 | 88 | 0 | 0 |
| HTMA | 0 | 248 | 0 | 0 |
| NH$_4$OH | 1 | 292 | 0 | 0 |
| Oil | 0 | 329 | 6,746 | 0 |
| Water | 9 | 3,482 | 7 | 0 |
| HNO$_3$ | 0 | 74 | 0 | 0 |
| Nitrogen | 0 | 0 | 0 | 0 |
| Facility Waste | 0 | 0 | 0 | 2,880 |
| Total | 10 | 12,001 | 6,753 | 2,880 |
| Temp., ° C. | 25 | 25 | 25 | 25 |
| Flow, liter/hr | 1.1 | 761 | 964 | 2,880 |

TABLE 4.12a

Section 2

| Component/Item | Stream Number, Metric Tons per Year (Te/yr) | | | |
|---|---|---|---|---|
| | 8 | 9 | 10 | 11 |
| UO$_2$(NO$_3$)$_2$ | 0 | 0 | 0 | 0 |
| U (complexed) | 0 | 0 | 0 | 0 |
| (NH$_4$)$_2$U$_2$O$_7$ | 0 | 7,488 | 0 | 0 |
| Urea | 0 | 88 | 0 | 0 |
| HTMA | 0 | 248 | 0 | 0 |
| NH$_4$OH | 1 | 292 | 0 | 0 |
| Oil | 0 | 329 | 6,746 | 0 |
| Carbon | 0 | 855 | 0 | 0 |
| Water | 9 | 3,482 | 7 | 0 |
| HNO$_3$ | 0 | 74 | 0 | 0 |
| Nitrogen | 0 | 0 | 0 | 0 |
| Facility Waste | 0 | 0 | 0 | 2,880[3] |
| Total | 10 | 12,856 | 6,753 | 2,880[3] |
| Temp., ° C. | 25 | 25 | 25 | 25 |
| Flow, liter/hr | 1.1 | 761 | 964 | 2,880[3] |

TABLE 4.12a

Section 1

| Component/Item | Stream Number, Metric Tons per Year (Te/yr) | | | | | | |
|---|---|---|---|---|---|---|---|
| | 1 | 2 | 3 | 4 | 5 | 6 | 7 |
| UO$_2$(NO$_3$)$_2$ | 6,959 | 0 | 0 | 0 | 0 | 0 | 0 |
| U (complexed) | 1,401 | 0 | 0 | 0 | 0 | 0 | 0 |
| (NH$_4$)$_2$U$_2$O$_7$ | 0 | 0 | 0 | 0 | 0 | 0 | 0 |
| Urea | 1,767 | 0 | 0 | 0 | 0 | 1,679 | 1,679 |
| HTMA | 4,963 | 0 | 0 | 0 | 0 | 4,715 | 4,715 |
| NH$_4$OH | 0 | 0 | 6,658 | 6,658 | 0 | 5,541 | 5,541 |
| Oil | 7,101 | 0 | 0 | 0 | 0 | 8 | 8 |
| Carbon | 855 | 0 | 0 | 0 | 0 | 0 | 0 |
| Water | 9,944 | 0 | 59,918 | 59,918 | 0 | 66,164 | 66,164 |
| HNO$_3$ | 0 | 0 | 0 | 0 | 0 | 1,410 | 1,410 |
| Nitrogen | 0 | 744 | 0 | 0 | 744 | 0 | 0 |
| Facility Waste | 0 | 0 | 0 | 0 | 0 | 0 | 0 |
| Total | 32,990 | 744 | 66,576 | 66,576 | 744 | 79,490 | 79,490 |
| Temp., ° C. | 70 | 25 | 25 | 25 | 25 | 25 | 25 |
| Flow, liter/hr | 2,038 | 68,160 | 7,600 | 7,600 | 68,160 | 9,074 | 9,074 |

The 300 Micron Setting/Washing Station is identical to the 1,200 Micron Setting/Washing Station. As with the 1,200 micron spheres, the remainder of the ammonia required to complete the ADU-like precipitation reaction is supplied by washing the spheres in a setting solution of 10% ammonium hydroxide. Furthermore, as with the 1,200 micron particles, typical washing times are on the order of one hour and typical flow rates are around five times the flow of the initial broth solution fed to the column. These conditions correspond to a large excess of ammonium hydroxide, since only around 10% or so is actually consumed by the setting reactions. Hence, the reactions are rapid.

K. Gel Sphere Drying And Liberation Of Ammonia and Water

FIG. 4.13 depicts the flow sheet for the 1200 Microshpere Drying Station. The material and energy balances for the exemplary process for production of uranium dioxide microspheres and uranium carbide microspheres are shown in Table 4.13 and Table 4.13a, respectively.

TABLE 4.13

Section 1

| Component/Item | Stream Number, Metric Tons per Year (Te/yr) | | | | | | |
|---|---|---|---|---|---|---|---|
| | 1 | 2 | 3 | 4 | 5 | 6 | 7 |
| $(NH_4)_2U_2O_7$ | 17,160 | 0 | 0 | 0 | 0 | 17,160 | 0 |
| Urea | 206 | 0 | 0 | 0 | 0 | 206 | 0 |
| HTMA | 579 | 0 | 0 | 0 | 0 | 579 | 0 |
| $NH_4OH$ | 640 | 608 | 0 | 608 | 0 | 32 | 0 |
| Oil | 769 | 0 | 0 | 0 | 0 | 769 | 0 |
| Nitrogen | 0 | 711,513 | 2,231 | 711,513 | 7,115 | 0 | 711,513 |
| Water | 6,796 | 6,456 | 0 | 6,456 | 0 | 340 | 0 |
| $HNO_3$ | 129 | 123 | 0 | 123 | 0 | 6 | 0 |
| Facility Waste | 0 | 0 | 0 | 0 | 0 | 0 | |
| Total | 26,279 | 718,700 | 2,231 | 718,700 | 7,115 | 19,092 | 711,513 |
| Temp., ° C. | 25 | 30 | 25 | 30 | 25 | 100 | 120 |
| Flow, liter/hr | 1,667 | 6.56E7 | 409,000 | 6.56E7 | 6.56E7 | 1,211 | 6.55E7 |

TABLE 4.13

Section 2

| Component/Item | Stream Number, Metric Tons per Year (Te/yr) | | |
|---|---|---|---|
| | 8 | 9 | 10 |
| $(NH_4)_2U_2O_7$ | 0 | 0 | 0 |
| Urea | 0 | 0 | 0 |
| HTMA | 0 | 0 | 0 |
| $NH_4OH$ | 0 | 608 | 0 |
| Oil | 0 | 0 | 0 |
| Nitrogen | 7,115 | 0 | 0 |
| Water | 65 | 6,341 | 0 |
| $HNO_3$ | 0 | 123 | 0 |
| Facility Waste | 0 | 0 | 2,880(4) |
| Total | 7,180 | 7,122 | 2,880(4) |
| Temp., ° C. | 25 | 25 | 25 |
| Flow, liter/hr | 6.56E5 | 813 | 2,880(4) |

TABLE 4.13a

Section 1

| Component/Item | Stream Number, Metric Tons per Year (Te/yr) | | | | | | |
|---|---|---|---|---|---|---|---|
| | 1 | 2 | 3 | 4 | 5 | 6 | 7 |
| $(NH_4)_2U_2O_7$ | 17,160 | 0 | 0 | 0 | 0 | 17,160 | 0 |
| Urea | 206 | 0 | 0 | 0 | 0 | 206 | 0 |

TABLE 4.13a-continued

Section 1

| Component/ | Stream Number, Metric Tons per Year (Te/yr) | | | | | | |
|---|---|---|---|---|---|---|---|
| Item | 1 | 2 | 3 | 4 | 5 | 6 | 7 |
| HTMA | 579 | 0 | 0 | 0 | 0 | 579 | 0 |
| NH$_4$OH | 640 | 608 | 0 | 608 | 0 | 32 | 0 |
| Oil | 769 | 0 | 0 | 0 | 0 | 769 | 0 |
| Nitrogen | 0 | 711,513 | 2,231 | 711,513 | 7,115 | 0 | 711,513 |
| Carbon | 1,995 | 0 | 0 | 0 | 0 | 1,995 | 0 |
| Water | 6,796 | 6,456 | 0 | 6,456 | 0 | 340 | 0 |
| HNO$_3$ | 129 | 123 | 0 | 123 | 0 | 6 | 0 |
| FacilityWaste | 0 | 0 | 0 | 0 | 0 | 0 | 0 |
| Total | 28,274 | 718,700 | 2,231 | 718,700 | 7,115 | 21,087 | 711,513 |
| Temp., ° C. | 25 | 30 | 25 | 30 | 25 | 100 | 120 |
| Flow, liter/hr | 1,667 | 6.56E7 | 409,000 | 6.56E7 | 6.56E7 | 1,211 | 6.55E7 |

TABLE 4.13a

Section 2

| Component/ | Stream Number, Metric Tons per Year (Te/yr) | | |
|---|---|---|---|
| Item | 8 | 9 | 10 |
| (NH$_4$)$_2$U$_2$O$_7$ | 0 | 0 | 0 |
| Urea | 0 | 0 | 0 |
| HTMA | 0 | 0 | 0 |
| NH$_4$OH | 0 | 608 | 0 |
| Oil | 0 | 0 | 0 |
| Nitrogen | 7,115 | 0 | 0 |
| Carbon | 0 | 0 | 0 |
| Water | 65 | 6,341 | 0 |
| HNO$_3$ | 0 | 123 | 0 |
| Facility Waste | 0 | 0 | 2,880(4) |
| Total | 7,180 | 7,122 | 2,880(4) |
| Temp., ° C. | 25 | 25 | 25 |
| Flow, liter/hr | 6.56E5 | 813 | 2,880(4) |

In the preferred embodiment, the spheres are subjected to slow, low temperature drying in order to remove the volatile species, such as water, nitric acid, and ammonia, while avoiding cracking. Non-volatile species, such as urea and HMTA, are not removed in this process. Preferably, the aged spheres 1 from the 1,200 Micron Sphere Setting/Washing Station are introduced into a commercial Tray Dryer. The Tray Dryer is equipped with a moving screen which provides a contacting arrangement for drying with warm nitrogen gas 7. Warm nitrogen gas 7 is purified in a commercial Nitrogen Condenser/Dryer and recycled. Adiabatic drying is assumed.

The Nitrogen Condenser/Dryer uses refrigeration to condense volatile species 9 which are transferred to the Ammonium Hydroxide Purification Station. A recuperative heat exchanger (not shown) minimizes energy consumption. An adsorbent bed of molecular sieves (not shown) is also used to further dry the nitrogen. The molecular sieves are periodically regenerated by a purge air stream (not shown) The material and energy balances for the exemplary process in Table 4.13 utilize 99% condensation of the water in the Tray Dryer and 100% condensation of the nitric acid and ammonium hydroxide in the water. The remaining 1% of the water is removed by the adsorbent bed. Although leak-free operation has been attained commercially, the analyses in Table 4.13 utilize a nitrogen makeup stream 4 represents the reconstituted nitrogen stream. Stream 5 is the supply air used to regenerate and purge the dryer, and becomes stream 8.

The dried spheres 6 are removed from the Tray Dryer and transferred to the 1,200 Micron Sphere Conversion/Sintering Station.

Facility waste 10 from the 1,200 Micron Sphere Drying Station is sent to Waste Treatment.

FIG. 4.14 depicts the flow sheet for the 300 Microshpere Drying Station. The material and energy balances for the exemplary process for production of uranium dioxide microspheres and uranium carbide microspheres are shown in Table 4.14 and Table 4.14a, respectively.

TABLE 4.14

Section 1

| Component/ | Stream Number, Metric Tons per Year (Te/yr) | | | | | | |
|---|---|---|---|---|---|---|---|
| Item | 1 | 2 | 3 | 4 | 5 | 6 | 7 |
| (NH$_4$)$_2$U$_2$O$_7$ | 7,488 | 0 | 0 | 0 | 0 | 7,488 | 0 |
| Urea | 88 | 0 | 0 | 0 | 0 | 88 | 0 |
| HTMA | 248 | 0 | 0 | 0 | 0 | 248 | 0 |
| NH$_4$OH | 292 | 277 | 0 | 277 | 0 | 15 | 0 |
| Oil | 329 | 0 | 0 | 0 | 0 | 329 | 0 |
| Nitrogen | 0 | 361,845 | 372 | 361,845 | 3,618 | 0 | 361,845 |
| Water | 3,482 | 3,308 | 0 | 3,308 | 0 | 174 | 0 |
| HNO$_3$ | 74 | 70 | 0 | 70 | 0 | 4 | 0 |
| Facility Waste | 0 | 0 | 0 | 0 | 0 | 0 | 0 |

TABLE 4.14-continued

Section 1

| Component/Item | Stream Number, Metric Tons per Year (Te/yr) | | | | | | |
|---|---|---|---|---|---|---|---|
| | 1 | 2 | 3 | 4 | 5 | 6 | 7 |
| Total | 12,001 | 365,500 | 372 | 365,500 | 3,618 | 8,346 | 361,845 |
| Temp., °C. | 25 | 30 | 30 | 30 | 25 | 100 | 120 |
| Flow, liter/hr | 761 | 3.34E7 | 68,200 | 3.34E7 | 330,000 | 529 | 3.34E7 |

TABLE 4.14

Section 2

| Component/Item | Stream Number, Metric Tons per Year (Te/yr) | | |
|---|---|---|---|
| | 8 | 9 | 10 |
| $(NH_4)_2U_2O_7$ | 0 | 0 | 0 |
| Urea | 0 | 0 | 0 |
| HTMA | 0 | 0 | 0 |
| $NH_4OH$ | 0 | 277 | 0 |
| Oil | 0 | 0 | 0 |
| Nitrogen | 3,618 | 0 | 0 |
| Water | 33 | 3,275 | 0 |
| $HNO_3$ | 0 | 70 | 0 |
| Facility Waste | 0 | 0 | 2,880(4) |
| Total | 3,651 | 3,622 | 2,880(4) |
| Temp., °C. | 25 | 25 | 25 |
| Flow, liter/hr | 330,000 | 400 | 2,880(4) |

TABLE 4.14a

Section 1

| Component/Item | Stream Number, Metric Tons per Year (Te/yr) | | | | | | |
|---|---|---|---|---|---|---|---|
| | 1 | 2 | 3 | 4 | 5 | 6 | 7 |
| $(NH_4)_2U_2O_7$ | 7,488 | 0 | 0 | 0 | 0 | 7,88 | 0 |
| Urea | 88 | 0 | 0 | 0 | 0 | 88 | 0 |
| HTMA | 248 | 0 | 0 | 0 | 0 | 248 | 0 |
| $NH_4OH$ | 292 | 277 | 0 | 277 | 0 | 15 | 0 |
| Oil | 329 | 0 | 0 | 0 | 0 | 329 | 0 |
| Nitrogen | 0 | 361,845 | 372 | 361,845 | 3,618 | 0 | 361,845 |
| Carbon | 855 | 0 | 0 | 0 | 0 | 855 | 0 |
| Water | 3,482 | 3,308 | 0 | 3,308 | 0 | 174 | 0 |
| $HNO_3$ | 74 | 70 | 0 | 70 | 0 | 4 | 0 |
| Facility Waste | 0 | 0 | 0 | 0 | 0 | 0 | 0 |
| Total | 12,856 | 365,500 | 372 | 365,500 | 3,618 | 9,201 | 361,845 |
| Temp., °C. | 25 | 30 | 30 | 30 | 25 | 100 | 120 |
| Flow, liter/hr | 761 | 3.34E7 | 68,200 | 3.34E7 | 330,000 | 529 | 3.34E7 |

TABLE 4.14a

Section 2

| Component/Item | Stream Number, Metric Tons per Year (Te/yr) | | |
|---|---|---|---|
| | 8 | 9 | 10 |
| $(NH_4)_2U_2O_7$ | 0 | 0 | 0 |
| Urea | 0 | 0 | 0 |
| HTMA | 0 | 0 | 0 |
| $NH_4OH$ | 0 | 277 | 0 |
| Oil | 0 | 0 | 0 |
| Nitrogen | 3,618 | 0 | 0 |
| Carbon | 0 | 0 | 0 |
| Water | 33 | 3.275 | 0 |
| $HNO_3$ | 0 | 70 | 0 |
| Facility Waste | 0 | 0 | 2,880(4) |
| Total | 3,651 | 3,622 | 2,880(4) |
| Temp., °C. | 25 | 25 | 25 |
| Flow, liter/hr | 330,000 | 400 | 2,880(4) |

This station performs the drying for the 300 micron sized product. Apart from the flow rates, the operations are identical to those for the 1,200 micron spheres discussed in Section 4.4.14. FIG. 4.14 shows the flow sheet, and Table 4.14 summarized the mass and energy balances.

L. Gel Sphere Conversion and Sintering By Heating

FIG. 4.15 depicts the flow sheet for the 1200 Microsphere Conversion and Sintering/Washing Station. The material and energy balances for the exemplary process for production of uranium dioxide microspheres and uranium carbide microspheres are shown in Table 4.15 and Table 4.15a, respectively.

TABLE 4.15

| Component/ | Stream Number, Metric Tons per Year (Te/yr) | | | | |
|---|---|---|---|---|---|
| Item | 1 | 2 | 3 | 4 | 5 |
| $(NH_4)_2U_2O_7$ | 17,160 | 0 | 0 | 0 | 0 |
| $UO_2$ | 0 | 0 | 14,850 | 0 | 0 |
| $NH_3$ | 0 | 0 | 0 | 1,350 | 0 |
| $CO_2$ | 0 | 0 | 0 | 3,660 | 0 |
| $N_2$ | 0 | 0 | 0 | Trace | 0 |
| Argon | 0 | 10,725 | 0 | 10,725 | 0 |
| Hydrogen | 0 | 110 | 0 | 429 | 0 |
| $NO_2$ | 0 | 0 | 0 | 4.6 | 0 |
| Urea | 206 | 0 | 0 | 0 | 0 |
| HTMA | 579 | 0 | 0 | 0 | 0 |
| $NH_4OH$ | 32 | 0 | 0 | 0 | 0 |
| Oil | 769 | 0 | 0 | 0 | 0 |
| Nitrogen | 0 | 0 | 0 | 0 | 0 |
| Water | 340 | 1,100 | 0 | 0 | 0 |
| Facility Waste | 0 | 0 | 0 | 0 | 0 |
| Total | 19,092 | 11,935 | 14,850 | 16,169 | 0 |
| Temp., °C. | 25 | 150 | 100 | 300 | 25 |
| Flow, liter/hr | 1,667 | 1.16E6 | 188 | 2.2E6 | 0 |

TABLE 4.15

| Component/ | Stream Number, Metric Tons per Year (Te/yr) | | | | |
|---|---|---|---|---|---|
| Item | 1 | 2 | 3 | 4 | 5 |
| $(NH_4)_2U_2O_7$ | 17,160 | 0 | 0 | 0 | 0 |
| $UC_2$ | 0 | 0 | 14,588 | 0 | 0 |
| $NH_3$ | 0 | 0 | 0 | 1,350 | 0 |
| $CO_2$ | 0 | 0 | 0 | 5,636 | 0 |
| $N_2$ | 0 | 0 | 0 | Trace | 0 |
| Argon | 0 | 10,725 | 0 | 10,725 | 0 |
| Hydrogen | 0 | 110 | 0 | 429 | 0 |
| $NO_2$ | 0 | 0 | 0 | 4.6 | 0 |
| Urea | 206 | 0 | 0 | 0 | 0 |
| HTMA | 579 | 0 | 0 | 0 | 0 |
| $NH_4OH$ | 32 | 0 | 0 | 0 | 0 |
| Oil | 769 | 0 | 0 | 0 | 0 |
| Nitrogen | 0 | 0 | 0 | 0 | 0 |
| Carbon | 1,995 | 0 | 0 | 0 | 0 |
| Water | 340 | 1,100 | 0 | 0 | 0 |
| Facility Waste | 0 | 0 | 0 | 0 | 0 |
| Total | 21,087 | 11,935 | 14,588 | 18,145 | 0 |
| Temp., °C. | 25 | 150 | 100 | 300 | 25 |
| Flow, liter/hr | 1,667 | 1.16E6 | 146 | 2.5E6 | 0 |

The dried spheres 1 obtained from the 1,200 Micron Drying Station are introduced into a Vertical Tube Furnace (VTF) where the spheres are converted to uranium dioxide and sintered (i.e., densified). The dried spheres react in the VTF according to the following equation:

$$(NH_4)_2U_2O_7 + 2H_2 \rightarrow 2UO_2 + 3H_2O + 2NH_3$$

The VTF consists of a vertical tube containing a slowly moving packed bed of ADU spheres within an electrically heated furnace. Dry spheres 1 are added at the top of the VTF, while a discharge valve discharges dense product 3 from the bottom.

Typical residence times in the VTF approach twelve hours at maximum temperatures of 1,100 to 1,300° C. In normal conversion and sintering, hydrogen is added to an argon diluent, typically at concentrations of 3.5–4 ppmv, and the gas mixture 2 converted to uranium dioxide and sintered (i.e., densified) is circulated upwards through the VTF. Approximately 50% of the hydrogen is consumed in this process, and the surviving off gas 4 is sent to the Gas Purification Station for recycle. The concentrations of hydrogen in the argon/hydrogen mixture are below the lower flammability limit for hydrogen in air, and, thus, prevent hydrogen fire hazards within the VTF system itself.

Meanwhile, urea, HMTA, ammonium hydroxide, nitric acid, and the oil thermally crack and reform in the VTF as follows:

$$CO(NH_2)_2 + H_2O \rightarrow CO_2 + 2NH_3 \text{(urea)}$$

$$(CH_2)_6N_4 + 12H_2O \rightarrow 4NH_3 + 12H_2 + 6CO_2 \text{(HMTA)}$$

$$NH_4OH \rightarrow NH_3 + H_2O$$

$$2HNO_3 + H_2 \rightarrow 2NO_2 + 2H_2O$$

$$(CH_2)_{10} + 20H_2O \rightarrow 10CO_2 + 30H_2$$

The enthalpy balance set forth in Table 4.15 for the exemplary process utilizes a value of 30 KW per VTF, based upon average values reported in the literature. This enthalpy is approximately twice that required for volatilization of the chemical species. For uranium dioxide flow rates of 15,000 tonnes/year, approximately 20 VTF's are required. Unlike normal conversion and sintering operations, there is a net hydrogen production generated from the cracking and reforming of the trace impurities. Also, since the reactions result in a net consumption of water, steam (not shown) is added to the argon diluent in the VTF feed. Alternatively, steam could be added internally within the VTF. These hydrogen and carbon production effects accrue from the carryover of residual oil upon the spheres. The argon flowrates are based upon maintaining a 4% hydrogen in argon concentration at the exit of the VTF.

The preferred embodiment uses nitrogen in place of argon because of its lower cost and the residual nitrogen in the dense uranium (as uranium nitride) provides additional neutron shielding.

Facility waste 5 from the 300 Micron Sphere Conversion and Sintering Station is sent to Waste Treatment.

FIG. 4.16 depicts the flow sheet for the 300 Microshpere Conversion and Sintering Station. The material and energy balances for the exemplary process for production of uranium dioxide microspheres and uranium carbide microspheres are shown in Table 4.16 and Table 4.16a, respectively.

TABLE 4.16

| Component/ | Stream Number, Metric Tons per Year (Te/yr) | | | | |
|---|---|---|---|---|---|
| Item | 1 | 2 | 3 | 4 | 5 |
| $(NH_4)_2U_2O_7$ | 7,488 | 0 | 0 | 0 | 0 |
| $UO_2$ | 0 | 0 | 6,480 | 0 | 0 |
| $NH_3$ | 0 | 0 | 0 | 585 | 0 |
| $CO_2$ | 0 | 0 | 0 | 1,566 | 0 |
| $N_2$ | 0 | 0 | 0 | Trace | 0 |
| Argon | 0 | 4,575 | 0 | 4,575 | 0 |
| Hydrogen | 0 | 48 | 0 | 183 | 0 |
| $NO_2$ | 0 | 0 | 0 | 5.8 | 0 |
| Urea | 88 | 0 | 0 | 0 | 0 |
| HTMA | 248 | 0 | 0 | 0 | 0 |
| $NH_4OH$ | 15 | 0 | 0 | 0 | 0 |
| Oil | 329 | 0 | 0 | 0 | 0 |
| $HNO_3$ | 4 | 0 | 0 | 0 | 0 |
| Water | 174 | 600 | 0 | 0 | 0 |
| Facility Waste | 0 | 0 | 0 | 0 | 0 |
| Total | 8,346 | 5,223 | 6,480 | 6,915 | 0 |
| Temp, 20 C. | 100 | 150 | 100 | 300 | 25 |
| Flow, liter/hr | 529 | 5.08E5 | 82 | 9.41E5 | 0 |

TABLE 4.16a

| Component/Item | Stream Number, Metric Tons per Year (Te/yr) | | | | |
|---|---|---|---|---|---|
| | 1 | 2 | 3 | 4 | 5 |
| $(NH_4)_2U_2O_7$ | 7,488 | 0 | 0 | 0 | 0 |
| $UO_2$ | 0 | 0 | 6,252 | 0 | 0 |
| $NH_3$ | 0 | 0 | 0 | 585 | 0 |
| $CO_2$ | 0 | 0 | 0 | 2,598 | 0 |
| $N_2$ | 0 | 0 | 0 | Trace | 0 |
| Argon | 0 | 4,575 | 0 | 4,575 | 0 |
| Hydrogen | 0 | 48 | 0 | 183 | 0 |
| $NO_2$ | 0 | 0 | 0 | 5.8 | 0 |
| Urea | 88 | 0 | 0 | 0 | 0 |
| HTMA | 248 | 0 | 0 | 0 | 0 |
| $NH_4OH$ | 15 | 0 | 0 | 0 | 0 |
| Oil | 329 | 0 | 0 | 0 | 0 |
| $HNO_3$ | 4 | 0 | 0 | 0 | 0 |
| Carbon | 855 | 0 | 0 | 0 | 0 |
| Water | 174 | 600 | 0 | 0 | 0 |
| Facility Waste | 0 | 0 | 0 | 0 | 0 |
| Total | 9,201 | 5,223 | 6,252 | 7,947 | 0 |
| Temp., °C. | 100 | 150 | 100 | 300 | 25 |
| Flow, liter/hr. | 529 | 5.08E5 | 63 | 1.08E6 | 0 |

Conversion and sintering of the 300 micron particles occur in a manner analogous to the 1,200 micron spheres. Approximately 8 VTF's are required for the 300 micron spheres.

M. Gel Sphere Collection

As discussed previously, the final dense spheres are approximately 30% the size of the initial droplets (gel spheres). It is desirable to have at least two size ranges for better packing, higher bulk densities, and, consequently, better shielding. These size ranges are 1–2 mm for the coarse fraction and 0.030–1 mm for the fine fraction. The coarse spheres contain the majority of the uranium on a mass basis.

N. Calcium Nitrate Reconstitution for the Calcium Nitrate Reconstitution Station FIG. 4.17 depicts the flow sheet for the Calcium Nitrate Reconstitution Station. The material and energy balances for the exemplary process for production of uranium dioxide microspheres and uranium carbide microspheres are shown in Table 4.17 and Table 4.17a, respectively.

TABLE 4.17

| Component/Item | Stream Number, Metric Tons per Year (Te/yr) | | | | | |
|---|---|---|---|---|---|---|
| | 1 | 2 | 3 | 4 | 5 | 6 |
| $HNO_3$ | 6,804 | 0 | 3,110 | 0 | 0 | 0 |
| Lime (CaO) | 0 | 4,396 | 0 | 0 | 0 | 0 |
| $Ca(NO_3)_2$ | 0 | 0 | 0 | 12,874 | 0 | 12,874 |
| Water | 2,268 | 0 | 141,214 | 144,815 | 93,399 | 51,496 |
| Total | 9,072 | 4,396 | 144,324 | 157,769 | 93,399 | 64,370 |
| Temp., °C. | 25 | 0 | 60 | 60 | 60 | 60 |
| Flow, l/hr | 1,036 | 335 | 16,475 | 18,010 | 10,662 | 6,100 |

TABLE 4.17a

| Component/Item | Stream Number, Metric Tons per Year (Te/yr) | | | | | |
|---|---|---|---|---|---|---|
| | 1 | 2 | 3 | 4 | 5 | 6 |
| $HNO_3$ | 6,801 | 0 | 3,110 | 0 | 0 | 0 |
| Lime (CaO) | 0 | 4,396 | 0 | 0 | 0 | 0 |
| $Ca(NO_3)_2$ | 0 | 0 | 0 | 12,874 | 0 | 12,874 |
| Water | 2,268 | 0 | 141,214 | 144,815 | 93,399 | 51,496 |
| Total | 9,072 | 4,396 | 144,324 | 157,769 | 93,399 | 64,370 |
| Temp., °C. | 25 | 0 | 60 | 60 | 60 | 60 |
| Flow, l/hr | 1,036 | 335 | 16,475 | 18,000 | 10,662 | 6,100 |

The overhead product 3 consisting of a dilute nitric acid stream from the Uranyl Nitrate Solution Adjustment Station is added to a Mixing Tank along with dry lime 2 to form calcium nitrate. Additional nitric acid 1 is added to the output 3 of the Mixing Tank, and the mixture 4 is sent to a Vapor Recompression (VR) Evaporator where Excess Water 5 is removed and sent to the Deionized Water System. The Reconstituted Product 6 from the VR Evaporator containing the calcium nitrate is transferred to the Uranyl Nitrate Formation Station for reuse.

O. Ammonium Hydroxide Solution Purification

FIG. 4.18 depicts the flow sheet for the Ammonium Hydroxide Solution Purification Station. The material and energy balances for the exemplary process for production of uranium dioxide microspheres and uranium carbide microspheres are shown in Table 4.18 and Table 4.18a, respectively.

TABLE 4.18

| | Section 1 | | | | | | |
|---|---|---|---|---|---|---|---|
| Component/Item | Stream Number, Metric Tons per Year (Te/yr) | | | | | | |
| | 1 | 2 | 3 | 4 | 5 | 6 | 7 |
| Urea | 3,917 | 1,679 | 0 | 0 | 0 | 5,596 | 5,596 |
| HMTA | 11,000 | 4,715 | 0 | 0 | 0 | 15,715 | 15,715 |
| $NH_4OH$ | 12,152 | 5,541 | 0 | 0 | 0 | 17,693 | 18,578 |
| Oil | 16 | 8 | Trace | Trace | 0 | 24 | 24 |
| $HNO_3$ | 2,454 | 1,410 | 0 | 0 | 0 | 3,864 | 0 |
| Water | 129,124 | 66,164 | 0 | 0 | 2,600 | 195,288 | 208,713 |
| NaOH (50%) | 0 | 0 | 0 | 0 | 2,600 | 0 | 24 |
| $NaNO_3$ | 0 | 0 | 0 | 0 | 0 | 0 | 5,474 |
| Facility Waste | 0 | 0 | 0 | 0 | 0 | 0 | 0 |
| Total | 158,663 | 79,490 | Trace | Trace | 5,200 | 238,180 | 254,124 |
| Temp., °C. | 25 | 25 | 25 | 25 | 25 | 25 | 25 |
| Flow, liter/hr | 18,112 | 9,074 | 0 | 0 | 495 | 27,186 | 24,175 |

TABLE 4.18

Section 2

| Component | Stream Number, Metric Tons per Year (Te/yr) | | | | | | |
|---|---|---|---|---|---|---|---|
| | 8 | 9 | 10 | 11 | 12 | 13 | 14 |
| Urea | 0 | 5,596 | 0 | 5,596 | 0 | 0 | 0 |
| HMTA | 0 | 15,715 | 0 | 15,715 | 0 | 0 | 0 |
| $NH_4OH$ | 18,578 | 0 | 0 | 0 | 0 | 608 | 277 |
| Oil | 0 | 24 | 0 | 0 | 0 | 0 | 0 |
| $HNO_3$ | 0 | 0 | 0 | 0 | 0 | 123 | 70 |
| Water | 167,202 | 41,511 | 8,505 | 33,006 | 0 | 6,391 | 3,275 |
| NaOH (50%) | 0 | 24 | 24 | 0 | 0 | 0 | 0 |
| $NaNO_3$ | 0 | 5,474 | 5,474 | 0 | 0 | 0 | 0 |
| Facility Waste | 0 | 0 | 0 | 0 | 2,880 | 0 | 0 |
| Total | 185,780 | 68,344 | 14,003 | 54,317 | 2,880 | 7,122 | 3,622 |
| Temp., ° C. | 40 | 40 | 40 | 40 | 25 | 25 | 25 |
| Flow, liter/hr | 17,700 | 6,500 | 1,332 | 5,200 | 2,880 | 813 | 400 |

TABLE 4.18

Section 3

| Component | Stream Number, Metric Tons per Year (Te/yr) | | |
|---|---|---|---|
| | 15 | 16 | 17 |
| Urea | 0 | 5,596 | 5,596 |
| HTMA | 0 | 15,715 | 15,715 |
| $NH_4OH$ | 885 | 18,578 | 0 |
| Oil | 0 | 24 | 0 |
| $HNO_3$ | 193 | 4,057 | 0 |
| Water | 9,666 | 204,954 | 41,511 |
| NaOH (50%) | 0 | 0 | 24 |
| $NaNO_3$ | 0 | 0 | 5,474 |
| Facility Waste | 0 | 0 | 0 |
| Total | 10,744 | 248,924 | 68,320 |
| Temp., ° C. | 25 | 25 | 25 |
| Flow, liter/hr | 1,213 | 23,680 | 6,500 |

TABLE 4.18a

| Component | Stream Number, Metric Tons per Year (Te/yr) | | | | | |
|---|---|---|---|---|---|---|
| | 1 | 2 | 3 | 4 | 5 | 6 |
| Urea | 3,917 | 1,679 | 0 | 0 | 0 | 5,596 |
| HMTA | 11,000 | 4,715 | 0 | 0 | 0 | 15,715 |
| $NH_4OH$ | 12,152 | 5,541 | 0 | 0 | 0 | 17,693 |
| Oil | 16 | 8 | Trace | Trace | 0 | 24 |
| $HNO_3$ | 2,454 | 1,410 | 0 | 0 | 0 | 3,864 |
| Water | 129,124 | 66,164 | 0 | 0 | 2,600 | 195,288 |
| NaOH (50%) | 0 | 0 | 0 | 0 | 2,600 | 0 |
| $NaNO_3$ | 0 | 0 | 0 | 0 | 0 | 0 |
| Facility Waste | 0 | 0 | 0 | 0 | 0 | 0 |
| Total | 158,663 | 79,490 | Trace | Trace | 5,200 | 238,180 |
| Temp., ° C. | 25 | 25 | 25 | 25 | 25 | 25 |
| Flow, liter/hr | 18,112 | 9,074 | 0 | 0 | 495 | 27,186 |

Ammonium hydroxide solution from the 1,200 Micron Setting/Washing Station 1 and from the 300 Micron Setting/Washing Station 2 are sent to Oil/Water Separators, which remove any excess oil from the respective ammonium hydroxide solutions. The separated oil portions 3 and 4 are sent to the 1,200 Micron and 300 Micron Gel Forming Stations, respectively. In a large plant, significant quantities of oil would be expected to be carried over due to the size of the equipment. Next, the ammonium hydroxide streams from the Oil/Water Separators are merged into a single stream 6 and combined with the condensate 15 formed by the combination of the condensates 13 and 14 from the 1,200 Micron Dryer Station and the 300 Micron Dryer Station, respectively. A 50% Sodium Hydroxide Solution 5 is added to the condensate/ammonium hydroxide mixture 16 to neutralize the nitric acid, displace ammonia, and raise the solution pH above 10. A VR Evaporator processes the resulting mixture 7. The overhead stream 8 from the VR Evaporator is a dilute, 10% ammonium hydroxide solution, which is sent to the Ammonium Hydroxide Solution Reconstitution Station, described below, for further processing. The bottoms 9 from the UR Evaporator contain sodium nitrate, urea, and HMTA, with a total dissolved solids concentration approaching 40%. Traces of oil are removed from the bottoms 9 by activated carbon in a Carbon Guard Bed. A membrane system, such as a reverse osmosis membrane, separates sodium nitrate permeate 10 from the urea and HMTA in the de-oiled solution 17. The sodium nitrate permeate 10 is sent to Waste Treatment, while the retentate 11 reports to the Urea and HMTA Recovery Station, described below. An optimized design for this portion of the system would preferably evaporate less water and use solubility limits to the utmost advantage. Facility waste 12 from the Ammonium Hydroxide Solution Purification Station is sent to Waste Treatment.

P. Vertical Tube Furnace Gas Purification

FIG. 4.19 depicts the flow sheet for the Vertical Tube Furnace Gas Purification Station. The material and energy balances for the exemplary process for production of uranium dioxide microspheres and uranium carbide microspheres are shown in Table 4.19 and Table 4.19a, respectively.

TABLE 4.19

Section 1

| Component/Item | Stream Number, Metric Tons per Year (Te/yr) | | | | | | |
|---|---|---|---|---|---|---|---|
| | 1 | 2 | 3 | 4 | 5 | 6 | 7 |
| $UO_2$ | 0 | 0 | 0 | 0 | 0 | 0 | 0 |
| $NH_3$ | 0 | 1,350 | 585 | 1,935 | 0 | 0 | 0 |
| $CO_2$ | 0 | 3,660 | 1,566 | 5,226 | 0 | 0 | 0 |
| $N_2$ | 0 | Trace | Trace | Trace | 0 | 0 | 0 |
| Argon | 0 | 10,725 | 4,575 | 15,300 | 0 | 0 | 0 |
| Hydrogen | 0 | 429 | 183 | 612 | 0 | 0 | 0 |
| $NO_2$ | 0 | 4.6 | 5.8 | 10.4 | 0 | 0 | 0 |
| NaOH | 0 | 0 | 0 | 0 | 0 | 0 | 0 |
| $Na_2CO_3$ | 0 | 0 | 0 | 0 | 0 | 0 | 0 |
| $NH_4OH$ | 0 | 0 | 0 | 0 | 0 | 0 | 0 |
| $HNO_3$ | 0 | 0 | 0 | 0 | 0 | 0 | 0 |
| Water | 1700 | 0 | 0 | 0 | 90,707 | 43,603 | 47,104 |
| Facility Waste | 0 | 0 | 0 | 0 | 0 | 0 | 0 |
| Total | 1,700 | 16,169 | 6,915 | 23,084 | 90,707 | 43,603 | 47,104 |
| Temp., °C. | 150 | 300 | 300 | 300 | 25 | 25 | 25 |
| Flow, l/hr | 194,000 | 2.05E6 | 8.8E5 | 2.93E6 | 10,355 | 4,978 | 5.377 |

TABLE 4.19

Section 2

| Component | Stream Number, Metric Tons per Year (Te/yr) | | | | | | |
|---|---|---|---|---|---|---|---|
| | 8 | 9 | 10 | 11 | 12 | 13 | 14 |
| $UO_2$ | 0 | 0 | 0 | 0 | 0 | 0 | 0 |
| $NH_3$ | 0 | 0 | 1,935 | 0 | 0 | 0 | 0 |
| $CO_2$ | 0 | 0 | 5,226 | 0 | 5.226 | 0 | 0 |
| $N_2$ | 0 | 0 | 0 | 0 | 0 | 0 | 0 |
| Argon | 0 | 0 | 15,300 | 0 | 15,300 | 0 | 0 |
| Hydrogen | 0 | 0 | 612 | 0 | 612 | 612 | 0 |
| $NO_2$ | 0 | 0 | 10.4 | 0 | 0 | 0 | 0 |
| NaOH | 9,502 | 9,502 | 0 | 0 | 0 | 0 | Trace |
| $Na_2CO_3$ | 0 | 0 | 0 | 0 | 0 | 0 | 12,614 |
| $NH_4OH$ | 0 | 0 | 0 | 9,660 | 0 | 0 | 0 |
| $HNO_3$ | 0 | 0 | 0 | 14.5 | 0 | 0 | 0 |
| Water | 9,502 | 0 | 0 | 38,625 | 0 | 0 | 50,456 |
| Facility Waste | 0 | 0 | 0 | 0 | 0 | 0 | 0 |
| Total | 19,004 | 51,904 | 23,084 | 48,300 | 21,138 | 15,912 | 63,070 |
| Temp., °C. | 25 | 25 | 100 | 25 | 25 | 25 | 25 |
| Flow, l/hr | 1,808 | 5,925 | 1.96E6 | 5,500 | 1.79E6 | 1.4E6 | 7,200 |

TABLE 4.19

Section 3

| Component | Stream Number, Metric Tons per Year (Te/yr) | | | | | | |
|---|---|---|---|---|---|---|---|
| | 15 | 16 | 17 | 18 | 19 | 20 | 21 |
| $UO_2$ | 0 | 0 | 0 | 0 | 0 | 0 | 0 |
| $NH_3$ | 0 | 0 | 0 | 0 | 0 | 0 | 0 |
| $CO_2$ | 0 | 0 | 0 | 0 | 0 | 0 | 0 |
| $N_2$ | 0 | 0 | 0 | 0 | 0 | 0 | 0 |
| Argon | 0 | 15,300 | 15,300 | 10,725 | 4,575 | 153 | 0 |
| Hydrogen | 454 | 158 | 158 | 110 | 48 | 0 | 0 |
| $NO_2$ | 0 | 0 | 0 | 0 | 0 | 0 | 0 |
| NaOH | 0 | 0 | 0 | 0 | 0 | 0 | 0 |
| $Na_2CO_3$ | 0 | 0 | 0 | 0 | 0 | 0 | 0 |
| $NH_4OH$ | 0 | 0 | 0 | 0 | 0 | 0 | 0 |
| $HNO_3$ | 0 | 0 | 0 | 0 | 0 | 0 | 0 |
| Water | 0 | 0 | 1,700 | 1,100 | 600 | 0 | 0 |
| Facility Waste | 0 | 0 | 0 | 0 | 0 | 0 | 2,880 |
| Total | 454 | 15,458 | 17,158 | 11,935 | 5,223 | 153 | 2,880 |
| Temp., °C. | 25 | 25 | 150 | 150 | 150 | 25 | 25 |
| Flow, l/hr | 5.8E5 | 1.35E6 | 1.6E6 | 1.1E6 | 4.7E5 | 9,780 | 2,880 |

TABLE 4.19a

Section 1

Stream Number, Metric Tons per Year (Te/yr)

| Component | 1 | 2 | 3 | 4 | 5 | 6 | 7 |
|---|---|---|---|---|---|---|---|
| $UO_2$ | 0 | 0 | 0 | 0 | 0 | 0 | 0 |
| $NH_3$ | 0 | 1,350 | 585 | 1,935 | 0 | 0 | 0 |
| $CO_2$ | 0 | 5,636 | 2,598 | 8,234 | 0 | 0 | 0 |
| $N_2$ | 0 | Trace | Trace | Trace | 0 | 0 | 0 |
| Argon | 0 | 10,725 | 4,575 | 15,300 | 0 | 0 | 0 |
| Hydrogen | 0 | 429 | 183 | 612 | 0 | 0 | 0 |
| $NO_2$ | 0 | 4.6 | 5.8 | 10.4 | 0 | 0 | 0 |
| NaOH | 0 | 0 | 0 | 0 | 0 | 0 | 0 |
| $Na_2CO_3$ | 0 | 0 | 0 | 0 | 0 | 0 | 0 |
| $NH_4OH$ | 0 | 0 | 0 | 0 | 0 | 0 | 0 |
| $HNO_3$ | 0 | 0 | 0 | 0 | 0 | 0 | |
| Water | 1700 | 0 | 0 | 0 | 90,707 | 43,603 | 47,104 |
| Facility Waste | 0 | 0 | 0 | 0 | 0 | 0 | 0 |
| Total | 1,700 | 18,145 | 7,947 | 26,902 | 90,707 | 43,603 | 47,104 |
| Temp., ° C. | 150 | 300 | 300 | 300 | 25 | 25 | 25 |
| Flow, l/hr | 194 | 2.05E6 | 1.08E6 | 3.58E6 | 10,355 | 4,978 | 5,377 |

TABLE 4.19a

Section 2

Stream Number, Metric Tons Per Year (Te/yr)

| Component | 8 | 9 | 10 | 11 | 12 | 13 | 14 |
|---|---|---|---|---|---|---|---|
| $UO_2$ | 0 | 0 | 0 | 0 | 0 | 0 | 0 |
| $NH_3$ | 0 | 0 | 1,935 | 0 | 0 | 0 | 0 |
| $CO_2$ | 0 | 0 | 8234 | 0 | 8,234 | 0 | 0 |
| $N_2$ | 0 | 0 | 0 | 0 | 0 | 0 | 0 |
| Argon | 0 | 0 | 15,300 | 0 | 15,300 | 0 | 0 |
| Hydrogen | 0 | 0 | 612 | 0 | 612 | 612 | 0 |
| $NO_2$ | 0 | 0 | 10.4 | 0 | 0 | 0 | 0 |
| NaOH | 14,971 | 14,971 | 0 | 0 | 0 | 0 | Trace |
| $Na_2CO_3$ | 0 | 0 | 0 | 0 | 0 | 0 | 19,874 |
| $NH_4OH$ | 0 | 0 | 0 | 9,660 | 0 | 0 | 0 |
| $HNO_3$ | 0 | 0 | 0 | 14.5 | 0 | 0 | 0 |
| Water | 9,502 | 0 | 0 | 38,625 | 0 | 0 | 50,456 |
| Facility Waste | 0 | 0 | 0 | 0 | 0 | 0 | 0 |
| Total | 29,947 | 51,904 | 26,092 | 48,300 | 21,138 | 15,912 | 70,330 |
| Temp., ° C. | 25 | 25 | 100 | 25 | 25 | 25 | 25 |
| Flow, l/hr | 2,848 | 5,925 | 2.4E6 | 5,500 | 2.04E6 | 1.4E6 | 8,030 |

TABLE 4.19a

Section 3

Stream Number, Metric Tons Per Year (Te/yr)

| Component | 15 | 16 | 17 | 18 | 19 | 20 | 21 |
|---|---|---|---|---|---|---|---|
| $UO_2$ | 0 | 0 | 0 | 0 | 0 | 0 | 0 |
| $NH_3$ | 0 | 0 | 0 | 0 | 0 | 0 | 0 |
| $CO_2$ | 0 | 0 | 0 | 0 | 0 | 0 | 0 |
| $N_2$ | | | | | | | |
| Argon | 0 | 15,300 | 15,300 | 10,725 | 4,575 | 153 | 0 |
| Hydrogen | 454 | 158 | 158 | 110 | 48 | 0 | 0 |
| $NO_2$ | | | | | | | |
| NaOH | 0 | 0 | 0 | 0 | 0 | 0 | 0 |
| $Na_2CO_3$ | 0 | 0 | 0 | 0 | 0 | 0 | 0 |
| $NH_4OH$ | 0 | 0 | 0 | 0 | 0 | 0 | 0 |
| $HNO_3$ | 0 | 0 | 0 | 0 | 0 | 0 | 0 |
| Water | 0 | 0 | 1,700 | 1,100 | 600 | 0 | 0 |
| Facility Waste | 0 | 0 | 0 | 0 | 0 | 0 | 2,880 |
| Total | 454 | 15,458 | 17,158 | 11,935 | 5,223 | 153 | 2,880 |
| Temp., ° C. | 25 | 25 | 150 | 150 | 150 | 25 | 25 |
| Flow, l/hr | 5.8E5 | 1.35E6 | 1.6E6 | 1.1E6 | 4.7E5 | 9,780 | 2,880 |

The hot gases 2 and 3 from the VTF's in the 1,200 Micron and 300 Micron Conversion and Sintering Station, respectively, are merged into a single stream 4 and filtered. (Although it is expected that little or no material will be captured due to the size, narrow diameter distribution, and density of the microspheres.) The filtered gas is then passed through a Heat Exchanger where it is cooled. Thereafter, the cooled gas 10 is passed to a Spray Tower. The Spray Tower condenses the ammonia and nitrogen dioxide in an aqueous solution 11 which is sent to the Ammonium Hydroxide Purification Station, for further processing.

A 50% solution of sodium hydroxide 8 is diluted in a Mixing Tank with deionized water 7 from the Deionized Water Supply 5. The resulting solution 9 having a pH of 10–13.5 is introduced into a $CO_2$ Scrubber Tower where it is used to scrub the carbon dioxide from the gas stream 12 emerging from the Spray Tower, according to the following equation:

$$2NaOH + CO_2 \rightarrow Na_2CO_3 + H_2O$$

The sodium carbonate product solution 14 discharged from the $CO_2$ Scrubber Tower is sent to Waste Treatment for disposal.

The remaining hydrogen-inert gas (nitrogen in the preferred route) mixture 13 emerging from the $CO_2$ Scrubber Tower is filtered. A membrane system is then used to separate the excess hydrogen 15 from the remaining hydrogen-argon gas mixture 13. This separation is accomplished with relative ease due to the large molecular weight differences between the hydrogen and argon gases and the selectivity of the membranes; hydrogen diffuses rapidly through membranes, and the other gases do not diffuse at all. Typical membranes include polysulfone and related, hollow fiber designs. The excess hydrogen 15 flows to the Utility Supply Building where it can be used as fuel in the incinerator. The purified hydrogen-argon mixture 16 is enriched with additional argon 20 from the Argon Supply and passed through the Heat Exchanger. The heated and enriched hydrogen-argon mixture 17 is divided into two portions 18 and 19 that are sent to the VTF's in the 1,200 and 300 Micron Conversion and Sintering Stations, respectively. Steam is added to reform (destroy) tramp oil into hydrogen, methane, and carbon. The flow sheet assumes a closed system, but includes a 10% per year makeup for the argon.

Facility waste 21 from the VTF Gas Purification Station is sent to Waste Treatment.

Q. Ammonium Hydroxide Reconstitution

FIG. 4.20 depicts the flow sheet for the Ammonium Hydroxide Reconstitution Station. The material and energy balances for the exemplary process for production of uranium dioxide microspheres and uranium carbide microspheres are shown in Table 4.20 and Table 4.20a, respectively.

TABLE 4.20

| Component | Stream Number, Metric Tons per Year (Te/yr) | | | | | |
|---|---|---|---|---|---|---|
| | 1 | 2 | 3 | 4 | 5 | 6 |
| $NH_4OH$ | 18,578 | 2,797 | 0 | 21,375 | 14,717 | 6,658 |
| Water | 167,202 | 2,797 | 22,370 | 192,369 | 132,451 | 59,918 |
| Total | 185,780 | 5,594 | 22,370 | 213,744 | 147,168 | 66,576 |
| Temp., °C. | 40 | 25 | 25 | 25 | 25 | 25 |
| Flow, l/hr | 17,700 | 532 | 2,554 | 20,300 | 14,000 | 6,000 |

TABLE 4.20a

| Component | Stream Number, Metric Tons per Year (Te/yr) | | | | | |
|---|---|---|---|---|---|---|
| | 1 | 2 | 3 | 4 | 5 | 6 |
| $NH_4OH$ | 18,578 | 2,797 | 0 | 21,375 | 14,717 | 6,658 |
| Water | 167,202 | 2,797 | 22,370 | 192,369 | 132,451 | 59,918 |
| Total | 185,780 | 5,594 | 22,370 | 213,744 | 147,168 | 66,576 |
| Temp., °C. | 40 | 25 | 25 | 25 | 25 | 25 |
| Flow, l/hr | 17,700 | 532 | 2,554 | 20,300 | 14,000 | 6,000 |

The ammonium hydroxide solution 1 from the Ammonium Hydroxide Purification Station is reconstituted by mixing in a Mixing Tank with a fresh, 50% ammonium hydroxide solution 2 and deionized water 3. The resulting 10% solution of ammonium hydroxide 4 is divided into two fractions 5 and 6 that are sent to the 1,200 Micron and 300 Micron Setting/Washing Stations, respectively.

R. Urea and HMTA Recovery

FIG. 4.21 depicts the flow sheet for the Urea and HMTA Recovery Station. The material and energy balances for the exemplary process for production of uranium dioxide microspheres and uranium carbide microspheres are shown in Table 4.21 and Table 4.21 a, respectively.

TABLE 4.21

| Component | Stream Number, Metric Tons per Year (Te/yr) | | | | | |
|---|---|---|---|---|---|---|
| | 1 | 2 | 3 | 4 | 5 | 6 |
| Urea | 5,596 | 280 | 5,316 | 14 | 5,316 | 0 |
| HMTA | 15,715 | 15,715 | 760 | 760 | 0 | 0 |
| Water | 33,006 | 22,844 | 2,103 | 1,571 | 10,162 | 0 |
| Facility Waste | 0 | 0 | 0 | 0 | 0 | 2,2880 |
| Total | 54,317 | 38,559 | 8,179 | 2,345 | 15,478 | 2,880 |
| Temp., °C. | 40 | 40 | 40 | 40 | 40 | 25 |
| Flow, l/hr | 5,167 | 3,650 | 557 | 223 | 1,472 | 2,880 |

TABLE 4.21a

| Component | Stream Number, Metric Tons per Year (Te/yr) | | | | | |
|---|---|---|---|---|---|---|
| | 1 | 2 | 3 | 4 | 5 | 6 |
| Urea | 5,596 | 280 | 5,316 | 14 | 5,316 | 0 |
| HMTA | 15,715 | 15,715 | 760 | 760 | 0 | 0 |
| Water | 33,006 | 22,844 | 2,103 | 1,571 | 10,162 | 0 |
| Facility Waste | 0 | 0 | 0 | 0 | 0 | 2,2880 |
| Total | 54,317 | 38,559 | 8,179 | 2,345 | 15,478 | 2,880 |
| Temp., °C. | 40 | 40 | 40 | 40 | 40 | 25 |
| Flow, l/hr | 5,167 | 3,650 | 557 | 223 | 1,472 | 2,880 |

Since urea and HMTA effectively function as complexing agents and catalysts the preferred embodiment, they are present in sizable quantities. Therefore, it is desirable to separate and recycle them. In particular, it is desirable to have a urea product that is relatively free of HMTA in order to avoid premature precipitation of uranium dioxide. It is noted, however, that the recovered HMTA can contain urea without significant effects upon the overall process.

It is well known that urea and HMTA form crystals from concentrated solutions. Thus, this property is often used in their manufacture and purification. Urea possesses a solubility of approximately 50% at 17° C. in water, and 17% at 20° C. in alcohol. For HMTA, the solubility is about 45% at 15° C. in water and 3% at 15° C. in alcohol. However, urea possesses better crystallization properties, including the capability to form clathrate-type crystals (essentially double compound crystals) in the presence of low concentrations of paraffinic hydrocarbons. Thus, in the preferred embodiment, urea is selectively crystallized away from the HMTA, via a combination of thermal and chemical effects, and both are recycled. Alternatively, tailored membranes may be effective for the urea-HMTA separation. The crystallization process may be advantageously operated in the batch mode for enhancement of the separation.

S. Cylinder Decontamination

FIG. 4.22 depicts the flow sheet for the Urea and HMTA Recovery Station. The material and energy balances for the exemplary process for production of uranium dioxide microspheres and uranium carbide microspheres are shown in Table 4.22 and Table 4.22a, respectively.

TABLE 4.22

Section 1

Stream Number, Metric Tons per Year (Te/yr)

| Component | 1 | 2 | 3 | 4 | 5 | 6 |
|---|---|---|---|---|---|---|
| Cylinders | 2,240 | 0 | 0 | 0 | 0 | 0 |
| $UO_2F_2$ | 52 | 0 | 0 | 0 | 0 | 52 |
| Water | 0 | 8,960 | 8,960 | 100 | Trace | 8,960 |
| $HNO_3$ | 0 | 0 | 0 | 100 | 0 | 0 |
| Facility Waste | 0 | 0 | 0 | 0 | 0 | 0 |
| $UO_2(NO_3)_2$ | 0 | 0 | 0 | 0 | 0 | 0 |
| Total | 52 | 8,960 | 8,960 | 200 | Trace | 9,012 |
| Temp., ° C. | 25 | 25 | 25 | 25 | 25 | 25 |
| Flow, l/hr | 1,023 | 1,023 | 1,023 | 15 | Trace | 1,023 |

TABLE 4.22

Section 2

Stream Number, Metric Tons per Year (Te/yr)

| Component | 7 | 8 | 9 | 10 | 11 |
|---|---|---|---|---|---|
| Cylinders | 0 | 2,18 | 112 | 168 | 0 |
| $UO_2F_2$ | 0 | 0 | 0 | 0 | 0 |
| Water | 100 | 0 | 0 | 0 | 0 |
| $HNO_3$ | 5 | 0 | 0 | 0 | 0 |
| Facility Waste | 0 | 0 | 0 | 0 | 2,880 |
| $UO_2(NO_3)_2$ | <1 | 0 | 0 | 0 | 0 |
| Total | 100 | 2,128 | 112 | 168 | 2,880 |
| Temp., ° C. | 25 | 25 | 25 | 25 | 25 |
| Flow, l/hr | 12 | (972) | (510 | 2.4 | 2,880 |

TABLE 4.22a

Section 1

Stream Number, Metric Tons per Year (Te/yr)

| Component | 1 | 2 | 3 | 4 | 5 | 6 |
|---|---|---|---|---|---|---|
| Cylinders | 2,240 | 0 | 0 | 0 | 0 | 0 |
| $UO_2F_2$ | 52 | 0 | 0 | 0 | 0 | 52 |
| Water | 0 | 8,960 | 8,960 | 100 | Trace | 8,960 |
| $HNO_3$ | 0 | 0 | 0 | 100 | 0 | 0 |
| Facility Waste | 0 | 0 | 0 | 0 | 0 | 0 |
| $UO_2(NO_3)_2$ | 0 | 0 | 0 | 0 | 0 | 0 |
| Total | 52 | 8,960 | 8,960 | 200 | Trace | 9,012 |
| Temp., ° C. | 25 | 25 | 25 | 25 | 25 | 25 |
| Flow, l/hr | 1,023 | 1,023 | 1,023 | 15 | Trace | 1,023 |

TABLE 4.22a

Section 2

Stream Number, Metric Tons per Year (Te/yr)

| Component | 7 | 8 | 9 | 10 | 11 |
|---|---|---|---|---|---|
| Cylinders | 0 | 2,18 | 112 | 168 | 0 |
| $UO_2F_2$ | 0 | 0 | 0 | 0 | 0 |
| Water | 100 | 0 | 0 | 0 | 0 |
| $HNO_3$ | 5 | 0 | 0 | 0 | 0 |
| Facility Waste | 0 | 0 | 0 | 0 | 2,880 |
| $UO_2(NO_3)_2$ | <0 | 0 | 0 | 0 | |
| Total | 106 | 2,128 | 112 | 168 | 2,880 |
| Temp., ° C. | 25 | 25 | 25 | 25 | 25 |
| Flow, l/hr | 12 | (972) | (510 | 2.4 | 2,880 |

The cylinder decontamination station removes the residual uranium ("heel") from the cylinder via a three step operation. In the first step, the empty cylinders 1 are filled continuously rinsed with deionized water 2 from the Deionized Water Supply 3 for approximately four hours. Since most of the remaining uranium fluorides and oxyfluorides are dissolved in this rinsing step, low decontamination factors (DF's) of 10–20 (i.e., 90–95% removal) and production of the highly soluble, uranyl fluoride is expected. The rinse water 6, which becomes a dilute uranyl fluoride solution, is periodically recycled to the Uranyl Fluoride Formation Station as part of the quench water requirements. In the second step, the empty cylinders are filled and rinsed with a dilute (5%) nitric acid solution 4 for four hours. The nitric acid solution 4 allows ion exchange recovery of the uranium in a side column, thus regenerating the acid and allowing its reuse. This provides for very high DF's of 50–1,000. Finally, in the third step, the empty cylinders are filled and rinsed with deionized water 5 from the Deionized Water Supply 3 for approximately four hours, to remove residual chemicals and traces of uranium. This provides an additional DF of 2–10.

Facility Waste 11 from the Cylinder Decontamination Station is sent to Waste Management.

T. Waste Management

FIG. 4.23 depicts the flow sheet for the Urea and HMTA Recovery Station. The material and energy balances for the exemplary process for production of uranium dioxide microspheres and uranium carbide microspheres are shown in Table 4.23 and Table 4.23a, respectively.

TABLE 4.23

Section 1

Stream Number, Metric Tons per Year (Te/yr)

| Component | 1 | 2 | 3 | 4 | 5 | 6 | 7 |
|---|---|---|---|---|---|---|---|
| Facility Waste, liter/yr | 50,000 | 0 | 0 | 25,000 | 25,000 | 8,000 | 0 |
| Cement | 0 | 40 | 0 | 0 | 0 | 0 | 0 |
| Water | 0 | 0 | 20 | 0 | 0 | 0 | 0 |
| Drums | 0 | 0 | 0 | 0 | 0 | 40 | 250 |
| $Air/N_2$ | 0 | 0 | 0 | 0 | 0 | 0 | 0 |
| DAW | 0 | 0 | 0 | 0 | 0 | 0 | 0 |
| Activated Carbon | 0 | 0 | 0 | 0 | 0 | 0 | 0 |
| Ion Exchange Resins | 0 | 0 | 0 | 0 | 0 | 0 | 0 |
| HEPA's | 0 | 0 | 0 | 0 | 0 | 0 | 0 |
| Total | 50,000 | 40 | 20 | 25,000 | 25,000 | 8000 | 250 |
| Temp., ° C. | 25 | 25 | 25 | 25 | 25 | 25 | 25 |
| Flow, liter/hr | 5.7 | 2 | 2 | 3 | 3 | 1 | 5.7 |

TABLE 4.23

Section 2

Stream Number, Metric Tons per Year (Te/yr)

| Component | 8 | 9 | 10 | 11 | 12 | 13 | 14 |
|---|---|---|---|---|---|---|---|
| Facility Waste, liter/yr | 50,000 | 0 | 0 | 0 | 0 | 176,200 | 0 |
| Cement | 40 | 0 | 0 | 0 | 0 | 40 | 0 |
| Water | 20 | 98,624 | 14,003 | 0 | 0 | 20 | 112,623 |
| Drums | 250 | 0 | 0 | 0 | 0 | 880 | 0 |
| Air/$N_2$ | 0 | 0 | 0 | 24,000 | 12.6E6 | 0 | 0 |
| DAW | 0 | 0 | 0 | 0 | 0 | 0 | 0 |
| Activated Carbon | 0 | 0 | 0 | 0 | 0 | 0 | 0 |
| Ion Exchange Resins | 0 | 0 | 0 | 0 | 0 | 0 | 0 |
| HEPA's | 0 | 0 | 0 | 0 | 0 | 0 | 0 |
| Total | 60 | 98,624 | 14,003 | 24,000 | 12.6E6 | 176,200 | 112,623 |
| Temp., °C. | 25 | 25 | 25 | 25 | 25 | 25 | 25 |
| Flow, liter/hr | 5.7 | 11,260 | 1,600 | 2.3E6 | 1.2E9 | 20 | 12,840 |

TABLE 4.23

Section 3

Stream Number, Metric Tons per Year (Te/yr)

| Component | 15 | 16 | 17 | 18 | 19 | 20 |
|---|---|---|---|---|---|---|
| Facility Waste | 0 | 0 | 0 | 0 | 0 | 0 |
| Cement | 0 | 0 | 0 | 0 | 0 | 0 |
| Water | 0 | 0 | 0 | 0 | 0 | 0 |
| Drums | 250 | 0 | 0 | 0 | 201 | 140 |
| Air/$N_2$ | 0 | 12.6E6 | 0 | 0 | 0 | 0 |
| DAW | 0 | 0 | 0 | 4E6 | 40,200 | 0 |
| Activated Carbon | 0 | 0 | 20,000 | 0 | 0 | 0 |
| Ion Exchange Resins | 0 | 0 | 0 | 0 | 0 | 28,000 |
| HEPA's | 250 | 0 | 0 | 0 | 0 | 0 |
| Total | 250 | 12.6E6 | 20,000 | 4E6 | 40,200 | 28,000 |
| Temp., °C. | 25 | 25 | 25 | 25 | 52 | 25 |
| Flow, liter/hr | 5.7 | 1.2E9 | 3 | 460 | 5 | 3 |

TABLE 4.23a

Section 1

Stream Number, Metric Tons per Year (Te/yr)

| Component/Item | 1 | 2 | 3 | 4 | 5 | 6 | 7 |
|---|---|---|---|---|---|---|---|
| Facility Waste, liter/yr | 50,000 | 0 | 0 | 25,000 | 25,000 | 8,000 | 0 |
| Cement | 0 | 40 | 0 | 0 | 0 | 0 | 0 |
| Water | 0 | 0 | 20 | 0 | 0 | 0 | 0 |
| Drums | 0 | 0 | 0 | 0 | 0 | 40 | 250 |
| Air/$N_2$ | 0 | 0 | 0 | 0 | 0 | 0 | 0 |
| DAW | 0 | 0 | 0 | 0 | 0 | 0 | 0 |
| Activated Carbon | 0 | 0 | 0 | 0 | 0 | 0 | 0 |
| Ion Exchange Resins | 0 | 0 | 0 | 0 | 0 | 0 | 0 |
| HBPA's | 0 | 0 | 0 | 0 | 0 | 0 | 0 |
| Total | 50,000 | 40 | 20 | 25,000 | 25,000 | 8000 | 250 |
| Temp., °C. | 25 | 25 | 25 | 25 | 25 | 25 | 25 |
| Flow, liter/hr | 5.7 | 2 | 2 | 3 | 3 | 1 | 5.7 |

TABLE 4.23a

Section 2

Stream Number, Metric Tons per Year (Te/yr)

| Component/Item | 8 | 9 | 10 | 11 | 12 | 13 | 14 |
|---|---|---|---|---|---|---|---|
| Facility Waste, liter/yr | 50,000 | 0 | 0 | 0 | 0 | 176,200 | 0 |
| Cement | 40 | 0 | 0 | 0 | 0 | 40 | Q |
| Water | 20 | 105,844 | 14,003 | 0 | 0 | 20 | 119,887 |
| Drums | 250 | 0 | 0 | 0 | 0 | 880 | 0 |
| Air/$N_2$ | 0 | 0 | 0 | 24,000 | 12.6E6 | 0 | 0 |
| DAW | 0 | 0 | 0 | 0 | 0 | 0 | 0 |
| Activated Carbon | 0 | 0 | 0 | 0 | 0 | 0 | 0 |
| Ion Exchange Resins | 0 | 0 | 0 | 0 | 0 | 0 | 0 |
| HEPA's | 0 | 0 | 0 | 0 | 0 | 0 | 0 |

TABLE 4.23a-continued

Section 2

| Component/Item | Stream Number, Metric Tons per Year (Te/yr) | | | | | | |
|---|---|---|---|---|---|---|---|
| | 8 | 9 | 10 | 11 | 12 | 13 | 14 |
| Total | 60 | 105,844 | 14,003 | 24,000 | 12.6E6 | 176,200 | 119,887 |
| Temp., ° C. | 25 | 25 | 25 | 25 | 25 | 25 | 25 |
| Flow, liter/hr | 5.7 | 12,091 | 1,600 | 2.3E6 | 1.2E9 | 20 | 13,700 |

TABLE 4.23a

Section 3

| Component/Item | Stream Number, Metric Tons per Year (Te/yr) | | | | | |
|---|---|---|---|---|---|---|
| | 15 | 16 | 17 | 18 | 19 | 20 |
| Facility Waste | 0 | 0 | 0 | 0 | 0 | 0 |
| Cement | 0 | 0 | 0 | 0 | 0 | 0 |
| Water | 0 | 0 | 0 | 0 | 0 | 0 |
| Drums | 250 | 0 | 0 | 0 | 201 | 140 |
| Air/N$_2$ | 0 | 12.6E6 | 0 | 0 | 0 | 0 |
| DAW | 0 | 0 | 0 | 4E6 | 40,200 | 0 |
| Activated Carbon | 0 | 0 | 20,000 | 0 | 0 | 0 |
| Ion Exchange Resins | 0 | 0 | 0 | 0 | 0 | 28,000 |
| HEPA's | 250 | 0 | 0 | 0 | 0 | 0 |
| Total | 250 | 12.6E6 | 20,000 | 4E6 | 40,200 | 28,000 |
| Temp., ° C. | 25 | 25 | 25 | 25 | 52 | 25 |
| Flow. liter/hr | 5.7 | 1.2E9 | 3 | 460 | 5 | 3 |

Liquid waste streams 9 from the Oil Purification Station and the VTF Gas Purification Station are carbon filtered to remove traces of oil and organics The filtered waste stream 9 is then passed through an Ion Exchange to remove the traces of ionic species. Meanwhile, liquid waste stream 10 from the reverse osmosis is filtered. Permeate produced in the HMTA Recycle Station is similarly filtered. Waste streams 9 and 10 are then merged into a single stream 14 which is essentially pure water, and are discharged to Publicly Owned Treatment Works ("POTW") or National Pollution Discharge Elimination System ("NPDES") Point. No liquid radioactive wastes are generated by this process.

Solid wastes from the operations are collected, and sorted. Incineration is used to treat combustible wastes, while non-combustible waste is compacted and solidified.

MANUFACTURE OF DENSE URANIUM CARBIDE AND EXEMPLARY PROCESS

In the preferred embodiment, microspheres of depleted uranium carbides are advantageously utilized as shielding materials, because they have the highest densities of any uranium compounds. More particularly, uranium monocarbide (UC) is preferred, because it has slightly better physical properties than uranium dicarbide ($UC_2$), including a higher density and thermal conductivity. In either form, however, uranium carbides react slowly in moist air to form uranium dioxide. Thus, in the preferred embodiment, it is desirable to apply an impervious coating to the depleted uranium carbide microspheres that will render them inert under normal conditions.

There are two principal routes for manufacturing uranium carbide materials: (1) graphite reduction; and (2) gelation. Historically, the production of uranium carbide has been accomplished using the reduction of uranium dioxide with carbon (e.g., from graphite). This process is described in M. Benedict, T. Pigford, and H. Levi, *Nuclear Chemical Engineering*, Second Edition, McGraw-Hill, New York, N.Y., 1981, incorporated herein by reference. The uranium dioxide starting materials utilized in the reduction process can be manufactured from uranium hexafluoride or uranyl nitrate solutions using a variety of known methods. In the preferred embodiment, however, uranium carbide materials are manufactured directly utilizing a gelation process that is substantially similar to the uranium dioxide gelation process discussed previously.

The graphite reduction and gelation routes for production of uranium carbide are discussed in detail below.

A. Graphite Route

FIG. 5 prevents an overview of the graphite route for production of depleted uranium carbides.

As discussed above, the reduction of uranium dioxide to form uranium carbide is known in the art. In the preferred embodiment, a uranium dioxide solid is mixed with carbon powder and an polyethylene binder to form a slurry. This slurry is then oven dried and ball-milled to sand-sized particles (0.03–2 mm). The oxides are then converted into carbides in a vacuum heating operation, in which the oxygen is replaced by carbon, and, consequently, carbon monoxide and carbon dioxide are released. The amount of carbon in the initial mixture determines whether the uranium monocarbide or the dicarbide are formed. The resulting small particles of uranium carbide are fed through a furnace operating in excess of the normal melting point of the carbide, and the microspheres are formed. Surface tension effects produce the spherical shape.

The depleted uranium dioxide starting materials used in the reduction process can be generated using any of a variety of known methods. In the preferred embodiment, however, uranium dioxide is produced by gelation. While the gelation route for production of uranium dioxide can be advantageously used to generate uranium carbide by reduction of uranium dioxide microspheres, it is more desirable to produce the uranium carbides directly in the gelation process as described in detail below.

Once the depleted uranium carbide microspheres have been produced, it is desirable to apply a coating which will effectively isolate the uranium carbide from the environment at the microscopic level. While multi-layer coatings are known in the art, the preferred embodiment utilizes a single coating of carbon. This coating can be applied in a fluidized bed furnace in which a stream of inert gas (usually argon) is introduced into the furnace to levitate and heat the carbide microspheres. A mixture of hydrocarbons is then introduced into the gas stream. The hydrocarbons dissociate when they come in contact with the outer surface of the microspheres, and form a dense, pyrolytic carbon layer.

B. Gelation Route

FIG. 4.1a depicts the modified flow diagram for the manufacture of depleted uranium carbide microspheres by gelation.

As is readily apparent from FIG. 4.1*a*, the process for production of uranium carbide microspheres is substantially similar to the process for production of uranium dioxide shown in FIG. 4.1. There are four main changes to the gelation process when uranium carbide microspheres are the desired end product: (1) a carbon powder/surfactant solution is prepared in a Carbon Suspension Formation Station (FIG. 4.6.1 and Table 4.6.1); (2) the carbon powder/surfactant solution is added to the uranyl nitrate solution in the Uranyl Nitrate Solution Adjustment Station (FIG. 4.6.2*a* and Table 4.6.2a) (3) sintering of the uranium carbide spheres in the Uranium Carbide Coating Station is accomplished using a two-step sintering process (FIG. 4.24 and Table 4.24); and (4) the uranium carbide microspheres are coated in a Uranium Carbide Coating Station (FIG. 4.25 and Table 4.25).

TABLE 4.25

| Component | Stream Number, Metric Tons per Year (Te/yr) | | | | | |
|---|---|---|---|---|---|---|
| | 1 | 2 | 3 | 4 | 5 | 6 |
| UC$_2$ | 20,840 | 0 | 0 | 0 | 24,040 | 0 |
| Argon | 0 | 1000 | 0 | 0 | 0 | 0 |
| Methane | 0 | 0 | 3,726 | 0 | 0 | 0 |
| Propylene | 0 | 0 | 0 | 4,141 | 0 | 0 |
| Total | 20,840 | 1000 | 3,726 | 4,141 | 24,040 | 0 |
| Temp., ° C. | 25 | 25 | 25 | 25 | 25 | 25 |
| Flow, liter/hr | 216 | 61,000 | 600,000 | 250,000 | 250 | 2,880 |

As shown in FIG. 4.1*a*, depleted uranium hexafluoride is reacted with steam to produce uranyl fluoride and hydrogen fluoride; the latter being recoverable in an anhydrous form. The solid uranyl fluoride is collected, quenched, and dissolved in water. Adjustment of the residual hydrogen fluoride concentration is optionally undertaken utilizing distillation methods. As with the uranium dioxide gelation process, uranyl fluoride can be utilized directly for the formation of microspheres. Nevertheless, in a conservative approach, the uranyl fluoride is converted to uranyl nitrate using calcium nitrate to precipitate the fluoride and form uranyl nitrate in solution.

Meanwhile, a carbon suspension is formed in a Carbon Suspension Formation Station. FIG. 4.6.1 depicts the flow sheet for the Carbon Suspension Formation Station. The material and energy balances for the exemplary process are shown in Table 4.6.1.

TABLE 4.6.1

| Component | Stream Number, Metric Tons per Year (Te/yr) | | | | | | |
|---|---|---|---|---|---|---|---|
| | 1 | 2 | 3 | 4 | 5 | 6 | 7 |
| Carbon Pigment | 2,850 | 0 | 0 | 0 | 2,850 | 0 | 0 |
| Surfactant | 0 | 14 | 0 | 0 | 14 | 0 | 0 |
| Water | 0 | 0 | 11,386 | 640 (steam) | 11,386 | 640 | 0 |
| Facility Waste | 0 | 0 | 0 | 0 | 0 | 0 | 0 |
| Total | 2,850 | 14 | 11,386 | 640 | 14,250 | 640 | 0 |
| Temp., ° C. | 25 | 25 | 25 | 150 | 50 | 150 | 25 |
| Flow Rate, Liters/hour | 81 | 2 | 1,300 | 73,000 | 1,356 | 73 | 0 |

The manufacture of uranium carbide microspheres requires the addition of carbon to convert the uranium dioxide produced by the gelation process into uranium carbide. In the preferred embodiment, carbon is introduced to the uranium solutions, prior to gelation, as part of an aqueous suspension of fine carbon particles. As shown below, the carbon substitutes for the oxygen in the uranium dioxide and generates carbon dioxide:

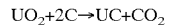

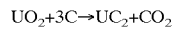

The required quantity of carbon is estimated from the stoichiometry of the conversion and sintering reactions; the monocarbide requires less carbon than the dicarbide. For the 100% capacity case, 1,900 tonnes/year would be required for the monocarbide and 2,850 tonnes/year for the dicarbide. The particulate form of carbon, such as carbon black or fine graphite, is preferred because of its small size, consistency, and ease of making a suspension. The quantity of added carbon depends upon the desired final carbide (monocarbide or dicarbide), and is usually between 14% and 25% of the broth solution (weight basis). Consequently, surfactants are added to the solution to stabilize the particles and keep them in suspension. The carbon/surfactant suspension is added to the uranium nitrate solution in the Uranyl Nitrate Adjustment Station, as shown in FIG. 4.6.2*a* and Table 4.6.2a.

In the preferred embodiment, a 20% carbon suspension is prepared by combining appropriate amounts of carbon pigment 1 and deionized water 3 in a Mixing Tank. About 1000 ppm of surfactant 2 is added to the Mixing Tank to facilitate dispersion of the fine carbon particles in the water. Gentle heating of the suspension to about 50° C. using a Heat Exchanger also assists the dispersion. The resulting suspension 5 is pumped to the Uranyl Nitrate Solution Adjustment Station. FIG. 4.6.2*a* depicts the flow sheet for the modified Uranyl Nitrate Solution Adjustment Station for uranium carbide production. The material and energy balances for the exemplary process are shown in Table 4.6.2a.

Adjustment of the uranyl nitrate solution for production of uranium carbide is virtually identical to the uranium dioxide process described previously. In the modified process, however, the carbon/surfactant suspension 14 from the Carbon Suspension Formation Station is introduced into the VR Evaporator along with the uranyl nitrate solution 1 and the urea solution 3. The resulting solution is processed in the same maimer as before.

As with the uranium dioxide routes, the carbon-containing, adjusted uranyl nitrate solution is used for gel sphere formation. In the preferred embodiment, internal gelation routes are preferred. Following gel sphere formation, the gel spheres are aged in an ammonium hydroxide solution. After aging, the gel spheres are dried at similar temperatures to remove water and excess ammonia.

Subsequently, a vertical tube furnace ("VTF") sinters the microspheres under an argon-hydrogen atmosphere. In the preferred embodiment, a two zone furnace with an inert gas, such as nitrogen, is utiltized in order to avoid over-reduction of the uranium. FIG. 4.24 depicts the flow sheet for the modified Uranium Carbide Sintering Station. The material and energy balances for the exemplary process are shown in Table 4.24.

TABLE 4.24

| Component/ Item | Stream Number, Metric tons per year (Te/yr) | | | | |
|---|---|---|---|---|---|
| | 1 | 2 | 3 | 4 | 5 |
| (NH$_4$)$_2$U$_2$O$_7$ | 24,540 | 0 | 0 | 0 | 0 |
| UC$_2$ | 0 | 0 | 20,840 | 0 | 0 |
| NH$_3$ | 0 | 0 | 0 | 1,930 | 0 |
| CO$_2$ | 0 | 0 | 0 | 8,600 | 0 |

TABLE 4.24-continued

| Component/ Item | Stream Number, Metric tons per year (Te/yr) | | | | |
|---|---|---|---|---|---|
| | 1 | 2 | 3 | 4 | 5 |
| $N_2$ | 0 | 0 | 0 | trace | 0 |
| Argon | 0 | 15,400 | 0 | 15,336 | 0 |
| Hydrogen | 0 | 160 | 0 | 613 | 0 |
| $NO_2$ | 0 | 0 | 0 | 6.6 | 0 |
| Urea | 300 | 0 | 0 | 0 | 0 |
| HMTA | 830 | 0 | 0 | 0 | 0 |
| $NH_4OH$ | 46 | 0 | 0 | 0 | 0 |
| Oil | 1,100 | 0 | 0 | 0 | 0 |
| Nitrogen | 0 | 0 | 0 | 0 | 0 |
| Carbon | 2,850 | 0 | 0 | 0 | 0 |
| Water | 490 | 1,600 | 0 | 0 | 0 |
| Facility Waste | 0 | 0 | 0 | 0 | 0 |
| Total | 40,430 | 17,200 | 20,840 | 26,500 | 0 |
| Temp, ° C. | 25 | 150 | 100 | 300 | 25 |
| Flow, 1/hr | 2,565 | 1,67E6 | 216 | 3.6E6 | 0 |

The sintering process for uranium carbide spheres is substantially the same as uranium dioxide sintering, except that a Two-Zone VTF is utilized to avoid over reduction of the uranium carbide. Too much hydrogen causes conversion the uranium carbide into uranium metal and methane. The first zone of the VTF utilizes an argon cover gas 2 containing 2–4% hydrogen. During this stage of the sintering process, most of the reaction and generation of carbon monoxide and dioxide occur. It should be noted that sintering of uranium carbide spheres produces substantially more carbon monoxide and carbon dioxide than with uranium dioxide. The second zone of the VTF operates at higher temperatures, using only argon as the cover gas, and results in sintering and the high densities desired. The final sintered spheres have densities usually exceeding 95% of the theoretical density for uranium carbides. If two or three sizes of microspheres are produced, then spatial densities exceeding 90% of theoretical can be obtained by vibratory loading methods.

Subsequently, as with the graphite route, fluidized bed furnaces apply coatings to the microspheres which effectively isolate the uranium carbide from the environment at the microscopic level. While the mass and energy balances in Table 4.24 are set forth for two coatings, it is expected that a single coating will be preferred.

PEROXIDE GELATION

Peroxide gelation is an alternative gelation process contemplated in accordance with the present invention. FIG. 6 provides an overview of the peroxide gelation process. As shown in FIG. 6, uranium hexafluoride is vaporized and defluorinated to produce anhydrous hydrogen fluoride and uranyl fluoride powder. However, the steam required for the reaction comes from a recycle stream 1 containing the azeotrope ($HF.2H_2O$) plus traces or uranyl fluoride, nitric acid, and aluminium nitrate. The uranyl fluoride powder is quenched and dissolved in diluted, aqueous nitric acid and used to dissolve uranium metal and low density oxide feed materials. Dissolution is aided by a nitric acid recycle stream 2. Fluorboric acid and urea may be added to the solution in the quench/dissolving step. Aluminum nitrate can be added in the molar ratio of 0.001 to 1.25 to facilitate partial complexation of the fluoride ions. The stream is chilled to 0 to 25° C., and dispersed using nozzles into a hydrogen peroxide solution bath or column. The peroxide solution has a concentration between 0.5 to 50%, and is maintained between 0–45° C. Uranyl peroxide ($UO_4.2H_2O$) precipitates as a microsphere. The solids are separated by screens and filters washed with a dilute peroxide stream (0.001 to 5 M), dried in warm nitrogen and sintering under nitrogen to produce dense uranium dioxide microspheres.

Uranium carbides can be manufactured by adding a carbon suspension to the uranium stream prior to chilling and droplet formation. The uranyl peroxide precipitate particle retains the carbon pigment, but allows the soluble species such as nitrates, fluorides, and urea to diffuse into the bulk solution. The two-step sintering procedure, described previously, is used to produce the dense carbides, but no hydrogen is needed.

The peroxide solution recycles between the precipitator and the filter/separator. The recycled solution contains hydrogen fluoride, nitric acid, aluminum nitrate, fluorboric acid, and traces of uranyl fluoride and peroxide. Once the peroxide is consumed by reaction or otherwise depleted by decomposition the stream is periodically or continuously withdrawn and distilled. The bottoms product from distillation contains the hydrogen fluoride-water azeotroph (boiling point circa 110° C.), with aluminium nitrate, fluorboric acid, and traces of uranyl fluoride/nitrates. This stream is recycled to the defluorinator. The distillate product from distillation contains nitric acid, at temperatures of 50 to 75° C. Molecular sieves, distillation, or related means can be used to remove excess water prior to recycle of the nitric acid stream 2 to the quencher.

Although a particular form of the invention has been illustrated and described, it will be appreciated by those of ordinary skill in the art that various modifications, alterations, and substitutions can be made without departing from the spirit and scope of the invention. Accordingly the scope of the present invention is not to be limited by the particular embodiments set forth above, but is only to be defined by the following claims.

We claim:

1. A shielding material precursor, comprising:
   a particulate uranium compound selected from the group consisting of uranium dioxide particles and uranium carbide particles and mixtures of uranium dioxide particles and uranium carbide particles; and
   a thermosetting polyfunctional resinous binding material.

2. The precursor of claim 1, wherein the uranium compound comprises at least 5 weight % of the precursor.

3. The precursor of claim 1, wherein the uranium compound comprises about 55 weight % to 80 weight % of the precursor.

4. The precursor of claim 1, wherein the resinous binding material is a polyimide.

5. The precursor of claim 1, wherein the resinous binding material is a polyamide.

6. A shielding material precursor, comprising:
   a particulate uranium compound selected from the group consisting of uranium dioxide particles and uranium carbide particles and mixtures of uranium dioxide particles and uranium carbide particles; and
   a resinous binding material, wherein said resinous binding material is polyfunctional.

7. The precursor of claim 6, wherein the resin is a polyimide.

8. The precursor of claim 6, wherein the resin is a polyamide.

9. The precursor of claim 6 wherein the resin is polyurethane.

10. A shielding material precursor, comprising:
    a particulate uranium compound selected from the group consisting of uranium dioxide particles and uranium carbide particles and mixtures of uranium dioxide particles and uranium carbide particles; and a metal binding material.

11. The precursor of claim 10, wherein the metal binding material is selected from the group consisting of copper, zinc, nickel, tin, aluminium, boron, and mixtures thereof.

12. A shielding material precursor, comprising:

a particulate uranium compound selected from the group consisting of uranium dioxide particles and uranium carbide particles and mixtures of uranium dioxide particles and uranium carbide particles; and a metal-oxide binding material.

13. The precursor of claim 8, wherein the metal-oxide is selected from the group consisting of alumina, boric acid, magnesia, silica, hafnia, hematite, magnetite, and zirconia.

14. The precursor of claims 1, 6, 10, or 12 wherein the uranium compound is coated.

15. The precursor of claim 14 wherein the uranium compound is coated with carbon.

16. The precursor of claims 1, 6, 10, or 12, wherein the precursor further comprises a shielding additive.

17. The precursor of claim 16, wherein the shielding additive comprises up to about 20 weight % of the precursor.

18. The precursor of claim 16, wherein the shielding additive is selected from the group consisting of hydrogen, boric acid, sodium borate, gadolinium oxide, halfnium oxide, erbium oxide, and indium oxide.

19. The precursor of claim 16, wherein the shielding additive is steel shot.

20. The precursor of claim 16, wherein the shielding additive is glass beads.

21. The precursor of claims 1, 6, 10, or 12, wherein the uranium compound particles are microspheres formed by gelation.

22. The precursor of claims 1, 6, 10, or 12, wherein the uranium compound particles have at diameters from about 30 to 2000 microns.

23. The precursor of claims 1, 6, 10, or 12, wherein the diameters of the uranium compound particles are within one of at least two discrete ranges of particle sizes.

24. The precursor of claim 23, wherein the first particle size range is from about 300 to 500 microns and the second particle size range is from about 1000 to 1300 microns.

25. The precursor of claims 1, 6, or 10, wherein the uranium compound comprises a mixture of uranium dicarbide and uranium dioxide particles.

26. The precursor of claim 25, wherein the uranium carbide and uranium dioxide particles are coated.

27. A precursor of claim 25, wherein the uranium dioxide particles are coated.

28. A precursor of claim 27, wherein the uranium carbide particles are coated with carbon.

29. A precursor of claim 27, wherein the uranium dioxide particles are coated with carbon.

30. The precursor of claim 25, wherein the uranium carbide comprises up to 70 weight % of the uranium compound mixture.

31. A precursor of claim 30, wherein the uranium carbide comprises particles having a size range wherein the diameter of the particles is from about 1000 to 1300 microns and wherein the uranium dioxide comprises particles have a size range wherein the diameter of the particles is from about 300 to 500 microns.

32. A method for forming a monolithic shielding material, comprising:

combining a particulate uranium compound, a metal oxide binder, and water to form a mixture;

curing the mixture at a sufficient temperature and pressure to form a monolithic shielding material.

33. The method of claim 32, wherein water comprises up to about 40 weight % of the mixture.

34. The method of claim 32, wherein the mixture is cured at ambient temperature and pressure.

35. The method of claim 32, wherein the mixture is cured by heating the mixture.

36. The method of claim 35, wherein the mixture is cured by heating the mixture at a temperature from about 100° C. to about 400° C.

37. The method of claims 32 or 35, wherein curing the mixture further includes applying pressure to the mixture.

38. The method of claim 32, wherein curing the mixture is cured at a pressure up to about 20 atmospheres.

39. The method of claim 32, wherein curing the mixture further includes providing a combustible material in proximity to the mixture and heating the mixture whereby the combustible wall is consumed.

40. A method for forming a monolithic shielding material, comprising:

combining a particulate uranium compound selected from the group consisting of uranium dioxide particles and uranium carbide particles and mixtures of uranium dioxide particles and uranium carbide particles and a metal binder to form a precursor mixture; and curing the mixture at a sufficient temperature and pressure to form a monolithic shielding material.

41. The method of claim 40, wherein the mixture is cured by heating.

42. The method of claim 41, wherein the mixture is cured by heating the mixture at a temperature from about 400 to 1000° C.

43. The method of claim 41, wherein the mixture is cured by induction heating.

44. The method of claims 40 or 41, wherein curing the mixture further includes applying pressure to the mixture.

45. The method of claim 40, wherein the mixture is cured at a pressure up to about 20 atmospheres.

46. A method for forming a monolithic shielding material, comprising melting a metal binding material;

adding a particulate uranium compound selected from the group consisting of uranium dioxide particles and uranium carbide particles and mixtures of uranium dioxide particles and uranium carbide particles to the melted binder to form a mixture;

cooling the mixture to form a monolithic shielding material.

47. The method of claim 46, wherein the metal binding material is selected from the group consisting of copper, zinc, nickel, boron and mixtures thereof.

48. A method for forming a monolithic shielding material, comprising combining a particulate uranium compound particulate uranium compound selected from the group consisting of uranium dioxide particles and uranium carbide particles and mixtures of uranium dioxide particles and uranium carbide particles and a thermosetting polyfunctional resin binder to form a precursor mixture; and curing the mixture at a sufficient temperature and pressure to form a monolithic shielding material at ambient temperature and pressure.

49. The method of claim 48, wherein the mixture is cured by heating.

50. The method of claim 49, wherein the mixture is cured by heating the mixture at a temperature from about 400 to 600° C.

51. The method of claim 49, wherein the mixture is cured by induction heating.

52. The method of claims 48, 49, or 50, wherein curing the mixture further includes applying pressure to the mixture.

53. The method of claim 52, wherein the mixture is cured by applying a pressure up to about 20 atmospheres.

54. A method for forming a monolithic shielding material, comprising:

combining a particulate uranium compound selected from the group consisting of uranium dioxide particles and uranium carbide particles and mixtures of uranium dioxide particles and uranium carbide particles and a polyfunctional resin binder to from a precursor mixture; and curing the mixture at a sufficient temperature and pressure to form a monolithic shielding material.

55. The method of claim 54, wherein the mixture is cured by heating.

56. The method of claim 55, wherein the mixture is cured by heating the mixture at a temperature from about 400 to 600° C.

57. The method of claim 55, wherein the mixture is cured by induction heating.

58. The method of claims 54, 55, 56 or 57, wherein curing the mixture further includes applying pressure to the mixture.

59. The method of claims 54, 55, 56, or 57, wherein curing the mixture further includes applying a pressure up to about 20 atmospheres.

60. A monolithic shielding material, comprising:

a pyrolized uranium compound selected from the group consisting of uranium dioxide particles and uranium carbide particles and mixtures of uranium dioxide particles and uranium carbide particles, and a thermosetting polyfunctional resinous binding material.

61. A monolithic shielding material, comprising:

a pyrolized uranium compound and a metal binding material, said uranium compound being selected from the group consisting of uranium dioxide particles and uranium carbide particles and mixtures of uranium dioxide particles and uranium carbide particles.

62. A monolithic shielding material, comprising a pyrolized uranium compound and a metal oxide binding material.

63. A shielding material precursor comprising:

a particulate uranium compound selected from the group consisting of uranium dioxide particles and uranium carbide particles and mixtures of uranium dioxide particles and uranium carbide particles; and a binding material selected from the group consisting of a thermosetting polyfunctional resinous binding material, metal binding material, and metal oxide binding material; and wherein the binding material constitutes up to 95 weight % of the precursor material.

64. The shielding material precursor of claim 63 wherein the binding material constitutes 20–45 weight % of the precursor and the particulate uranium compound constitutes 55–80 weight % of the precursor material.

* * * * *